US005296339A

United States Patent [19]

Fujita et al.

[11] Patent Number: 5,296,339

[45] Date of Patent: Mar. 22, 1994

[54] METHOD FOR PROCESSING SILVER HALIDE COLOR PHOTOGRAPHIC MATERIAL

[75] Inventors: Yoshihiro Fujita; Keiji Mihayashi, both of Kanagawa, Japan

[73] Assignee: Fuji Photo Film Co., Ltd., Kanagawa, Japan

[21] Appl. No.: 843,001

[22] Filed: Feb. 28, 1992

[30] Foreign Application Priority Data

Mar. 1, 1991 [JP] Japan .................................. 3-57685

[51] Int. Cl.[5] .......................... C03C 7/32; C03C 5/31

[52] U.S. Cl. .................................. 430/389; 430/388; 430/399; 430/556; 430/557

[58] Field of Search ............... 430/399, 556, 557, 382, 430/388, 389

[56] References Cited

U.S. PATENT DOCUMENTS

| | | | |
|---|---|---|---|
| 4,617,256 | 10/1986 | Kunitz et al. | 430/557 |
| 5,066,576 | 11/1991 | Ichijima et al. | |
| 5,068,170 | 11/1991 | Abe | 430/399 |
| 5,187,056 | 2/1993 | Saito et al. | 430/557 |

FOREIGN PATENT DOCUMENTS 0336411 10/1989 European Pat. Off. .

*Primary Examiner*—Charles L. Bowers, Jr.
*Assistant Examiner*—Mark F. Huff
*Attorney, Agent, or Firm*—Sughrue, Mion, Zinn, Macpeak & Seas

[57] ABSTRACT

A method for processing an imagewise exposed silver halide color photographic material comprising color developing the silver halide color photographic material with a color developer and then processing the photographic material with a processing solution having bleaching activity, in which the photographic material contains a coupler represented by the following general formula (I) and the replenishment rate of the color developer is not more than 600 ml/$m^2$ of photographic material:

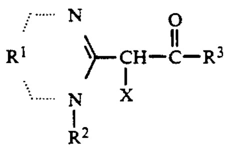

(I)

wherein $R^1$ represents a group of nonmetallic atoms necessary for forming a 5-membered unsaturated heterocyclic ring together with a

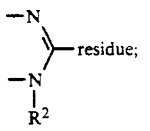

$R^2$ represents a hydrogen atom, an alkyl group, an alkenyl group, an alkynyl group, an aromatic group or a heterocyclic group; $R^3$ represents an alkyl group, an alkenyl group, an alkynyl group, an aromatic group, an alkoxy group, an aryloxy group, a heterocyclic oxy group or

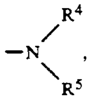

wherein $R^4$ and $R^5$ independently represent hydrogen atoms, alkyl groups, alkenyl groups, alkynyl groups, aromatic groups or heterocyclic groups; and X represents a group which is eliminable by reaction with an oxidation product of an aromatic primary amine developing agent, thereby obtaining a photographic material excellent in color development property, color image fastness, image quality and processing stability.

16 Claims, No Drawings

METHOD FOR PROCESSING SILVER HALIDE COLOR PHOTOGRAPHIC MATERIAL

FIELD OF THE INVENTION

The present invention relates to a method for processing a silver halide color photographic material (hereinafter also briefly referred to as a photographic material), and more particularly to a method by which excellent photographic characteristics are obtained even when the color developer replenishment rate is decreased during processing.

BACKGROUND OF THE INVENTION

Silver halide color photographic materials, particularly photographic materials for taking pictures, are required to be highly sensitive, produce good image quality, few variations in photographic characteristics during storage and excellent image retaining qualities after processing.

Acylacetanilide-type couplers having active methylene (methine) groups are generally known as yellow couplers for forming images of color photographs However, the images formed by these couplers have low developed color density and dye formation rate. In particular, when these couplers are used as development restrainers, so-called DIR couplers, they must be used in large amounts due to their low activity, which causes compromises in color image fastness and hue; and, increases cost.

On the other hand, for color development, techniques for reducing the amount of waste liquor generated in processing have recently been investigated, and are widely utilized in some processing stages. In been proposed because the environmental impact of waste liquor generated in color development processes is very serious. Examples include reproduction methods with color developers using activated carbon described in JP-B-55-1571 (the term "JP-B" as used herein means an "examined Japanese patent publication") and JP-A-58-14831 the term "JP-A" as used herein means an "unexamined published Japanese patent application"), ion exchange membranes described in JP-A-52-105820 and ion exchange resins described in JP-A-55-144240, JP-A-57-146249 and JP-A-61-95352, as well as methods utilizing electrodialysis described in JP-A-54-37731, JP-A-56-1048, JP-A-56-1049, JP-A-56-27142, JP-A-56-33644, JP-A-56-149036, JP-B-61-10199.

However, in the above-described methods the composition of the developing solutions must be continuously monitored and strictly controlled, which requires high-level control techniques and expensive apparatus. As a result, these methods are actually only used in some large-scale laboratories.

Alternatively, low replenishment processing methods are also used in which the composition of the replenishers of color developers (hereinafter referred to as color development replenishers) are adjusted to reduce the replenishment rate, without using the reproduction methods described above. Examples of the adjustment of the replenisher composition in low replenishment processing include methods for concentrating consumable ingredients such as color developing agents and preservatives so that the ingredients are supplied in required amounts even if the replenishment rate is reduced.

When a photographic material is processed, halogen ions are released in the color developer. In low replenishment processing, the bromine ion concentration in the color developer increases over time, which restrains development. In order to prevent this phenomenon, therefore, methods are also usually employed in which the concentration of bromides contained in replenishers is previously reduced compared to that used in ordinary replenishment processing.

Such low replenishment processing has the advantage that the processing may be conducted without full analysis of the solution composition, in addition to the above-described advantages such as prevention of water pollution and reduction in processing cost.

The replenishment rate of the color developers which have previously been used varies depending on the type of photographic materials used. Taking a picture taking color negative film as an example, the replenishment rate is generally 900 to 1,200 ml/$m^2$ of photographic material, but when there is requirement for reduced replenishment, the film is processed at a replenishment rate of 600 ml/$m^2$ of photographic material.

However, attempts to conduct rapid processing under such reduced replenishment revealed that the problem of fluctuations in photographic characteristics became significant. For this reason, the development of techniques having the advantage of simplicity in low replenishment processing as described above and meeting the demand of rapid processing have been desired.

SUMMARY OF THE INVENTION

A primary object of the present invention is therefore to provide a processing method which does not produce fluctuations in photographic characteristics even when the replenishment rate of a color developer is reduced.

It is another object of the present invention to provide a processing method which gives excellent color image fastness and image quality, fulfilling the primary object.

It has been found that the above-described objects of the present invention are achieved by a method for processing an imagewise exposed silver halide color photographic material comprising: (a) color developing the silver halide color photographic material with a color developer; and, then, (b) processing the photographic material with a processing solution having bleaching activity, in which the photographic material contains a coupler represented by the following general formula (I) and wherein the replenishment rate of the color developer is not more than 600 ml/$m^2$ of photographic material:

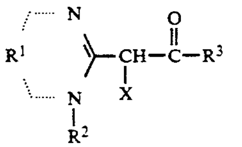

(I)

wherein $R^1$ represents a group of nonmetallic atoms necessary for forming a 5-membered unsaturated heterocyclic ring together with a

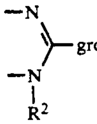 group;

$R^2$ represents a hydrogen atom, an alkyl group, an alkenyl group, an alkynyl group, an aromatic group or a heterocyclic group; $R^3$ represents an alkyl group, an alkenyl group, an alkynyl group, an aromatic group, an alkoxy group, an aryloxy group, a heterocyclic oxy group or

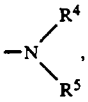 , wherein $R^4$ and $R^5$ independently represent a hydrogen atom, an alkyl group, an alkenyl group, an alkynyl group, an aromatic group or a heterocyclic group; and X represents a group which is eliminable by reaction with an oxidation product of an aromatic primary amine developing agent.

DETAILED DESCRIPTION OF THE INVENTION

In general, in order to reduce the replenishment rate and keep the amount of necessary components constant, a concentrated solution having high activity as a replenisher must be maintained. Further, the replenishment rate (therefore the amount of the solution overflowed) is reduced, although reaction products are produced depending on the amount of photographic material processed (hereinafter briefly referred to as the processing amount). For this reason, the reaction products accumulated in the processing solution and further products eluted from the photographic material are enriched in concentration.

Hence, when the replenishment rate of the color developer is decreased, the concentration of oxides of the color developing agent and mercapto compounds eluted from the photographic material, various antifogging agents, groups eliminated from various couplers, sensitizing dyes and dyes are increased in the color developer, which causes the photographic characteristics to fluctuate.

According to the present invention, stable photographic characteristics can be obtained by using couplers represented by general formula (I) in the present invention as photographic materials, without impairing the high color developing properties, excellent color image fastness and image quality improving effect of the couplers, even when the color developer is replenished at a replenishment rate as low as 600 ml/$m^2$ or less.

In the present invention, the replenishment rate of the color developer is not more than 600 ml/$m^2$ of photographic material, preferably in the range of 100 ml/$m^2$ to 500 ml/$m^2$ in which the effect becomes more significant, more preferably 400 ml/$m^2$ or less, and most preferably 300 ml/$m^2$ or less.

The photographic materials according to the present invention containing the couplers represented by general formula (I) provide stable photographic characteristics which fluctuate little, even when the photographic materials are processed with the color developers at low replenishment rates as described above.

The present invention is hereinafter described in detail.

First, the couplers represented by general formula (I) which are used in the present invention are described in detail.

In general formula (I), $R^1$ represents a group of nonmetallic atoms necessary for forming a 5-membered unsaturated heterocyclic ring together with a

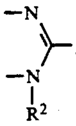 group.

In the heterocyclic ring represented by

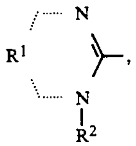 , the two ring-forming atoms, other than the two nitrogen atoms and one carbon atom in the

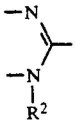 group may each independently be carbon atoms, nitrogen atoms, sulfur atoms, selenium atoms or tellurium atoms, and preferably carbon atoms or nitrogen atoms. The heterocyclic ring may be substituted and may have another condensed ring. The condensed ring may be further substituted.

As the above-described heterocyclic ring, those represented by the following general formulae (A) and (B) are particularly preferable.

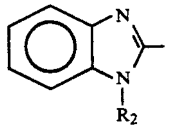

(A)

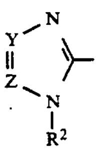

(B)

In general formulae (A) and (B), $R^2$ has the meaning as defined in general formula (I). In general formula (B), Y and Z each independently represent carbon atoms or nitrogen atoms. The heterocyclic rings represented by general formulae (A) and (B) may have substituent groups. Among the five-membered unsaturated heteroxyclic ring formed with $R^1$, the heterocyclic ring represented by formula (B) is particularly preferable. Thus, the preferable coupler represented by formula (I)

can be represented by formulae (I-A) and (I-B) as follows:

(I-A)

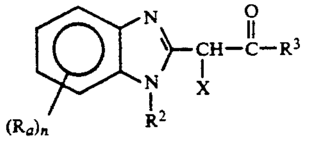

(I-B)

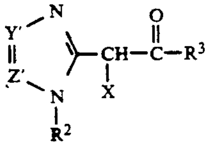

wherein $R^2$, $R^3$ and X have the same meangings as those defined in formula (I), and Y' and Z' each independently represents —N=, —CH= or —C($R_b$)=, in which $R_a$ and $R_b$ each represents substituent group and n shows 0 or an integer of 1 to 4.

Particularly, when $R^1$ is combined with a

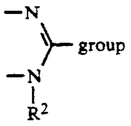

to form a benzimidazole ring as represented by general formula (A), it is preferred that any one of $R^1$, $R^2$, $R^3$ and X has at least one dissociation-promoting group which will be described below.

The alkyl groups represented by $R^2$, $R^3$, $R^4$ and $R^5$ in general formula (I) have 1 to 30 carbon atoms, and particularly 1 to 20 carbon atoms, and may be branched, straight or cyclic. Examples of the alkyl groups include methyl, ethyl, propyl, isopropyl, isoamyl, 2-ethylhexyl, dodecyl and cyclohexyl, which may be further substituted.

The alkenyl groups represented by $R^2$, $R^3$, $R^4$ and $R^5$ in general formula (I) have 1 to 30 carbon atoms, and particularly 1 to 20 carbon atoms, and may be either straight or cyclic. Examples of the alkenyl groups include vinyl, allyl, 1-methylvinyl, 1-cyclopentenyl and 1-cyclohexenyl, which may be further substituted.

The alkynyl groups represented by $R^2$, $R^3$, $R^4$ and $R^5$ in general formula (I) have 1 to 30 carbon atoms, and particularly 1 to 20 carbon atoms. Examples of the alkynyl groups include ethynyl, 1-propynyl and 3,3-dimethyl-1-butynyl, which may be further substituted.

The aromatic groups represented by $R^2$, $R^3$, $R^4$ and $R^5$ in general formula (I) have 6 to 20 carbon atoms, and particularly 6 to 10 carbon atoms. Examples of the aromatic groups include phenyl, naphthyl and anthracenyl, which may be further substituted.

The heterocyclic groups represented by $R^2$, $R^3$, $R^4$ and $R^5$ in general formula (I) are preferably 5- to 7-membered rings. Nitrogen, oxygen and sulfur atoms are preferable as heteroatoms. It is preferred that the heterocyclic groups have 1 to 10 carbon atoms. Examples thereof include 2-furyl, 2-thienyl, 2-pyridyl, 2-pyrimidyl, 2-imidazolyl and 2-(1,3-oxazolyl), which may be further substituted.

The alkoxy group represented by $R^3$ in general formula (I) is represented by —O—$R^{31}$, wherein $R^{31}$ represents an alkyl group, an alkenyl group or an alkynyl group, which have the same meanings as defined above. Examples thereof include methoxy, ethoxy, propyloxy, isopropyloxy, isoamyloxy, 2-ethylhexyloxy, lauryloxy, allyloxy, cyclohexyloxy, vinyloxy and ethynyloxy, which may be further substituted.

The aryloxy group represented by $R^3$ in general formula (I) is represented by —O—$R^{32}$, wherein $R^{32}$ has the same meanings as the aromatic group defined above. Examples thereof include phenoxy, 1-naphthoxy, 2-naphthoxy, 1-anthryloxy and 9-anthryloxy, which may be further substituted.

The heterocyclic oxy group represented by $R^3$ in general formula (I) is represented by —O—$R^{33}$, wherein $R^{33}$ has the same meanings as the heterocyclic group defined above. Examples thereof include 2-furyloxy, 2-thienyloxy, 2-pyridyloxy, 2-pyrimidyloxy, 2-imidazolyloxy and 2-(1,3-oxazolyl)oxy, which may be further substituted.

Substituent groups $R_a$ and $R_b$ which can substitute $R^1$, $R^2$, $R^3$, $R^4$, $R^5$, $R^{31}$, $R^{32}$ and $R^{33}$ in general formula (I) and the heterocyclic rings represented by general formulae (A) and (B) include, for example, alkyl groups (having the same meanings as the alkyl groups represented by $R^2$ to $R^5$), alkenyl groups (having the same meanings as the alkenyl groups represented by $R^2$ to $R^5$), alkynyl groups (having the same meanings as the alkynyl groups represented by $R^2$ to $R^5$), aromatic groups (having the same meanings as the aromatic groups represented by $R^2$ to $R^5$), heterocyclic groups (having the same meanings as the heterocyclic groups represented by $R^2$ to $R^5$), halogen atoms (for example, fluorine, chlorine and bromine atoms), a cyano group, a nitro group, —N($R^{11}$)($R^{12}$), —$OR^{11}$, —$OCOR^{11}$, —O-CON($R^{11}$)($R^{12}$), —OSi($R^{11}$)—($R^{12}$) ($R^{13}$), —$OSO_2R^{11}$, —N($R^{11}$)$COR^{12}$, —N($R^{11}$)CON($R^{12}$)($R^{13}$), —N($COR^{11}$)($COR^{12}$), —N($R^{11}$)$SO_2$N($R^{12}$)($R^{13}$), —N($R^{11}$)$CO_2R^{12}$, —N($R^{11}$)$SO_2R^{12}$, —CON($R^{11}$)($R^{12}$), —$COR^{11}$, —$CO_2R^{11}$, —$SO_2$N($R^1$)($R^2$), —$SO_2R^{11}$, —$SOR^{11}$, —$SR^{11}$, —Si($R^{11}$)($R^{12}$)($R^{13}$), —$SO_2$NH-$COR^{11}$, —$SO_2NHCO_2R^{11}$, —$CONHCOR^{11}$, —$SO_2$N-$HSO_2R^{11}$, —$CONHCO_2R^{11}$, —$CONHSO_2R^{11}$, —$CONHSO_2$N($R^{11}$)($R^{12}$) and —P(O)($OR^{11}$), wherein $R^{11}$ to $R^{13}$ each independently represent hydrogen atoms, alkyl groups (having the same meanings as the alkyl groups represented by $R^2$ to $R^5$), alkenyl groups (having the same meanings as the alkenyl groups represented by $R^2$ to $R^5$), alkynyl groups (having the same meanings as the alkynyl groups represented by $R^2$ to $R^5$), aromatic groups (having the same meanings as the aromatic groups represented by $R^2$ to $R^5$) or heterocyclic groups (having the same meanings as the heterocyclic groups represented by $R^2$ to $R^5$). In general formula (I), $R^3$ is preferably —N($R^4$)($R^5$), and more preferably —NH—$R^4$.

When $R^3$ is represented by —NH—$R^4$ in general formula (I), $R^4$ is preferably an aromatic group, and more preferably a phenyl group.

The most preferable group $R^3$ can be represented by formula (a) as follows:

(a)

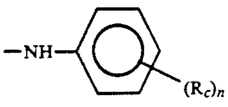

wherein $R_c$ represents substituent group and n is an integer of 1 to 3, when n takes 2 or 3, $R_c$ may be the same or different and when these groups substituted at adjacent positions, the groups may be connected to form ring.

An example of the substituents for $R_c$ includes substituents which are defined as the substituents for $R_3$. Particularly preferable substituents are a cyano, $-OR^{11}$, $-SO_2NHCOR^{11}$, $-SO_2NHSO_2R^{11}$, $-SO_2N(R^{11})(R^{12})$, $-CO_2R^{11}$, $-CONHSO_2R^{11}$, $-CONHCOR^{11}$, $-N(R^{11})COR^{12}$, $-N(R^{11})SO_2R^{12}$, $-CONHCO_2R^{11}$, and $-SO_2NHCO_2R^{11}$, wherein $R^{11}$ and $R^{12}$ are as defined above.

The above-mentioned dissociation-promoting groups are hereinafter described.

In the present invention, the dissociation-promoting group means a group represented by the following general formula ($Z^0$):

$$-Z^1-NH-Z^2- \qquad (Z^0)$$

wherein $Z^1$ and $Z^2$, which may be the same or different, represent $SO_2$ or CO.

When a benzimidazole ring is formed in the present invention, it is preferred that $R^1$, $R^2$, $R^3$ or X contains at least one dissociation-promoting group. Even when a benzimidazole ring is not formed in the present invention, it is preferred that $R^1$, $R^2$, $R^3$ or X contains at least one dissociation-promoting group. Specific examples of the dissociation-promoting groups used in the present invention include $-SO_2NHCO-$, $-SO_2NHSO_2-$, $-CONHCO-$ and $-CONHSO_2-$. Satisfactory results can be obtained when each of these dissociation-promoting groups exist in the substituent group of $R^1$, $R^2$, $R^3$ or X, and preferably in the substituent group of $R^1$, $R^2$ or $R^3$.

$Z^1$ and $Z^2$ of the dissociation-promoting group represented by general formula ($Z^0$) are preferably bound to alkyl, aromatic, amido or heterocyclic groups.

The alkyl group which can be bound to $Z^1$ and/or $Z^2$ is a saturated or unsaturated, chain or cyclic, straight or branched, substituted or unsubstituted aliphatic hydrocarbon group having 1 to 40, preferably 1 to 22 carbon atoms. Specific examples thereof include methyl, ethyl, propyl, isopropyl, butyl, t-butyl, i-butyl, t-amyl, hexyl, cyclohexyl, 2-ethylhexyl, octyl, 1,1,3,3-tetramethylbutyl, decyl, dodecyl, hexadecyl and octadecyl. The aromatic group which can be bound to $Z^1$ and/or $Z^2$ is an aryl group having 6 to 20 carbon atoms, and preferably substituted or unsubstituted phenyl or substituted or unsubstituted naphthyl. The heterocyclic group which can be bound to $Z^1$ and/or $Z^2$ is a substituted or unsubstituted cyclic group containing at least one atom selected from nitrogen, oxygen and sulfur atoms as a heteroatom and having 1 to 20 carbon atoms, and preferably a 3- to 8-membered, substituted or unsubstituted heterocyclic group having 1 to 7 carbon atoms. Typical examples of the heterocyclic group include 2-pyridyl, 4-pyridyl, 2-thienyl, 2-furyl, 2-imidazolyl, pyrazinyl, 2-pyrimidinyl, 1-imidazolyl, 1-indolyl, phthalimido, 1,3,4-thiadiazole-2-yl, benzoxazole-2-yl, 2-quinolyl, 2,4-dioxo-1,3-imidazolidine-5-yl, 2,4-dioxo-1,3-imidazolidine-3-yl, succinimido, 1,2,4-triazole-2-yl and 1-pyrazolyl. These alkyl, aromatic and heterocyclic groups bound to the $Z^1$ side may of course be the alkyl, aromatic and heterocyclic groups defined for $R^1$, $R^2$, $R^3$ and X.

When the above-described aromatic, heterocyclic or alkyl groups further have substituent groups, examples of such substituent groups include halogen atoms (for example, chlorine, fluorine and bromine), alkyl groups (for example, methyl, ethyl, t-octyl, t-amyl, n-nonyl and methoxymethyl), alkoxy groups (for example, methoxy, n-octyloxy, n-decyloxy and n-pentadecyloxy), aryloxy groups (for example, phenoxy and t-octylphenoxy), alkoxycarbonyl groups (for example, methoxycarbonyl, n-dodecyloxycarbonyl and n-hexadecyloxycarbonyl), aryloxycarbonyl groups (for example, phenoxycarbonyl and 2,4-di-t-amylphenoxycarbonyl), sulfonamido groups (for example, methanesulfonamido, n-butanesulfonamido, n-hexadecanesulfonamido and benzenesulfonamido), sulfamoyl groups (for example, N,N-di-n-octylsulfamoyl and N-n-hexadecylsulfamoyl), amino groups (for example, ethylamino and di-n-octylamino), carbamoyl groups (for example, di-n-octylcarbamoyl and diethylcarbamoyl), acylamino groups (for example, 2,4-di-t-amylphenoxyacetamido and n-pentadecylphenoxyacetamido), sulfonyl groups (for example, methylsulfonyl and n-dodecylsulfonyl), a cyano group, aryl groups (for example, phenyl), aralkyl groups (for example, benzyl), a nitro group, a hydroxyl group, a carboxyl group, acyl groups (for example, acetyl) and heterocyclic groups (for example, n-octadecylsuccinimido).

A dissociation accelerating group in the present invention is preferably contained in the substituents of $R^3$ and are particularly preferable group represented by formula (a-1):

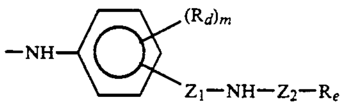

(a-1)

wherein $R_d$ has the same meaning as $R_c$ defined in formula (a), m is 0 and an integer of 1 to 2, $Z_1$ and $Z_2$ each shows the same meaning as those in formula (Z), and $R_e$ represents an alkyl group and an aromatic group.

In general formula (I), X represents a group which is eliminable by reaction with an oxidation product of an aromatic primary amine developing agent. When the coupler is used as a photographically useful group-releasing coupler such as a DIR coupler, X having a photographically useful group or the properties of a precursor should be used.

When the coupler represented by general formula is not used as the photographically useful group-releasing coupler, X is desirably a group represented by the following general formula (II) or (III):

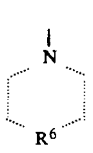

(II)

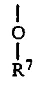

(III)

In general formula (II), $R^6$ represents a group of nonmetallic atoms necessary for forming a 5- or 6-membered ring together with a nitrogen atom bound to an active point. Specific examples of heterocyclic skeletons represented by general formula (II) include the following groups:

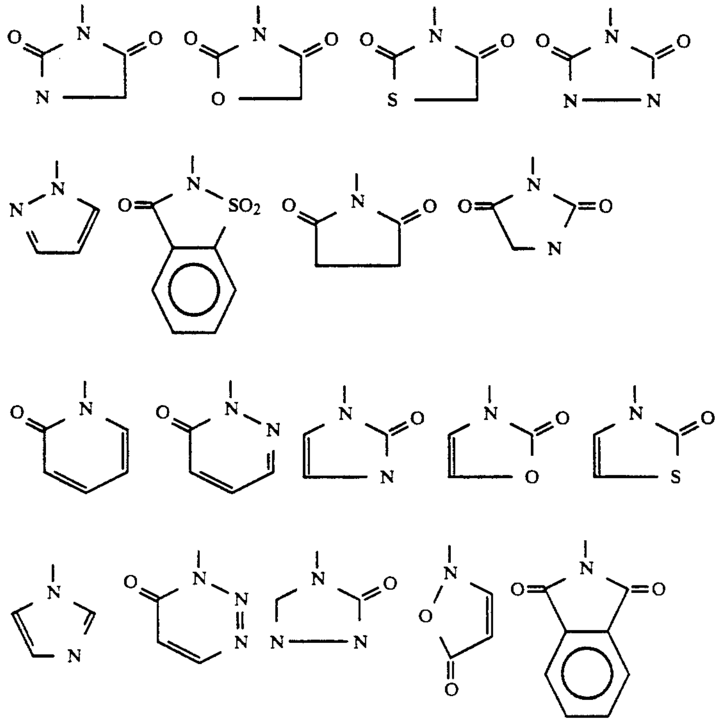

Of these heterocyclic skeletons, a heterocyclic skeleton represented by the following general formula (IV) is particularly preferred:

(IV)

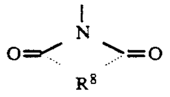

wherein $R^8$ represents a group of nonmetallic atoms necessary for forming a 5-membered heterocyclic group.

Nitrogen and carbon atoms of these heterocyclic group may have substituent groups. Examples of the substituent groups include the same groups as enumerated as the substituent groups for $R^1$ to $R^5$ and $R^{31}$ to $R^{33}$ in general formula (I) and for the heterocyclic groups represented by general formulae (A) and (B).

In general formula (III), $R^7$ represents an alkyl group (preferably having 1 to 20 carbon atoms, for example, methyl, ethyl, propyl, t-butyl, isoamyl or allyl), an aromatic group (preferably having 6 to 10 carbon atoms, for example, phenyl, 1-naphthyl or 2-naphthyl) or a heterocyclic group (preferably having 1 to 10 carbon atoms, for example, 2-furyl, 2-thienyl, 2-pyrrolyl, 2-pyrazolyl, 2-imidazolyl, 2-pyridyl, 2-(1,3-oxazolyl) and 2-pyrimidyl). Of these groups, the aromatic groups are preferable, and the phenyl group is more preferable. $R^7$ may have various substituent groups, and examples of the substituent groups include the same groups as enumerated as the substituent groups for $R^1$ to $R^5$ and $R^{31}$ to $R^{33}$ in general formula (I) and for the heterocyclic rings represented by general formulae (A) and (B).

The couplers represented by general formula (I) are preferably represented by the following general formula (V):

$$A—(L^1)_a—P—(L^2—Q)_b \quad (V)$$

In general formula (V), A represents a coupler group in which X is removed from the coupler represented by general formula (I), and P represents a divalent connecting group showing development restraining activity, which is bound to a coupling position of the coupler directly (when a is 0) or through a linkage group $L^1$ (when a is 1).

In general formula (V), Q represents a substituent group which is bound to P through a linkage group $L^2$ and allows the development restraining activity of P to appear, and the linkage group represented by $L^2$ comprises a chemical bond which is severed in a developing solution.

In general formula (V), a represents 0, 1 or 2. When a is 2, $L^1$s may be the same or different. Subscript b represents an integer of 0 to 2, and preferably 1 or 2. When b is 2, $L^2$s and Qs may each be the same or different.

The coupler represented by general formula (V) is coupled with an oxidation product of the color developing agent, followed by release of $[P-(L^2-Q)_b]^-$ *or* $[L^1—P—(L^2—Q)_b]^-$. As to the latter, $L^1$ is immediately separated to form $[P—(L^2—Q)_b]^-$.

$[P—(L^2—Q)_b]^-$ diffuses into a light-sensitive layer, showing development restraining activity, and is partly effused into the color developing solution. $[P-(L^2—Q)_b]^-$ effused into the solution rapidly decomposes at the position of the chemical bond contained in $L^2$. Specifically, the bond between P and Q is severed; and, a compound having low development restraining activity, in which a water-soluble group is attached to P, remains in the developing solution. Therefore, the development restraining activity of the solution substantially disappears. Thus, no compounds having development restraining activity are accumulated in the developing solution, which makes repeated recycling of the developing solution possible; but, also, the proper amount of the DIR coupler may be added to the photographic material to make repeated recycling possible.

The basic portion of the development restrainer represented by P may be a divalent nitrogen-containing heterocyclic group or a nitrogen-containing heterocyclic thio group. Examples of the heterocyclic thio groups include tetrazolylthio, benzthiazolylthio, benzimidazolylthio, benzoxazolylthio, thiadiazolylthio, oxadiazolylthio, triazolylthio and imidazolylthio. Specific examples of the couplers represented by general formula (V) are shown below together with substituent positions of $A-(L^1)_a-$ and $-(L^2-Q)_b$ groups:

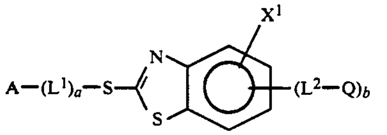

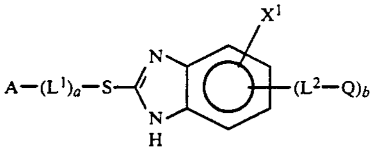

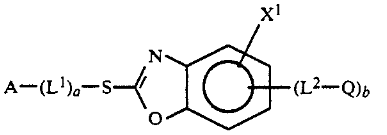

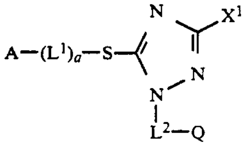

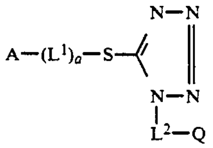

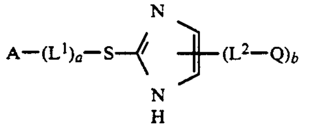

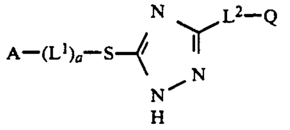

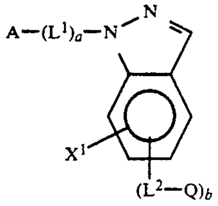

-continued

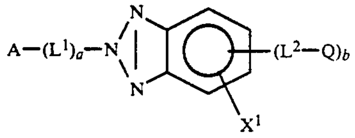

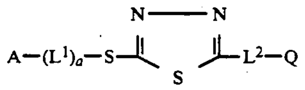

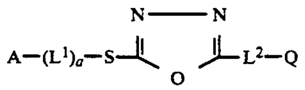

In the above formulae, the substituent group represented by $X^1$ is contained in the P portion in general formula (V), and $X^1$ preferably represents a hydrogen atom, a halogen atom, an alkyl group, an alkenyl group, an alkaneamido group, an alkeneamido group, an alkoxy group, a sulfonamido group or an aromatic group.

Examples of the groups represented by Q in general formula (V) include alkyl groups, cycloalkyl groups, alkenyl groups, cycloalkenyl groups, aromatic groups, aralkyl groups and heterocyclic groups.

The linkage groups represented by $L^1$ in general formula (V) include, for example, the following groups, which are shown together with A and $P-(L^2-Q)_b$:

$A-OCH_2-P-(L^2-Y)_b$ (a linkage group described in U.S. Pat. No. 4,146,396)

$A-SCH_2-P-(L^2-Q)_b$, $A-OCO-P-(L^2-Q)_b$ (linkage groups described in West German Patent (OLS) 2,626,315)

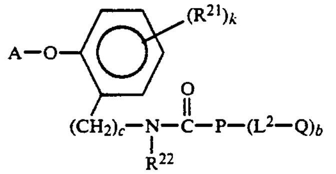

(a linkage group described in West German Patent (OLS) 2,855,697, wherein c represents an integer of 0 to 2.)

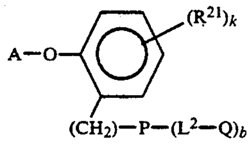

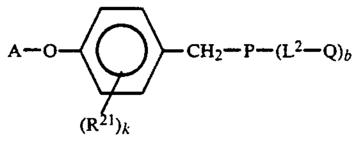

-continued

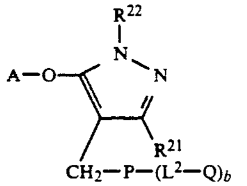

wherein $R^{21}$ represents a hydrogen atom, a halogen atom, an alkyl group, an alkenyl group, an aralkyl group, an alkoxy group, an alkoxycarbonyl group, an anilino group, an acylamino group, an ureido group, a cyano group, a nitro group, a sulfonamido group, a sulfamoyl group, a carbamoyl group, an aryl group, a carboxyl group, a sulfo group, a cycloalkyl group, an alkanesulfonyl group, an arylsulfonyl group or an acyl group; $R^{22}$ represents a hydrogen atom, an alkyl group, an alkenyl group, an aralkyl group, a cycloalkyl group or an aromatic group; k represents 1 or 2; and $R^{21}$s may form a condensed ring with each other when k is 2.

In these DIR couplers (when a is 1 in general formula (V)), eliminable groups released after reaction with the oxidation product of the developing agent immediately decompose to release a development restrainer (H-P-($L^2$-Q)$_b$). The effect of the present invention is therefore identical to that of the DIR couplers not having groups represented by $L^1$ ( when a is 0 in general formula (V)).

In general formula (V), $L^2$ contains a chemical bond which is cleaved in the developing solution. Such chemical bonds include examples shown in the following Table 1. These chemical bonds are cleaved with a nucleophilic reagent such as a hydroxy ion or hydroxylamine, and therefore the effect of the present invention can be obtained.

TABLE 1

| Chemical Bond Contained in $L^2$ | Cleavage Reaction of Bond (Reaction with $^{\ominus}OH$) |
|---|---|
| $-COO-$ | $-COOH + HO-$ |
| $-\overset{H}{N}COO-$ | $-NH_2 + HO-$ |
| $-SO_2O-$ | $-SO_2H + HO-$ |
| $-OCH_2CH_2SO_2-$ | $-OH + CH_2{=}CHSO_2-$ |
| $-O\underset{\underset{O}{\|}}{C}O-$ | $-OH + HO-$ |
| $-NH\underset{\underset{O}{\|}}{C}O-$ | $-NH_2 + HO-$ |

Each of the divalent linkage groups shown in Table 1 is bound to P directly or through an alkylene group and/or a phenylene group, whereas it is bound to Q directly. When it is bound to P through the alkylene group or the phenylene group, the intervening divalent group may contain, for example, an ether linkage, an amide linkage, a carbonyl group, a thioether linkage, a sulfon group, a sulfonamide group and a urea linkage.

Preferred examples of the linkage groups represented by $L^2$ include the following groups, which are shown together with the substituent positions of P $-P-(CH_2)_dCOO-Q$ -continued $-P-(CH_2)_dO\overset{\overset{O}{\|}}{C}-Q$

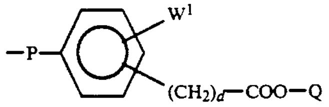

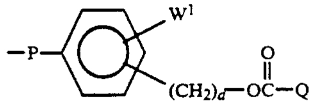

$-P-(CH_2)_d-NHCOO-Q$ $-P-(CH_2)_d-O\overset{\overset{O}{\|}}{C}NH-Q$ $-P-NH\overset{\overset{O}{\|}}{C}-(CH_2)_d\overset{\overset{O}{\|}}{C}O-Q$

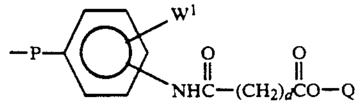

$-P-(CH_2)_pCOOCH_2CH_2SO_2-Q$

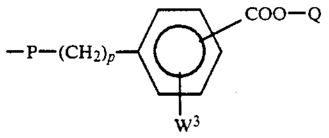

$-P-\underset{\underset{W^2}{|}}{N}COO-Q$ $-P-\underset{\underset{W^2}{|}}{N}-COCO-Q$ wherein d represents an integer of 0 to 10, preferably 0 to 5; $W_1$ represents a hydrogen atom, a halogen atom, an alkyl group having 1 to 10, preferably 1 to 5 carbon atoms, an alkaneamido groups having 1 to 10, preferably 1 to 5 carbon atoms, an alkoxy group having 1 to 10, preferably 1 to 5 carbon atoms, an alkoxycarbonyl group having 1 to 10, preferably 1 to 5 carbon atoms, an aryloxycarbonyl group, an alkanesulfonamido group having 1 to 10, preferably 1 to 5 carbon atoms, an aryl group, a carbamoyl group, an N-alkylcarbamoyl group having 1 to 10, preferably 1 to 5 carbon atoms, a nitro group, a cyano group, an arylsulfonamido group, a sulfamoyl group or an imido group; $W^2$ represents a hydrogen atom, an alkyl group having 1 to 6 carbon atoms, an aromatic group or an alkenyl group; $W^3$ represents a hydrogen atom, a halogen atom, a nitro group, an alkoxy group having 1 to 6 carbon atoms or an alkenyl group; and p represents an integer of 0 to 6.

Specifically, the alkyl group or the alkenyl group represented by $X^1$ or Q is a straight, branched or cyclic chain alkyl or alkenyl group having 1 to 10, preferably 1 to 6 carbon atoms, which preferably has a substituent group. The substituent group is selected from halogen atoms, a nitro group, alkoxy groups having 1 to 4 carbon atoms, aryloxy groups having 6 to 10 carbon atoms, alkanesulfonyl groups having 1 to 4 carbon atoms, arylsulfonyl groups having 6 to 10 carbon atoms, alkaneamido groups having 1 to 5 carbon atoms, an anilino group, a benzamido group, alkyl-substituted carbamoyl groups having 1 to 6 carbon atoms, a carbamoyl group, aryl-substituted carbamoyl groups having 6 to 10 carbon atoms, alkylsulfonamido groups having 1 to 4 carbon atoms, arylsulfonamido groups having 6 to 10 carbon atoms, alkylthio groups having 1 to 4 carbon atoms, arylthio groups having 6 to 10 carbon atoms, a phthalimido group, a succinimido group, an imidazolyl group, a 1,2,4-triazolyl group, a pyrazolyl group, a benztriazolyl group, a furyl group, a benzthiazolyl group, alkylamino groups having 1 to 4 carbon atoms, alkanoyl groups having 1 to 8 carbon atoms, a benzoyl group, alkanoyloxy groups having 1 to 8 carbon atoms, a benzoyloxy group, perfluoroalkyl groups having 1 to 4 carbon atoms, a cyano group, a tetrazolyl group, a hydroxyl group, a carboxyl group, a mercapto group, a sulfo group, an amino group, alkylsulfamoyl groups having 1 to 8 carbon atoms, arylsulfamoyl groups having 6 to 10 carbon atoms, a morpholino group, aryl groups having 6 to 10 carbon atoms, a pyrrolidinyl group, a ureido group, a urethane group, alkoxy-substituted carbonyl groups having 1 to 6 carbon atoms, aryloxy-substituted carbonyl groups having 6 to 10 carbon atoms, an imidazolidinyl group and alkylideneamino groups having 1 to 6 carbon atoms.

The alkaneamido group or the alkeneamido group represented by $X^1$ is specifically a straight, branched or cyclic chain alkaneamido or alkeneamido group having 1 to 10, preferably 1 to 5 carbon atoms, which may have a substituent group. The substituent group is selected from the substituent groups enumerated above for the alkyl group and the alkenyl group.

The alkoxy group represented by $X^1$ is specifically a straight, branched or cyclic chain alkoxy group having 1 to 10, preferably 1 to 5 carbon atoms, which may have a substituent group. The substituent group is selected from the substituent groups enumerated above for the alkyl group and the alkenyl group.

The aromatic group represented by Q is preferably a phenyl or naphthyl group, and the substituent group is selected from the substituent groups enumerated above for the alkyl group and the alkenyl group.

The sulfonamido group represented by $X^1$ is a straight, branched or cyclic chain alkylsulfonamido group having 1 to 10, preferably 1 to 4 carbon atoms, or an arylsulfonamido group having 6 to 10 carbon atoms, which may have a substituent group. The substituent group is selected from the substituent groups enumerated above for the alkyl group and the alkenyl group.

The heterocyclic group represented by $X^1$ or Q is preferably one of 5- to 7-membered rings. Examples of such groups include diazolyl groups (such as 2-imidazolyl and 4-pyrazolyl), triazolyl groups (such as 1,2,4-triazole-3-yl), thiazolyl groups (2-benzothiazole), oxazolyl groups (1,3-oxazole-2-yl), pyrrolyl, pyridyl, diazonyl groups (such as 1,4-diazine-2-yl), triazinyl groups (such as 1,2,4-triazine-5-yl), furyl, diazolinyl groups (such as imidazoline-2-yl), pyrrolinyl and thienyl.

Of the couplers represented by general formula (V), couplers represented by the following general formulae (VI), (VII), (VIII), (IX), (X), (XI) and (XII) are useful. These couplers exhibit strong development restraining activity of eliminated development restrainers, and therefore are preferred.

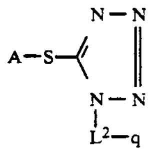
(VI)

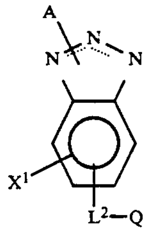
(VII)

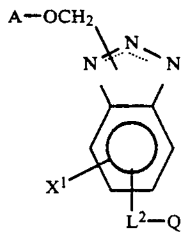
(VIII)

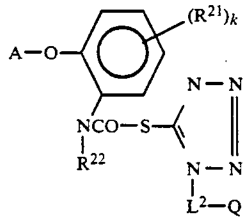
(IX)

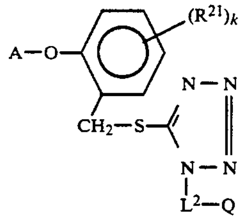
(X)

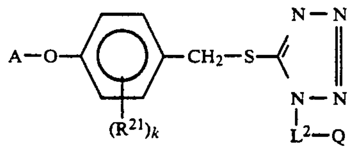
(XI)

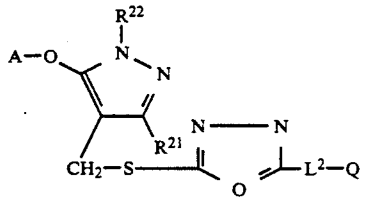
(XII)

A, $L^2$ and Q used in general formulae (VI) to (XII) have the same meanings as already described for general formula (V).

In general formulae (VI) to (XII), $R^{21}$ represents a hydrogen atom, a halogen atom, an alkyl group, an alkenyl group, an aralkyl group, an alkoxy group, an alkoxycarbonyl group, an anilino group, an acylamino group, an ureido group, a cyano group, a nitro group, a sulfonamido group, a sulfamoyl group, a carbamoyl group, an aryl group, a carboxyl group, a sulfo group, a cycloalkyl group, an alkanesulfonyl group, an arylsulfonyl group or an acyl group. In general formula (XII), $R^{22}$ represents a hydrogen atom, an alkyl group, an alkenyl group, an aralkyl group, a cycloalkyl group or an aromatic group. In general formulae (IX) to (XI), k represents 1 or 2, and $R^{21}$s may form a condensed ring with each other when k is 2. Of these couplers, the couplers represented by general formula (VII) are particularly preferred, and couplers represented by the following general formula (XIII) are more preferred.

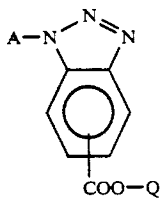

(XIII)

In the couplers represented by general formula (XIII), Q is preferably a phenyl group, a carbamoylmethyl group or an alkoxycarbonylmethyl group, and more preferably a carbamoylmethyl group (having 3 to 10 carbon atoms) or an alkoxycarbonylmethyl group (having 3 to 10 carbon atoms).

Specific examples of the couplers represented by general formula (I) which are used in the present invention include, but are not limited to, the following compounds:

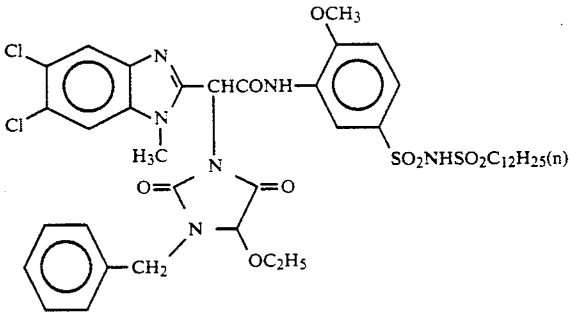

(A-1)

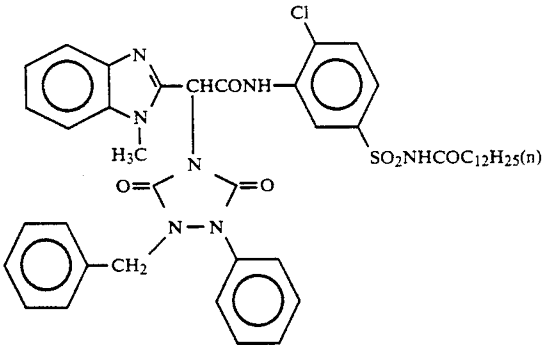

(A-2)

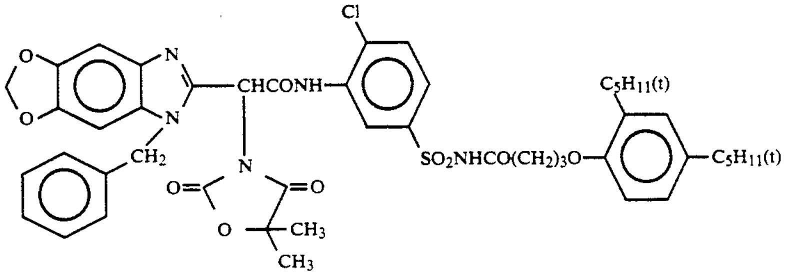

(A-3)

-continued
(A-4)
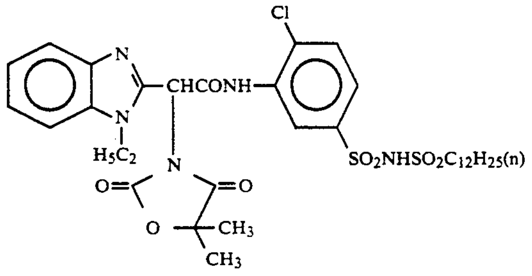
(A-5)
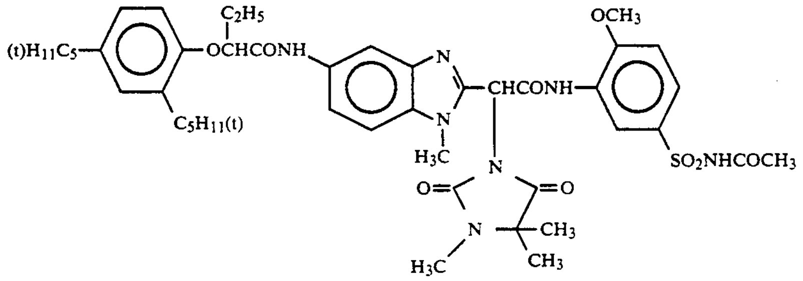
(A-6)
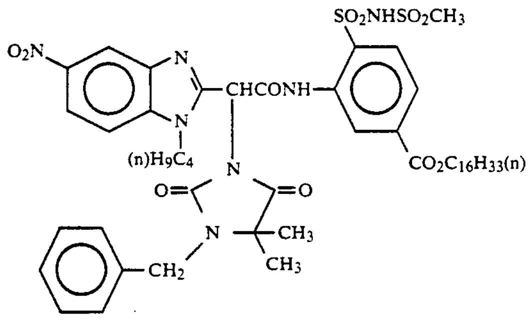
(A-7)
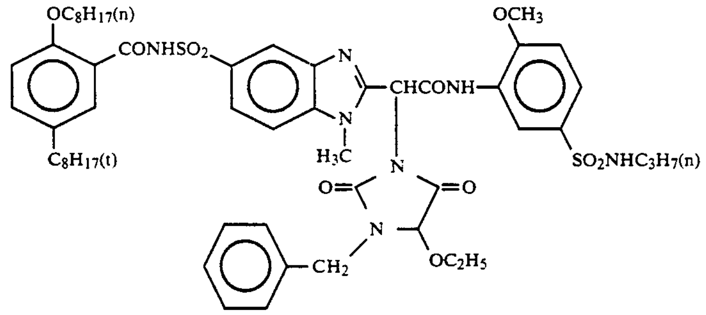
(A-8)
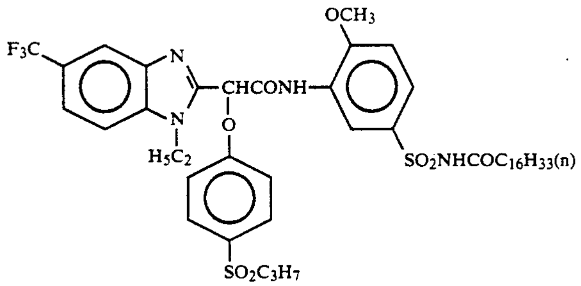

-continued
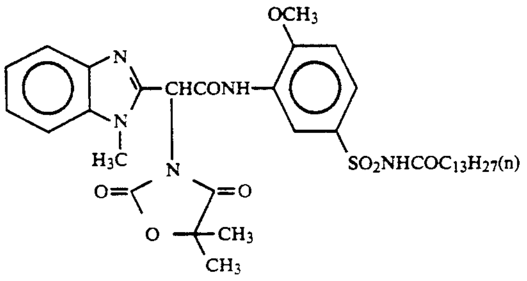
(A-9)
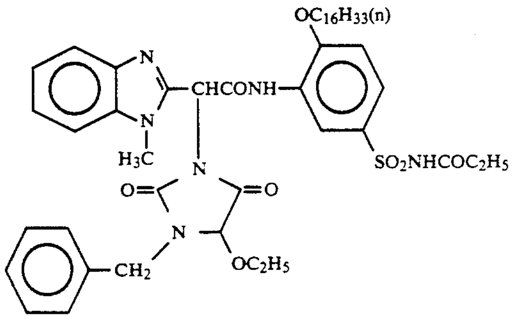
(A-10)
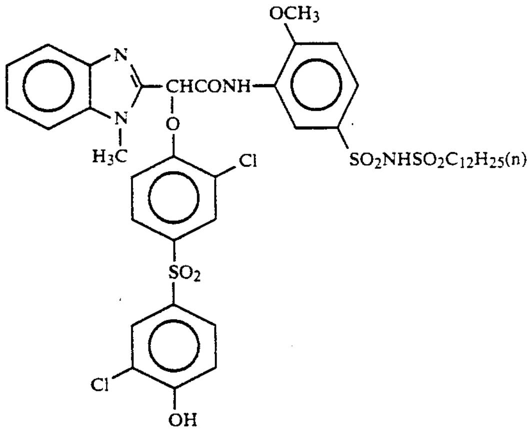
(A-11)
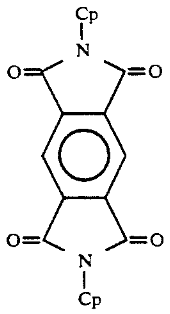
(A-12)
(Cp represents the following group.)
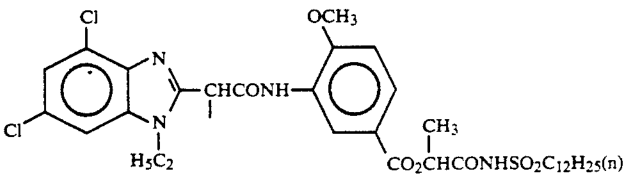

-continued
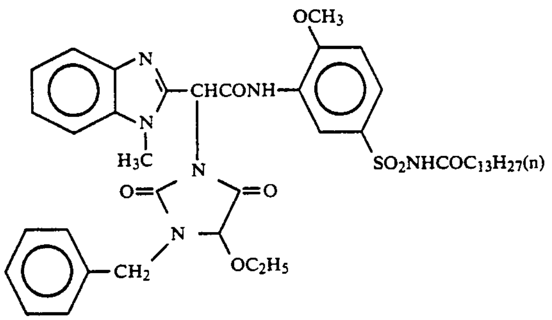
(A-13)
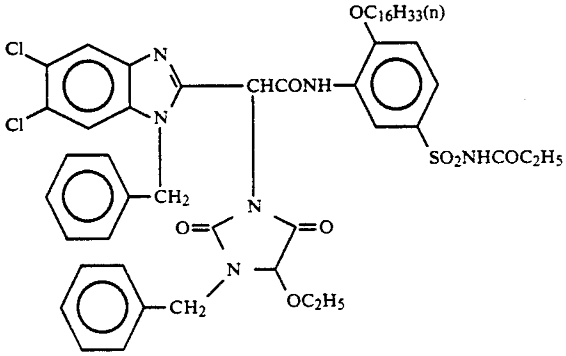
(A-14)
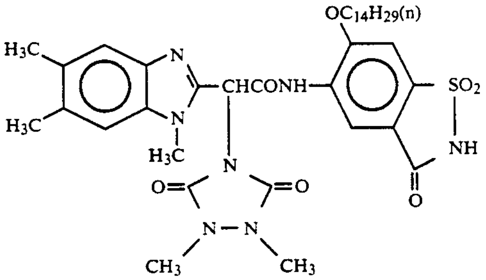
(A-15)
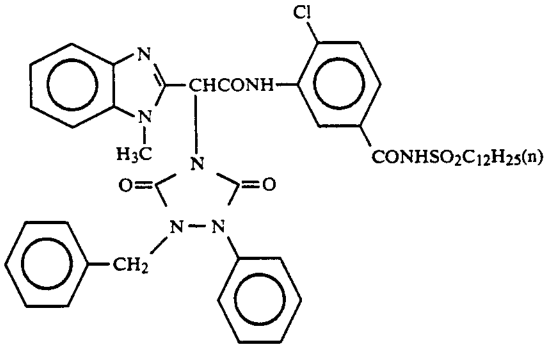
(A-16)
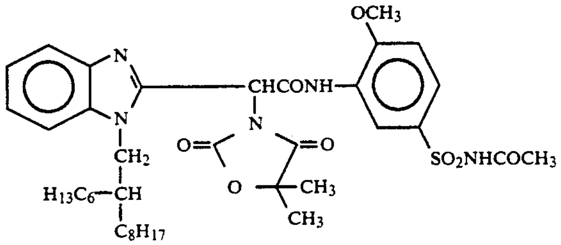
(A-17)

-continued
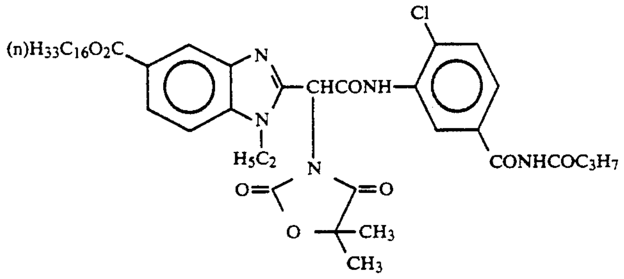
(A-18)
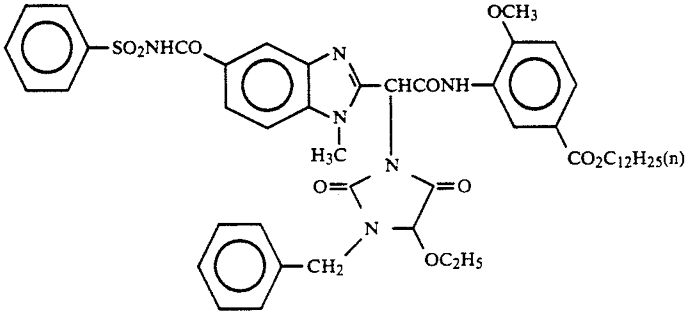
(A-19)
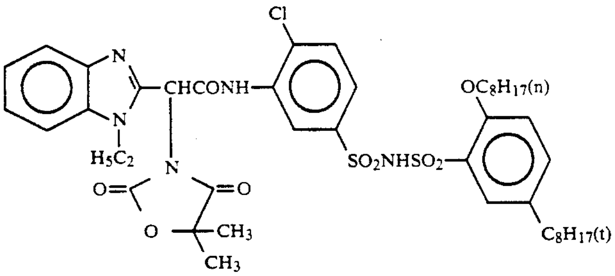
(A-20)
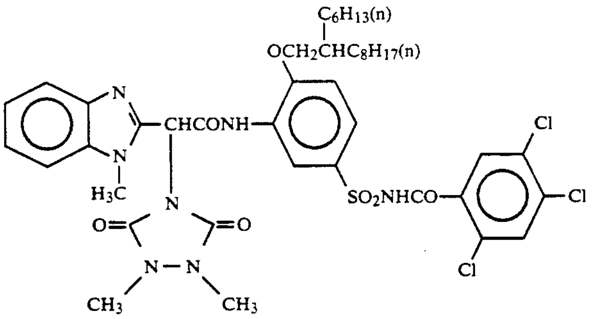
(A-21)
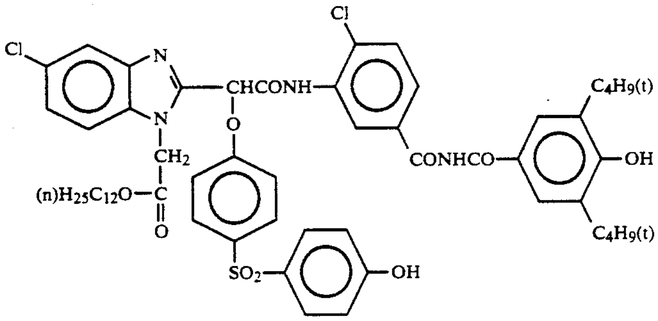
(A-22)

-continued
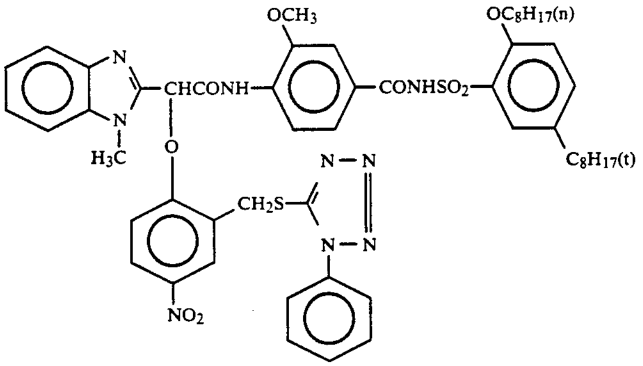
(A-23)
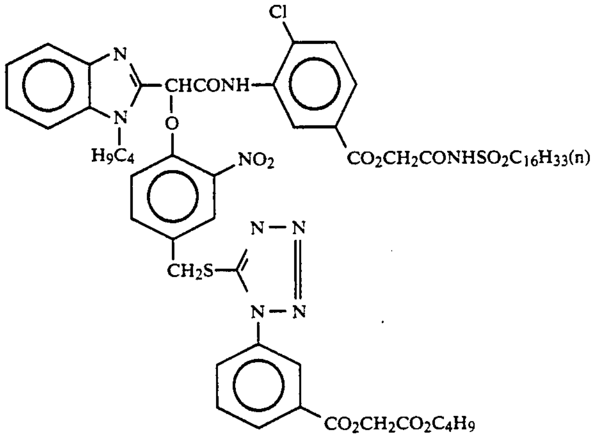
(A-24)
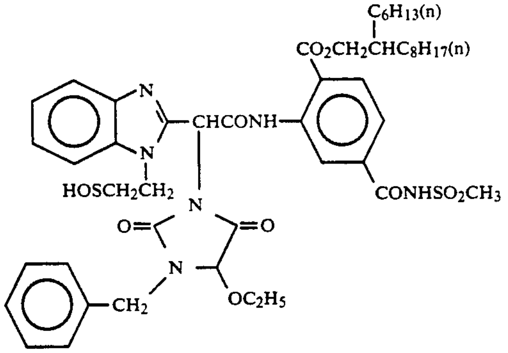
(A-25)
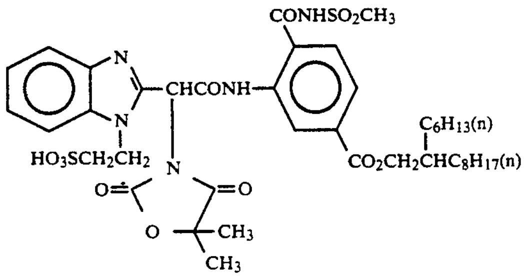
(A-26)

-continued
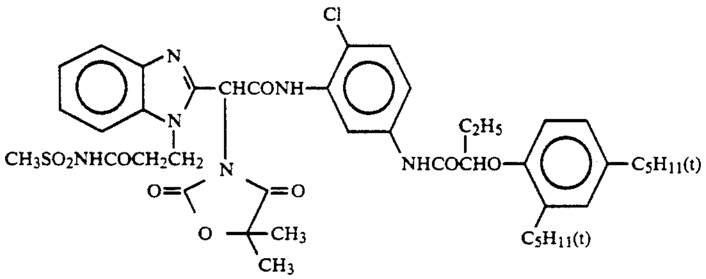
(A-27)
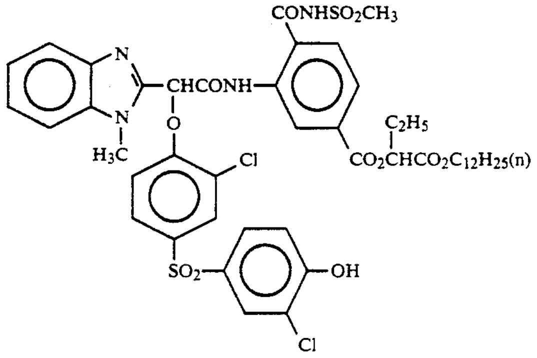
(A-28)
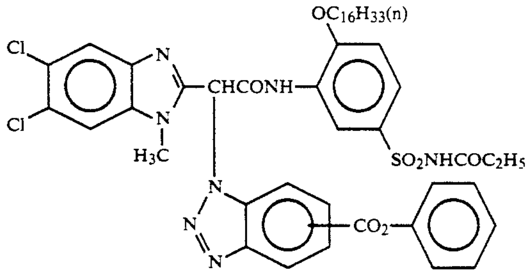
(A-29)
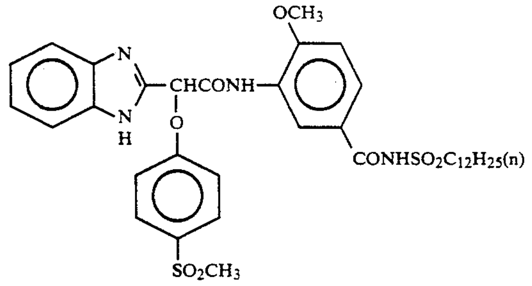
(A-30)
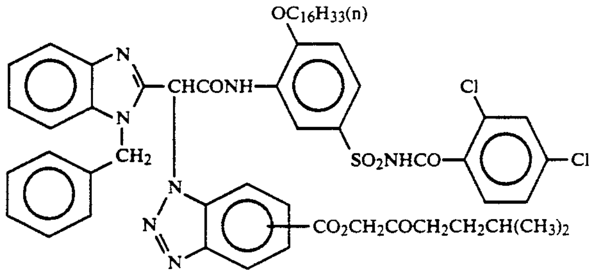
(A-31)

-continued
(A-32)
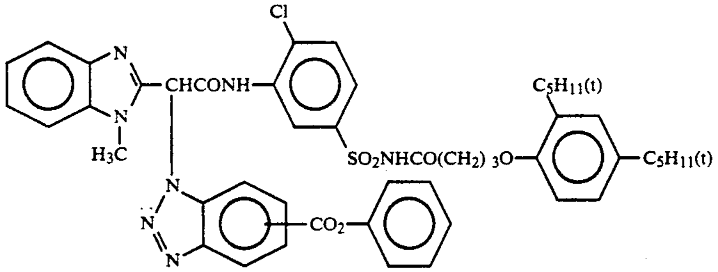
(A-33)
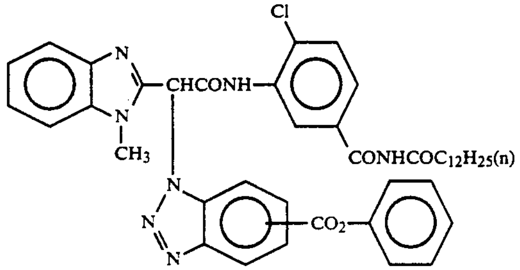
(A-34)
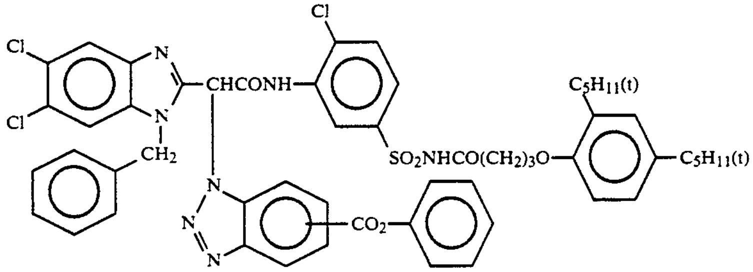
(A-35)
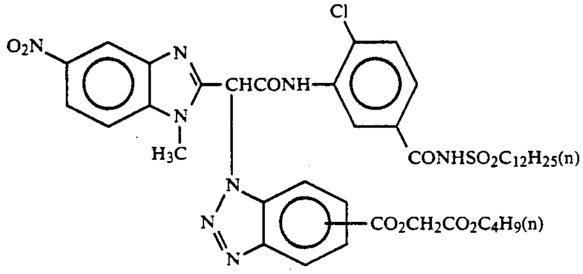
(A-36)
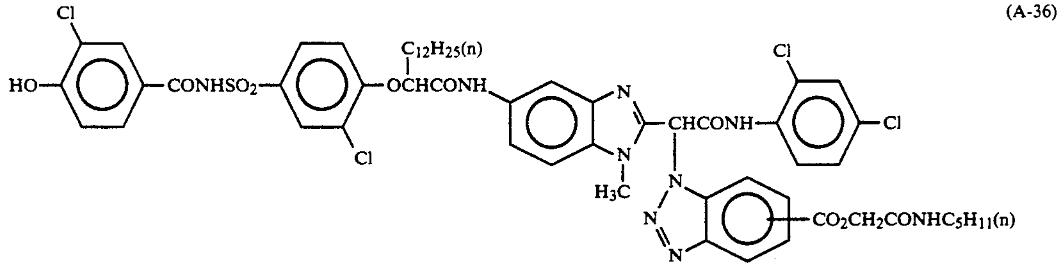
(A-37)
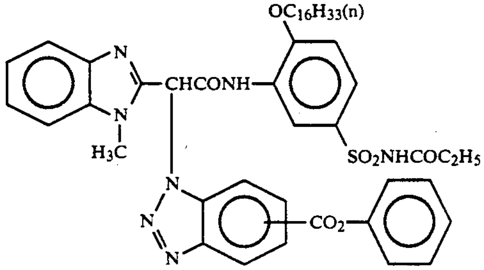

-continued
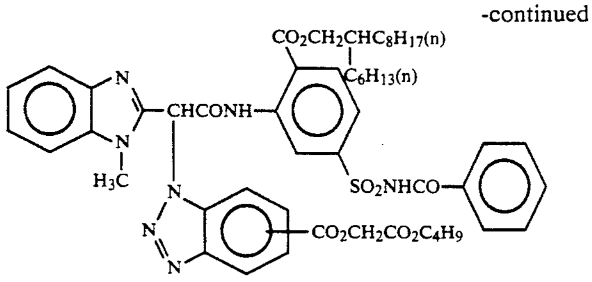
(A-38)
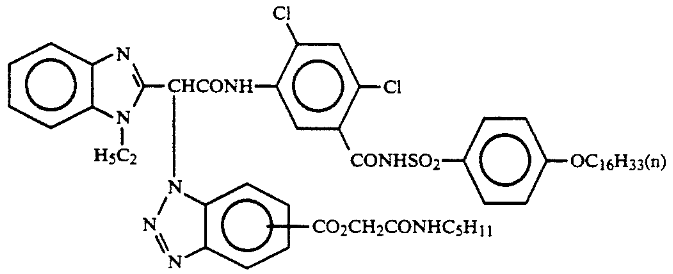
(A-39)
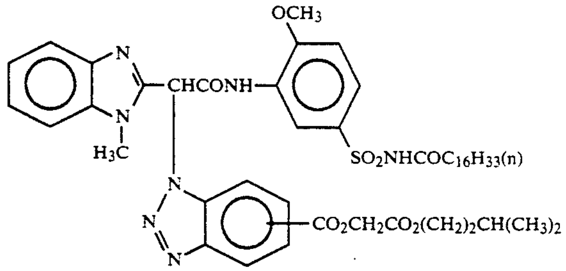
(A-40)
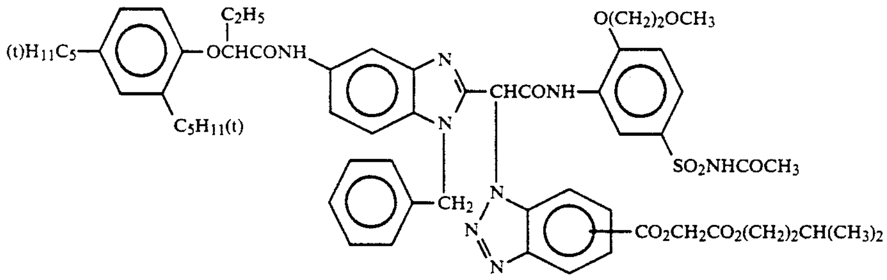
(A-41)
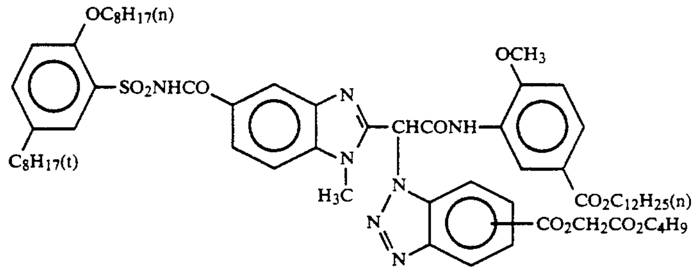
(A-42)
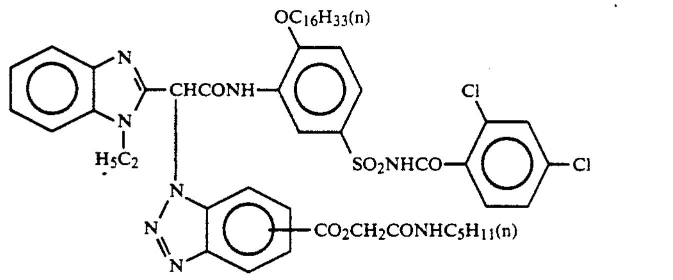
(A-43)

-continued
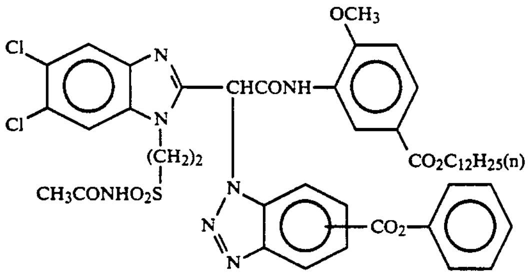
(A-44)
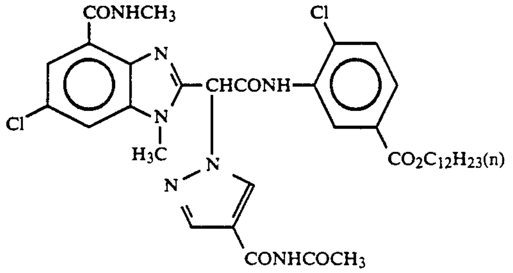
(A-45)
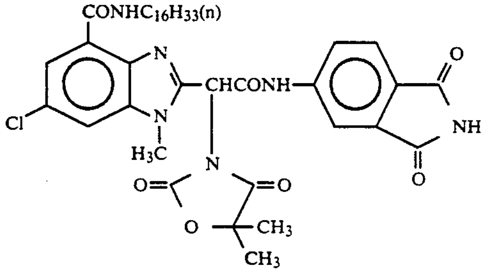
(A-46)
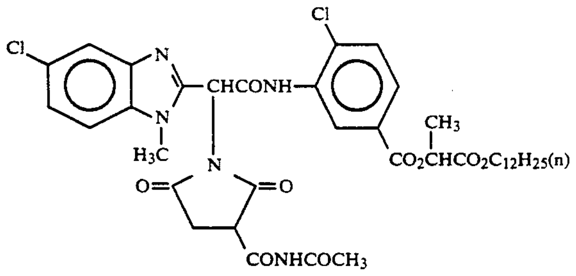
(A-47)
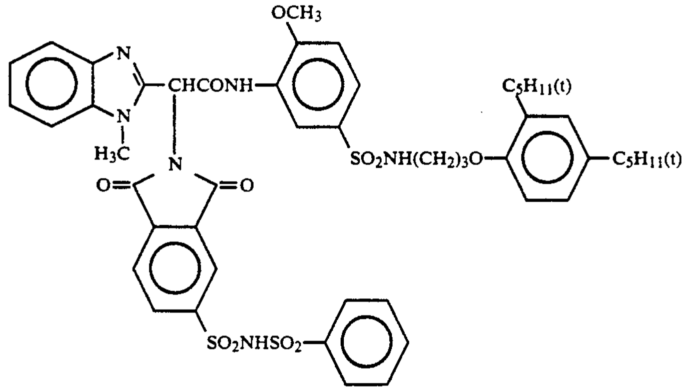
(A-48)

-continued
(A-49)
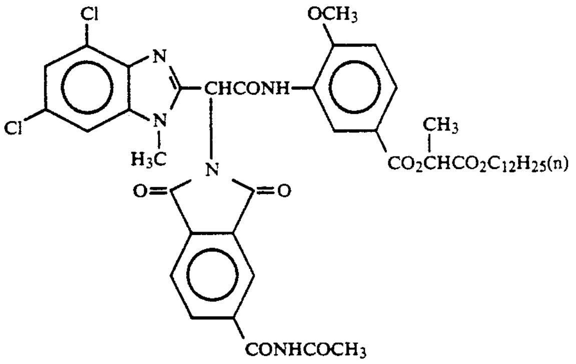
(A-50)
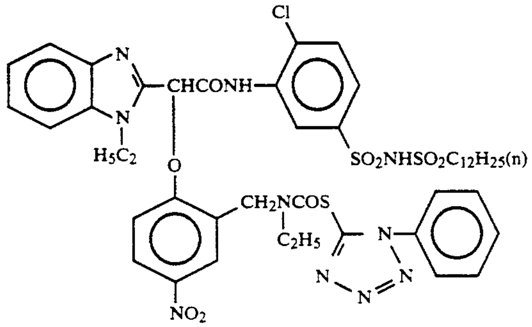
(A-51)
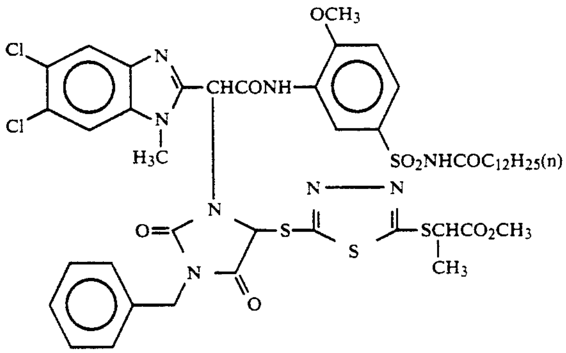
(A-52)
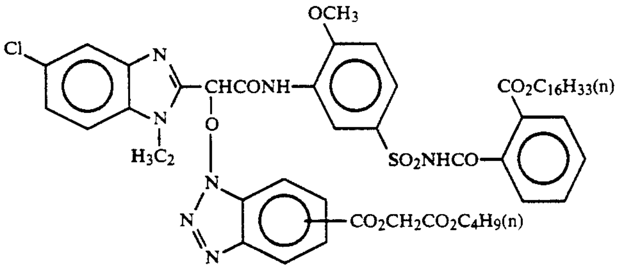
(A-53)
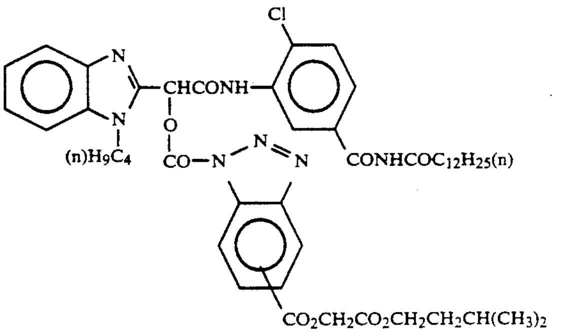

-continued
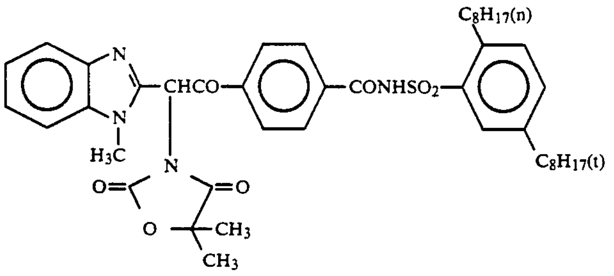
(A-54)
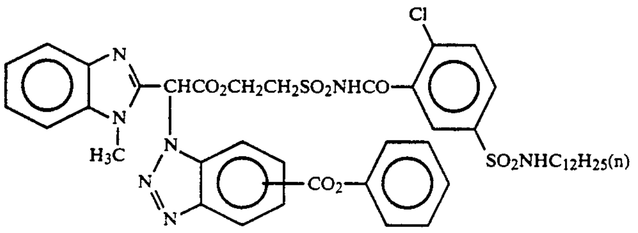
(A-55)
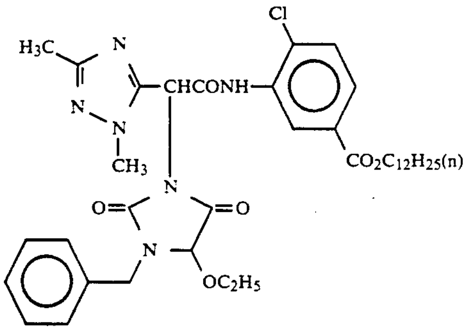
(B-1)
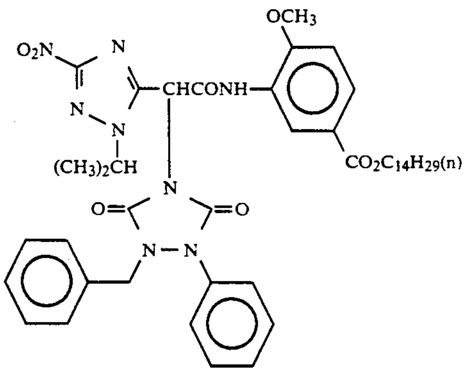
(B-2)
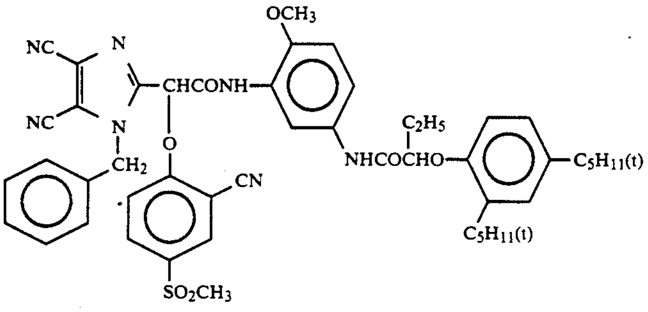
(B-3)

-continued
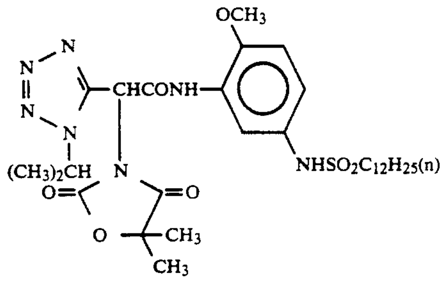
(B-4)
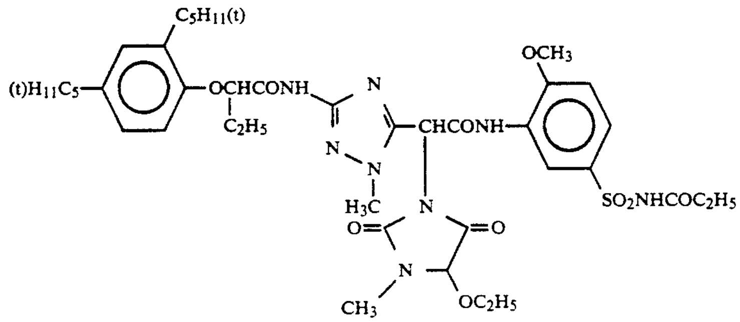
(B-5)
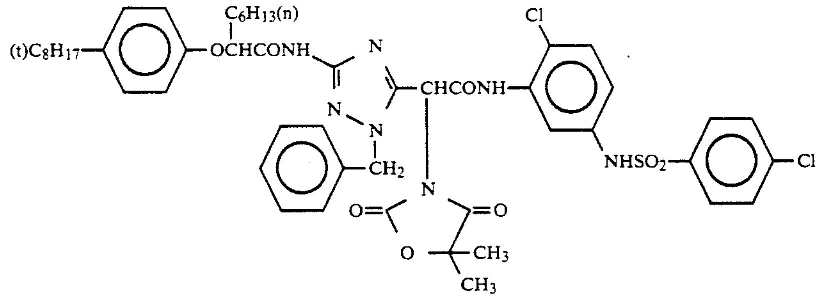
(B-6)
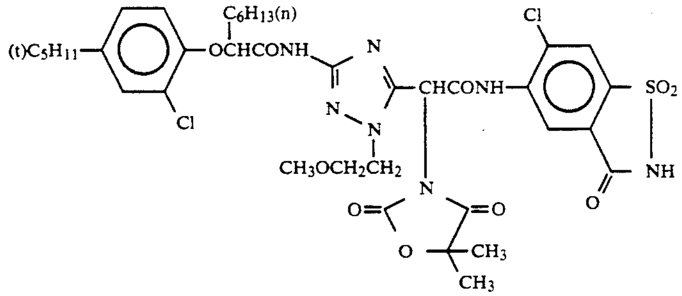
(B-7)
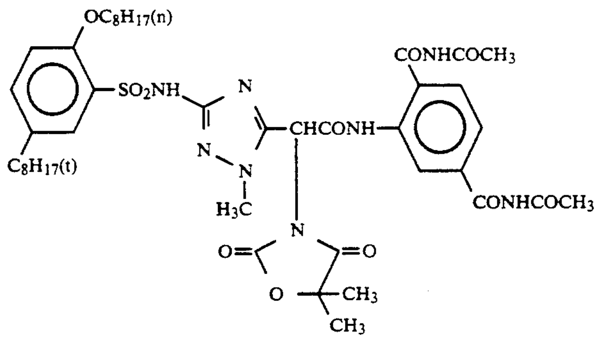
(B-8)

-continued
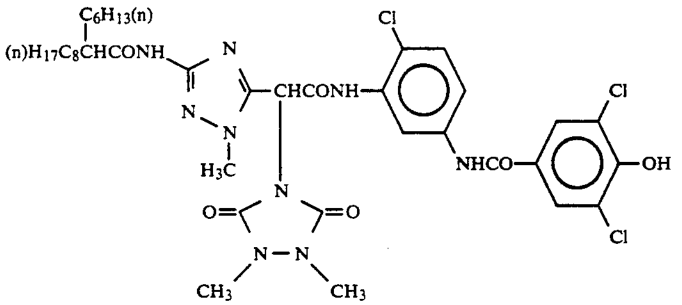
(B-9)
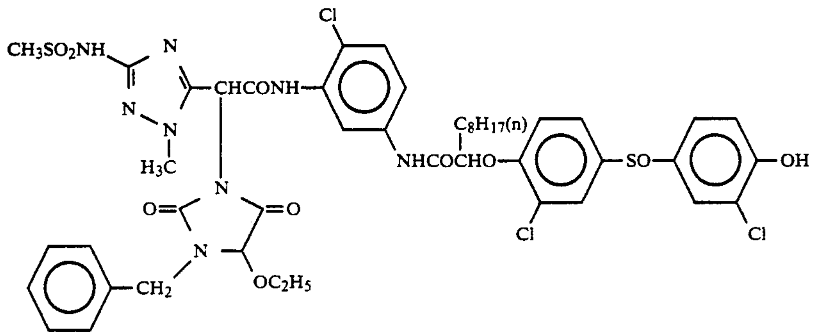
(B-10)
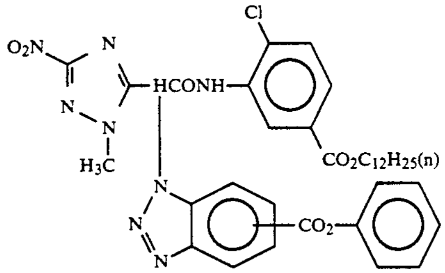
(B-11)
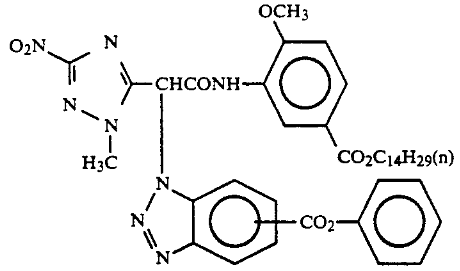
(B-12)
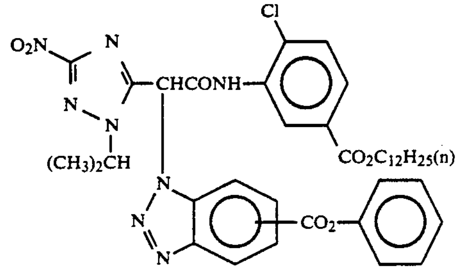
(B-13)

-continued
(B-14)
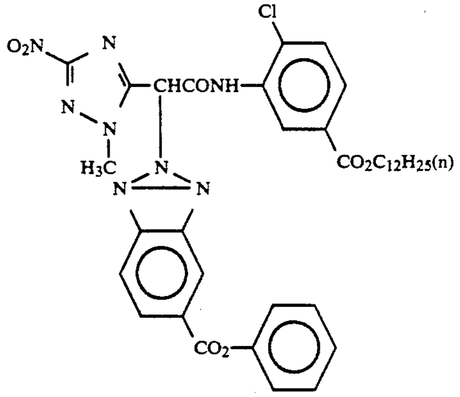
(B-15)
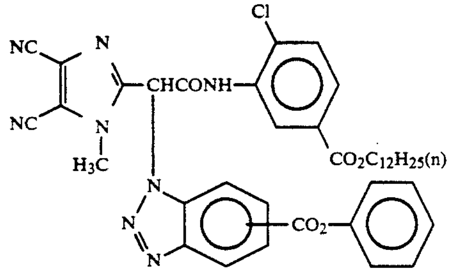
(B-16)
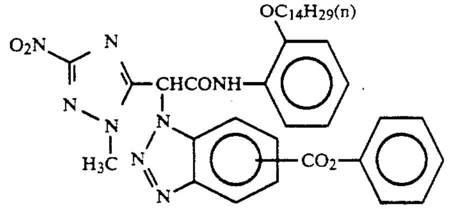
(B-17)
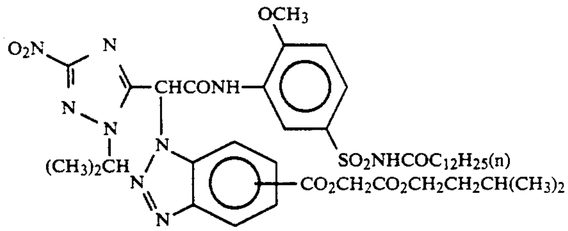
(B-18)
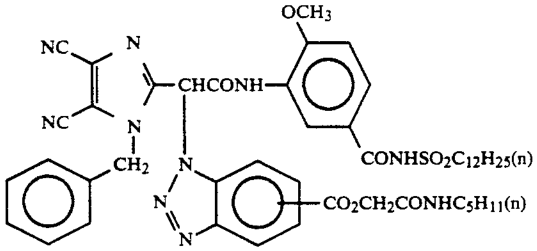
(B-19)
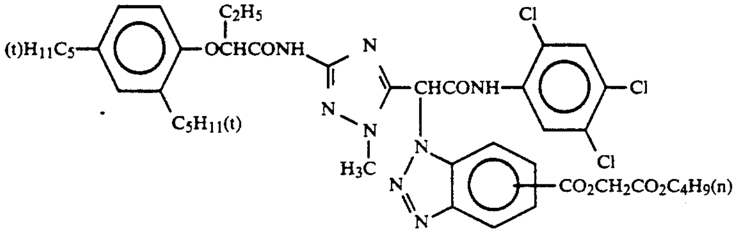

-continued
(B-20)
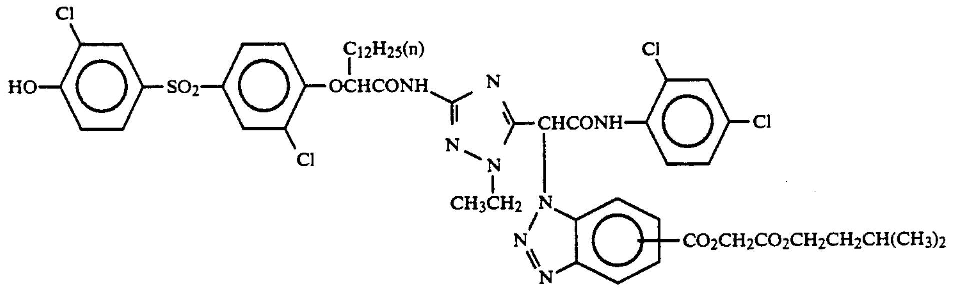
(B-21)
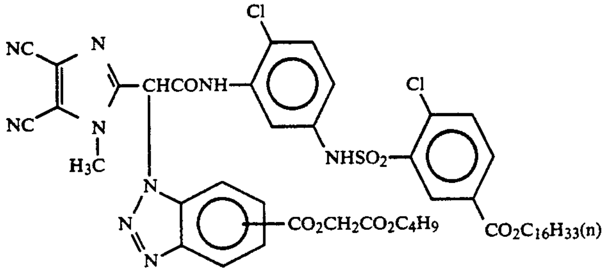
(B-22)
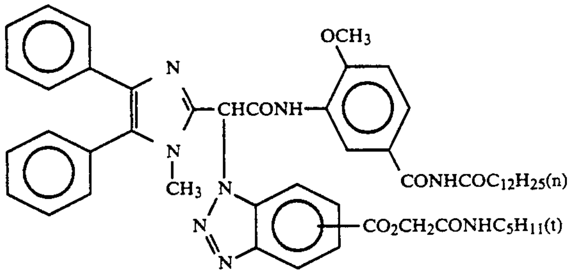
(B-23)
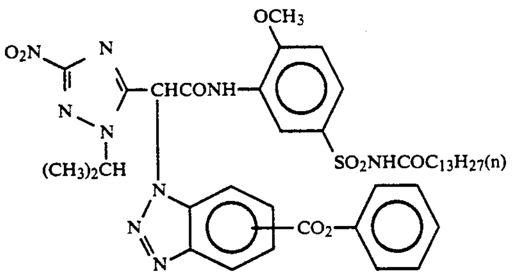
(B-24)
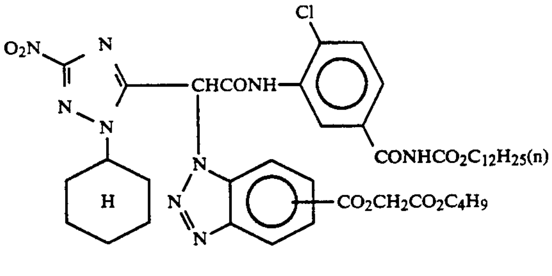
(B-25)
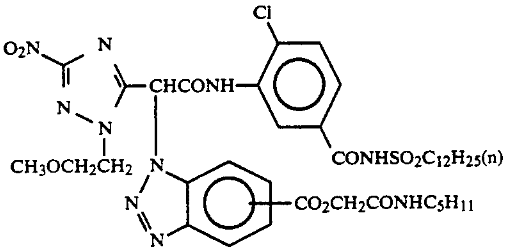

-continued
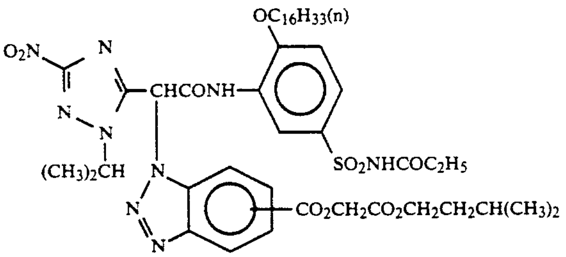
(B-26)
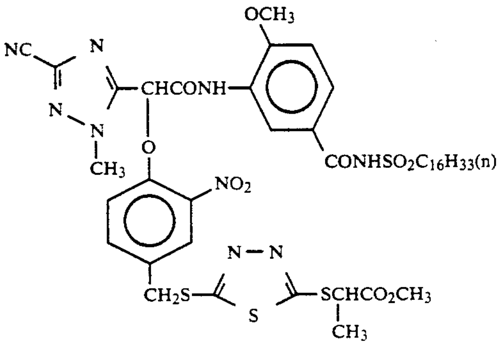
(B-27)
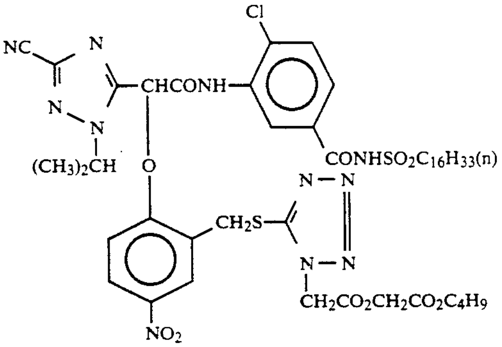
(B-28)
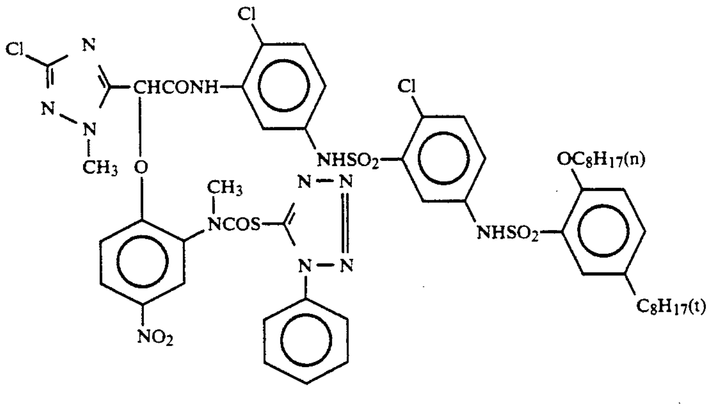
(B-29)

-continued
(B-30)
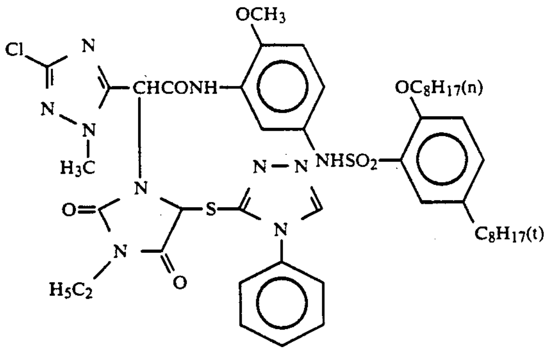
(B-31)
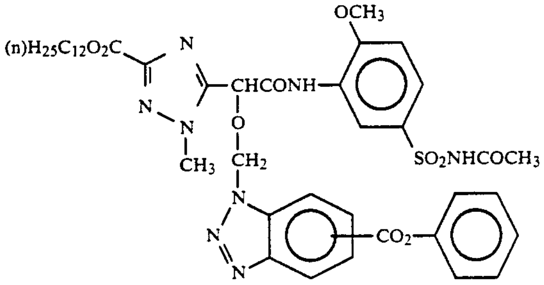
(B-32)
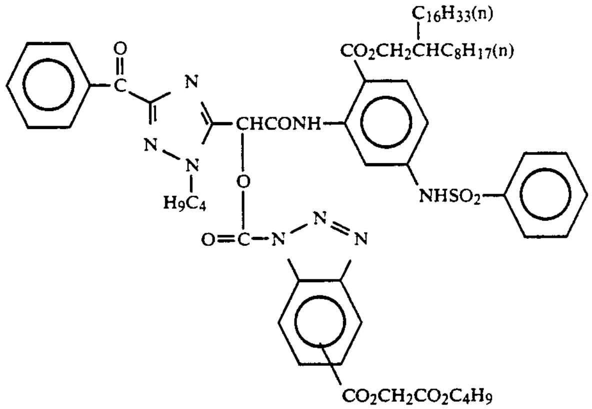
(B-33)
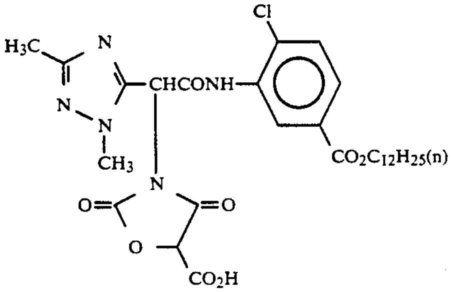

-continued
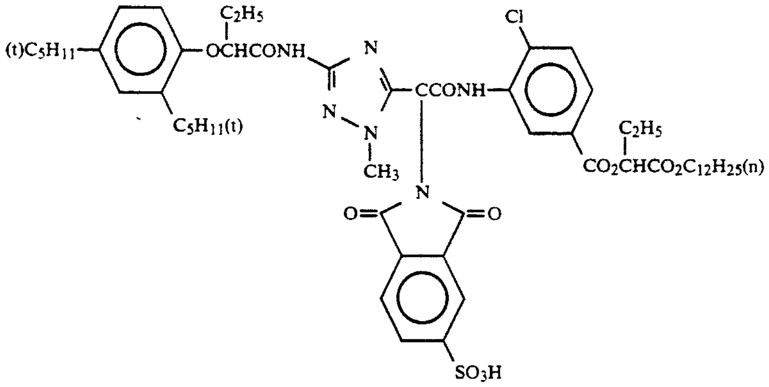
(B-34)
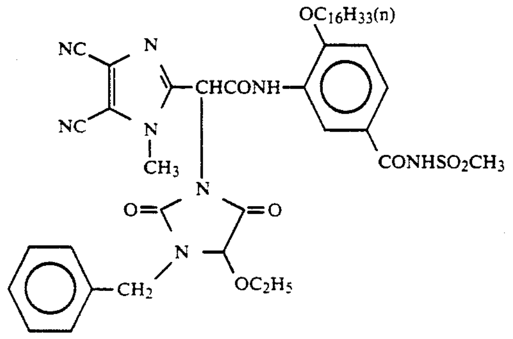
(B-35)
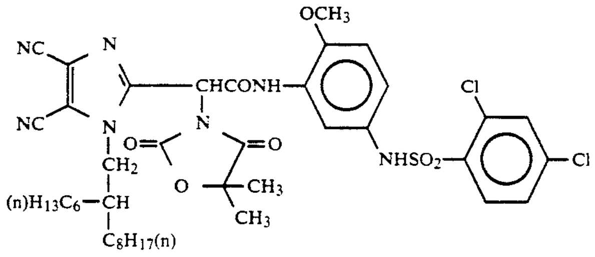
(B-36)
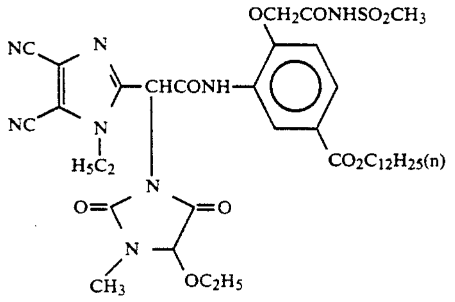
(B-37)
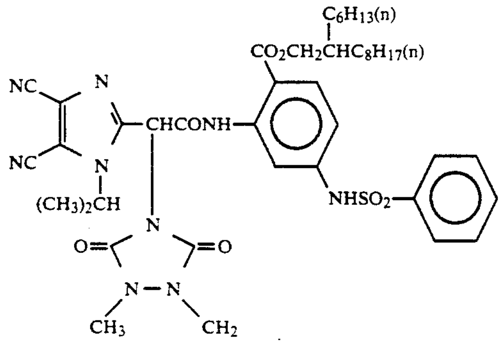
(B-38)

-continued
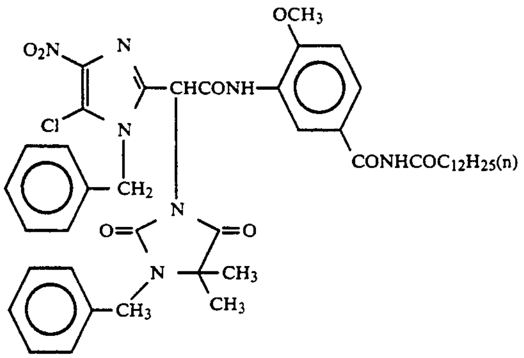
(B-39)
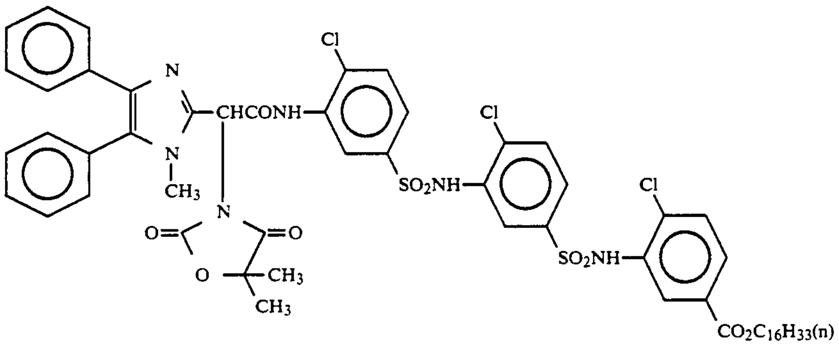
(B-40)
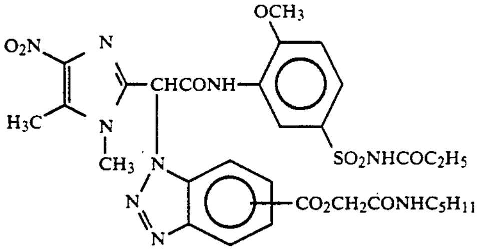
(B-41)
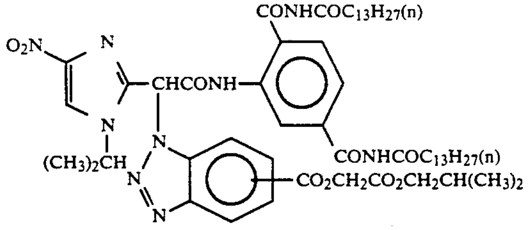
(B-42)
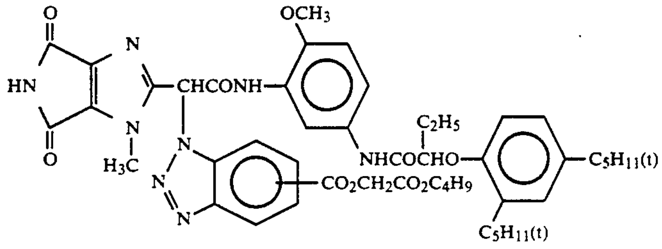
(B-43)

-continued
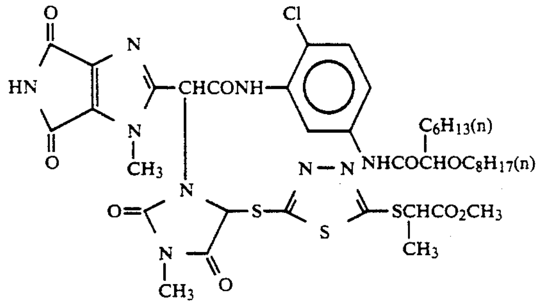
(B-44)
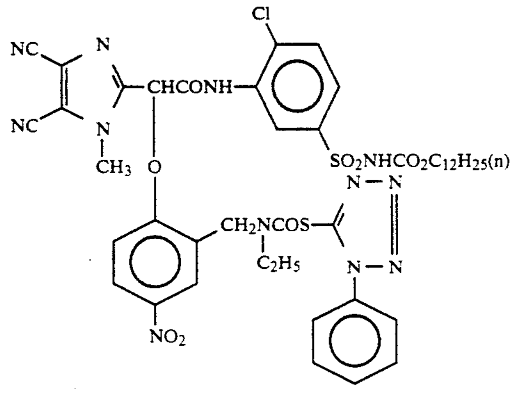
(B-45)
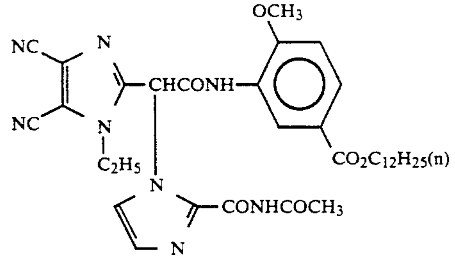
(B-46)
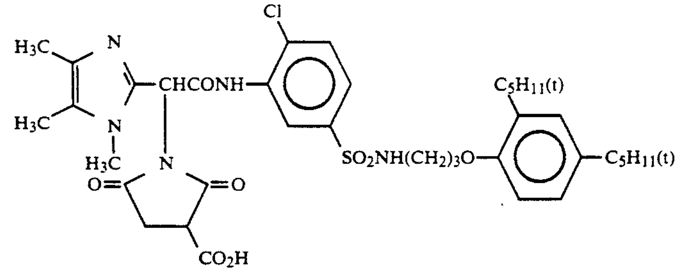
(B-47)
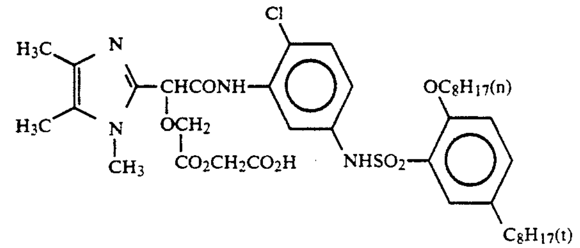
(B-48)

-continued
(B-49)
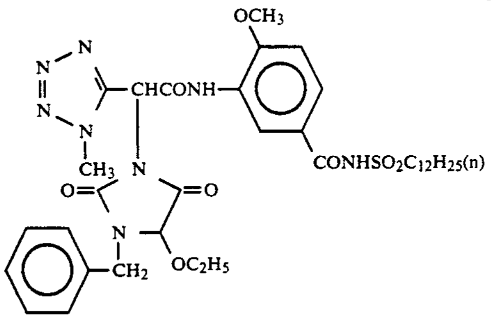
(B-50)
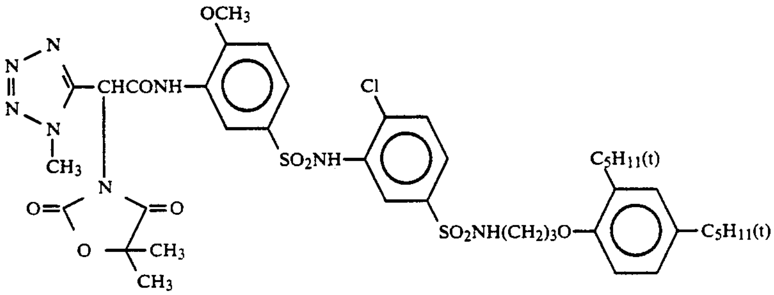
(B-51)
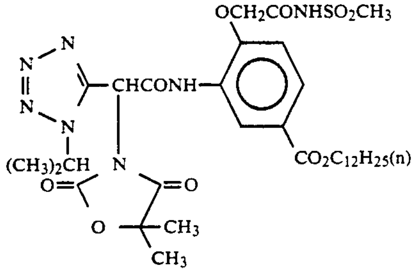
(B-52)
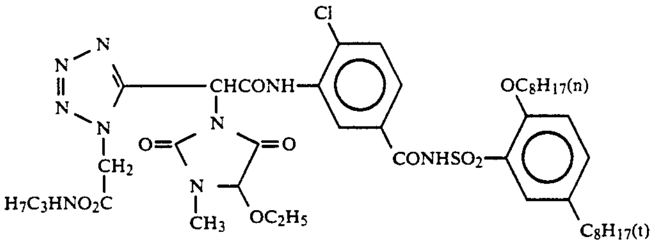
(B-53)
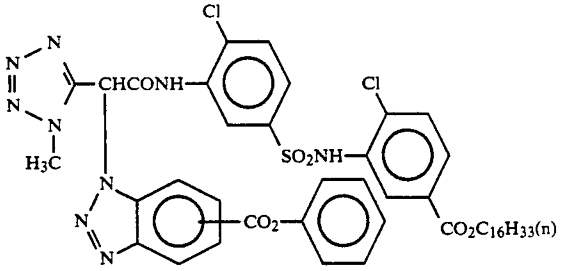
(B-54)
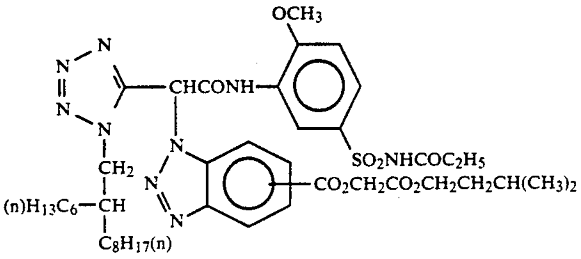

-continued
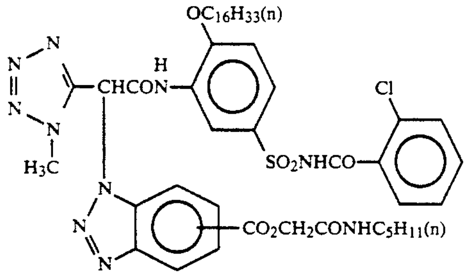
(B-55)
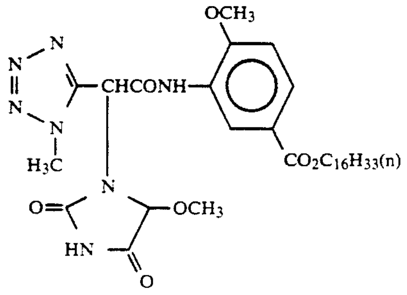
(B-56)
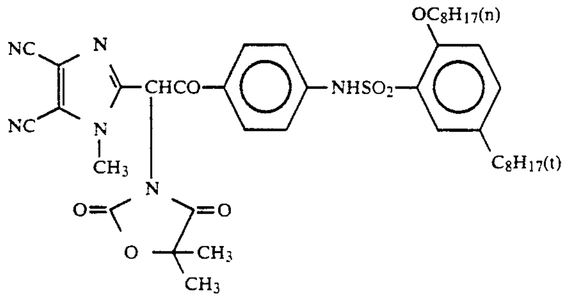
(B-57)
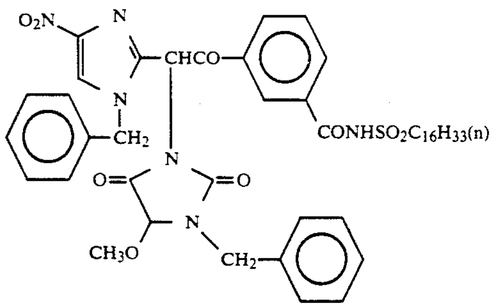
(B-58)
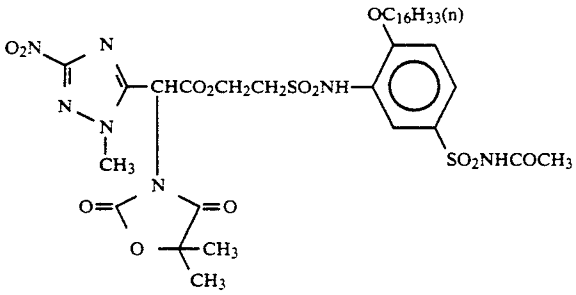
(B-59)

-continued

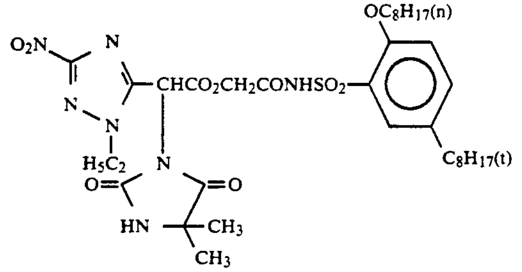

(B-60)

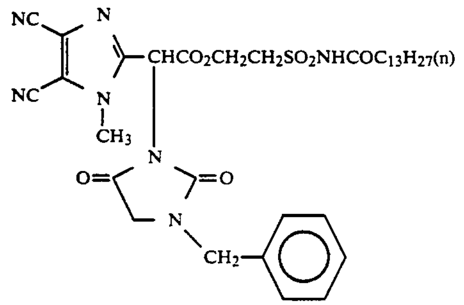

(B-61)

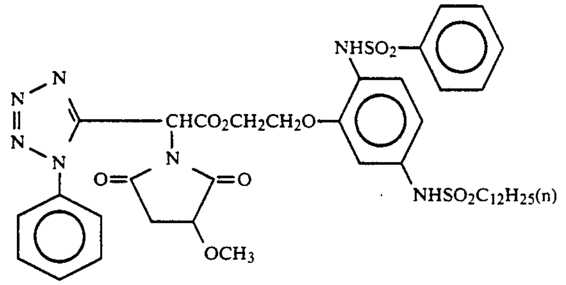

(B-62)

Synthesis examples will hereinafter be described.

SYNTHESIS EXAMPLE 1

Synthesis of Exemplified Compound (A-13)

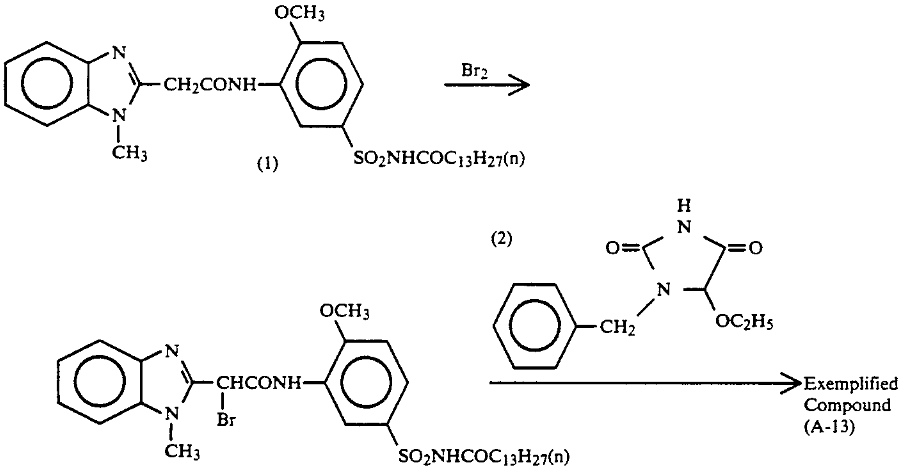

5.0 g of Compound (1) was dissolved in 50 ml of methylene chloride, and 1.5 g of bromine was added dropwise thereto at room temperature for 10 minutes. After reaction at room temperature for 30 minutes, the reaction solution was washed with water and dried on magnesium sulfate. The drying agent was removed by filtration, and the resulting filtrate was added dropwise to a solution of 4.0 g of Compound (2) and 1.7 g of triethylamine in 50 ml of dimethylformamide. After reaction at 40° C. for 1 hour, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 4.9 g of the desired Exemplified Compound (A-13) as a white glassy solid.

SYNTHESIS EXAMPLE 2

Synthesis of Exemplified Compound (A-15)

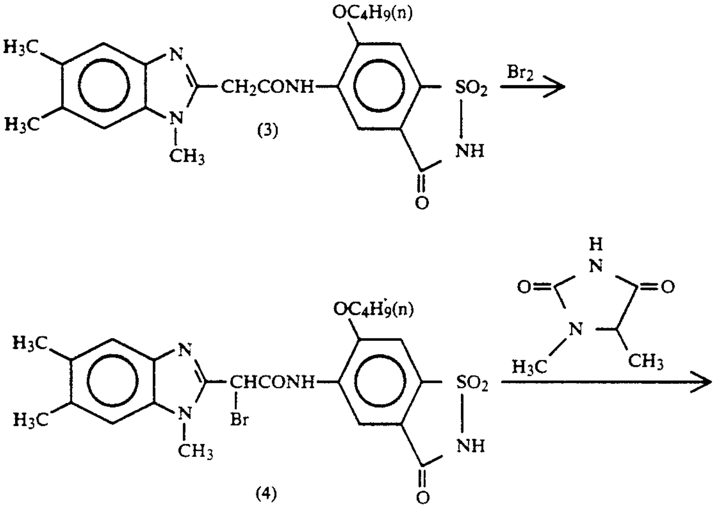

(3)

(4)

Exemplified compound (A-15)

5.0 g of Compound (3) was dissolved in 50 ml of methylene chloride, and 1.4 g of bromine was added dropwise thereto at room temperature for 15 minutes. After reaction at room temperature for 45 minutes, the reaction solution was washed with water and dried on magnesium sulfate. The drying agent was removed by filtration, and the resulting filtrate was added dropwise to a solution of 2.0 g of Compound (4) and 1.6 g of triethylamine in 50 ml of dimethylformamide. After reaction at 45° C. for 3 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 4.9 g of the desired Exemplified Compound (A-15) as a white glassy solid.

SYNTHESIS EXAMPLE 3

Synthesis of Exemplified Compound (A-18)

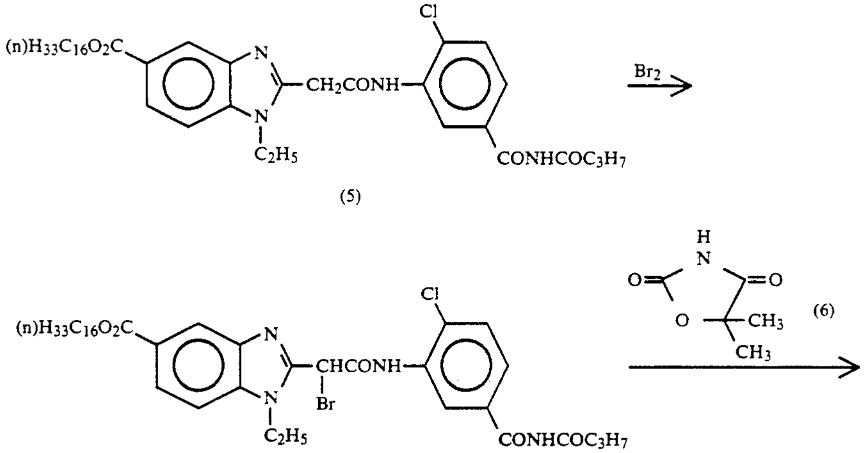

(5)

(6)

Exemplified Compound (A-18)

6.0 g of Compound (5) was dissolved in 60 ml of methylene chloride, and 1.4 g of bromine was added dropwise thereto at room temperature for 20 minutes. After reaction at room temperature for 40 minutes, the reaction solution was washed with water and dried on magnesium sulfate. The drying agent was removed by filtration, and the resulting filtrate was added dropwise to a solution of 2.3 g of Compound (6) and 1.8 g of triethylamine in 50 ml of dimethylformamide. After reaction at 45° C. for 2 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 6.1 g of the desired Exemplified Compound (A-18) as a glassy solid.

SYNTHESIS EXAMPLE 4

Synthesis of Exemplified Compound (A-37)

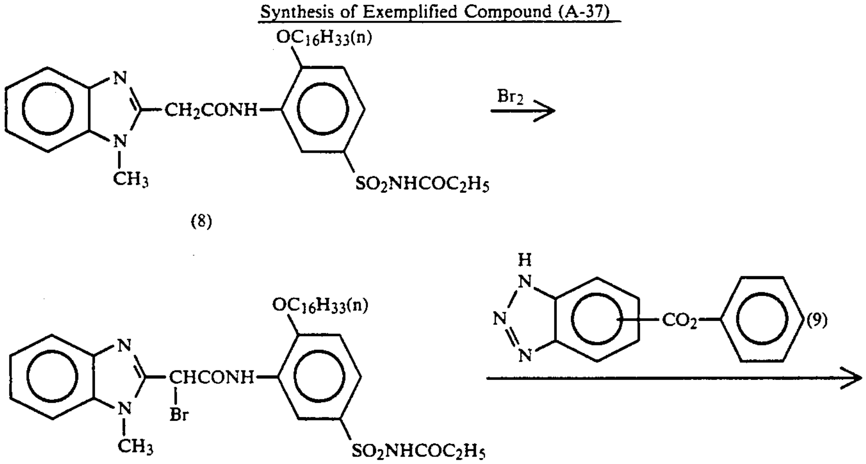

(8)

(9)

Exemplified Compound (A-37)

15.0 g of Compound (8) was dissolved in 150 ml of methylene chloride, and 4.1 g of bromine was added dropwise thereto at room temperature for 20 minutes. After reaction at room temperature for 50 minutes, the reaction solution was washed with water and dried on magnesium sulfate. The drying agent was removed by filtration, and the resulting filtrate was added dropwise to a solution of 11.2 g of Compound (9) and 4.7 g of triethylamine in 150 ml of dimethylformamide. After reaction at room temperature for 3 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was crystallized out of a mixed solvent of isopropyl alcohol and ethyl acetate to obtain 12.2 g of the desired Exemplified Compound (A-37) as pale yellow crystals with a melting point of 155°-159° C.

SYNTHESIS EXAMPLE 5

Synthesis of Exemplified Compound (A-40)

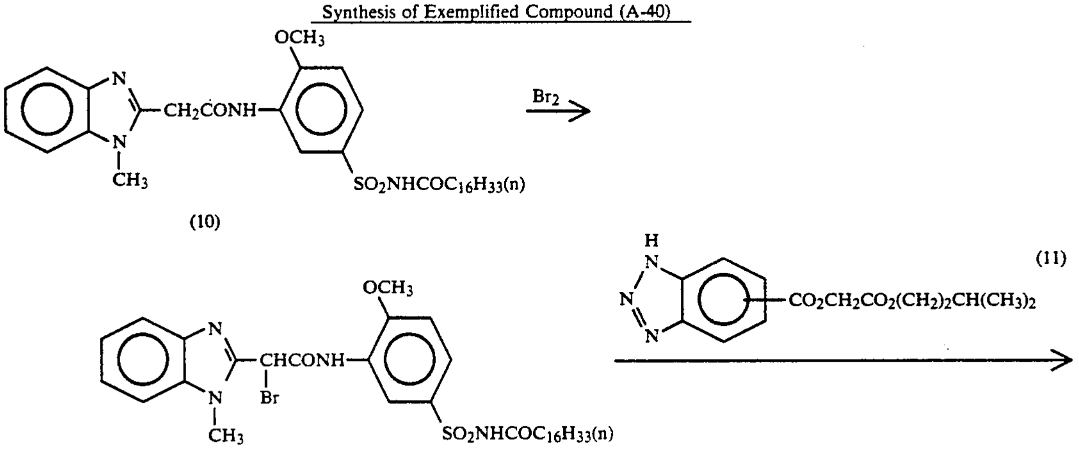

(10)

(11)

Exemplified Compound (A-40)

6.4 g of Compound (10) was dissolved in 60 ml of methylene chloride, and 1.8 g of bromine was added dropwise thereto at room temperature for 15 minutes. After reaction at room temperature for 40 minutes, the reaction solution was washed with water and dried on magnesium sulfate. The drying agent was removed by filtration, and the resulting filtrate was added dropwise to a solution of 6.0 g of Compound (11) and 2.1 g of triethylamine in 60 ml of dimethylformamide. After reaction at room temperature for 4 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 5.5 g of the desired Exemplified Compound (A-40) as a pale yellow glassy solid.

SYNTHESIS EXAMPLE 6

Synthesis of Exemplified Compound (A-44)

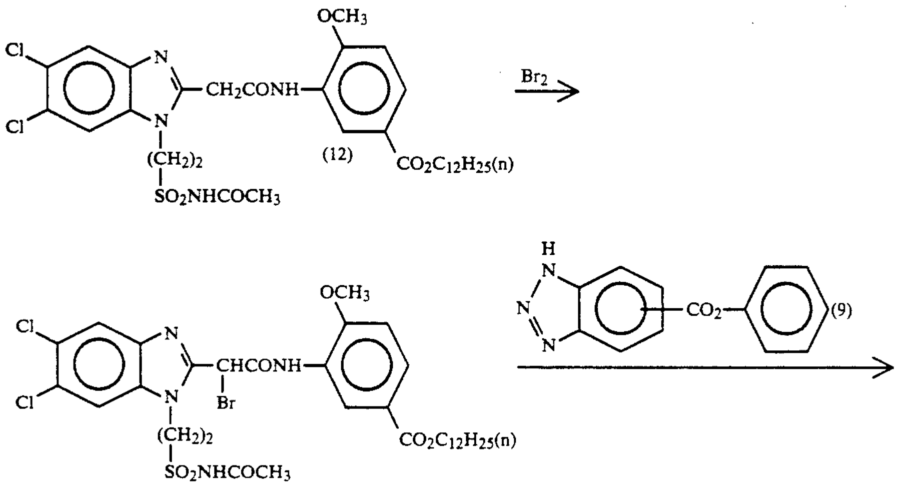

Exemplified Compound (A-44)

5.0 g of Compound (12) was dissolved in 50 ml of methylene chloride, and 1.3 g of bromine was added dropwise thereto at room temperature for 15 minutes. After reaction at room temperature for 30 minutes, the reaction solution was washed with water and dried on magnesium sulfate. The drying agent was removed by filtration, and the resulting filtrate was added dropwise to a solution of 3.4 g of Compound (9) and 1.5 g of triethylamine in 50 ml of dimethylformamide. After reaction at 35° C. for 2 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 4.3 g of the desired Exemplified Compound (A-44) as a white glassy solid.

SYNTHESIS EXAMPLE 7

Synthesis of Exemplified Compound (B-5)

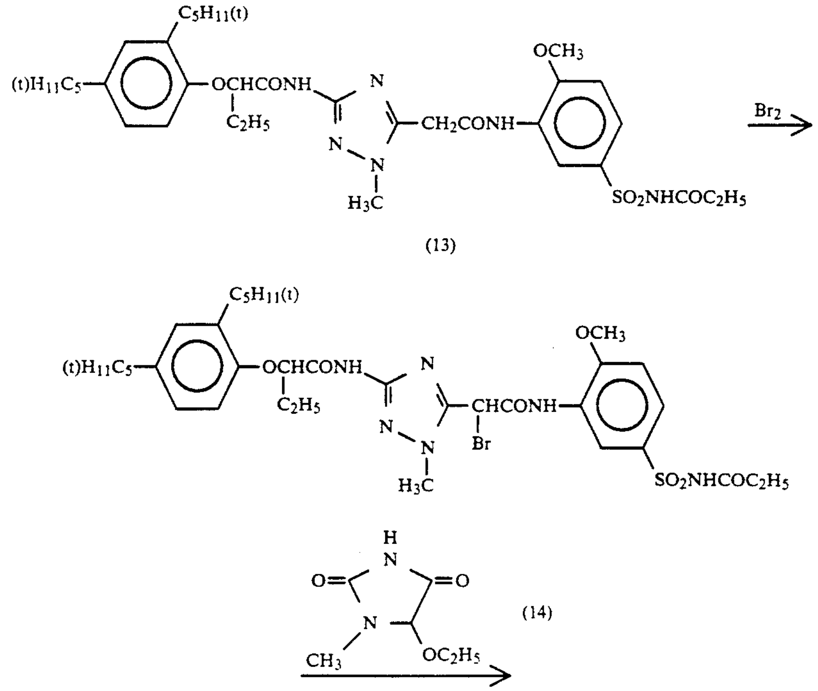

-continued
Synthesis of Exemplified Compound (B-5)

Exemplified Compound (B-5)

8.5 g of Compound (13) was dissolved in 85 ml of methylene chloride, and 2.2 g of bromine was added dropwise thereto at room temperature for 10 minutes. After reaction at room temperature for 40 minutes, the reaction solution was washed with water and dried on magnesium sulfate. The drying agent was removed by filtration, and the resulting filtrate was added dropwise to a solution of 3.8 g of Compound (14) and 2.5 g of triethylamine in 85 ml of dimethylformamide. After reaction at 40° C. for 2 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 5.2 g of the desired Exemplified Compound (B-5) as a pale yellow glassy solid.

SYNTHESIS EXAMPLE 8

Synthesis of Exemplified Compound (B-10)

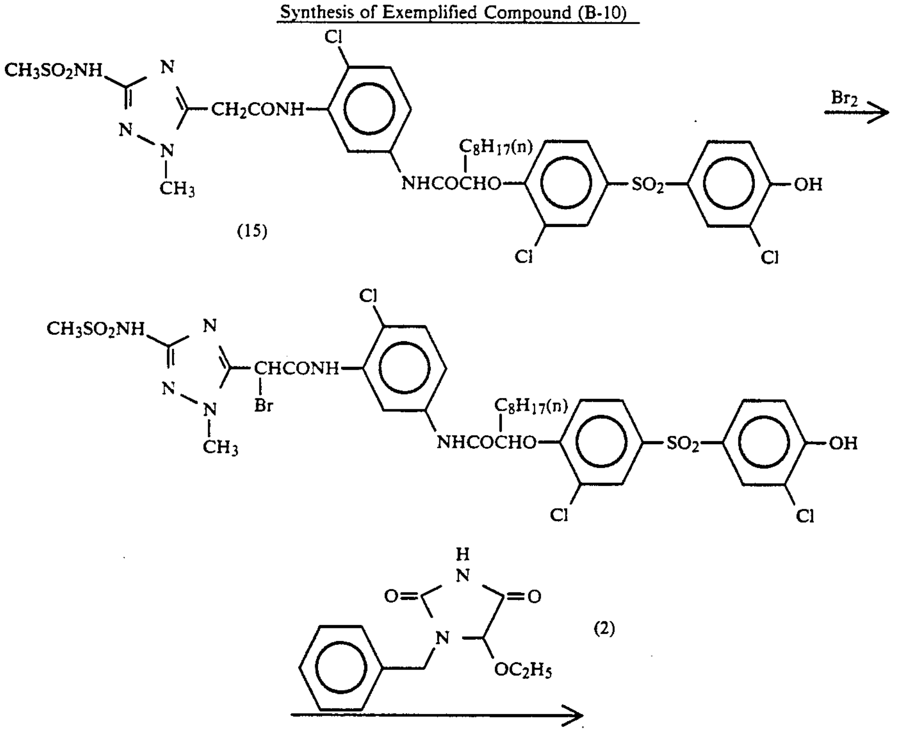

(15)

(2)

Exemplified Compound (B-10)

15.0 g of Compound (15) was dissolved in 150 ml of methylene chloride, and 3.5 g of bromine was added dropwise thereto at room temperature for 40 minutes. After reaction at room temperature for 50 minutes, the reaction solution was washed with water and dried on magnesium sulfate. The drying agent was removed by filtration, and the resulting filtrate was added dropwise to a solution of 9.3 g of Compound (2) and 4.0 g of triethylamine in 50 ml of dimethylformamide. After reaction at 40° C. for 4 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 14.2 g of the desired Exemplified Compound (B-10) as a pale yellow oily product.

SYNTHESIS EXAMPLE 9

Synthesis of Exemplified Compound (B-26)

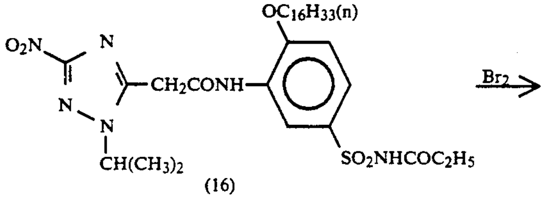

(16)

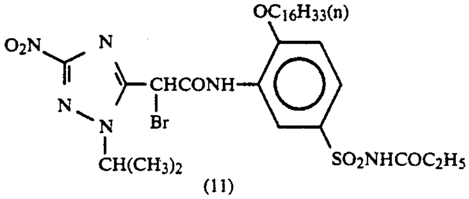

(11)

-continued

Synthesis of Exemplified Compound (B-26)

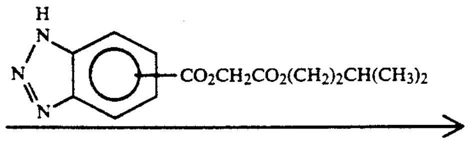

Exemplified Compound (B-26)

15.0 g of Compound (16) was dissolved in 150 ml of methylene chloride, and 4.0 g of bromine was added dropwise thereto at room temperature for 25 minutes. After reaction at room temperature for 40 minutes, the reaction solution was washed with water and dried on magnesium sulfate. The drying agent was removed by filtration, and the resulting filtrate was added dropwise to a solution of 13.1 g of Compound (11) and 4.6 g of triethylamine in 50 ml of dimethylformamide. After reaction at 40° C. for 3 hours, the reaction solution was poured on water and extracted with ethyl acetate. The organic layer was washed with water and dried on magnesium sulfate. The drying agent was removed by filtration, and the solvent was removed by distillation under reduced pressure to obtain a yellow oily product. The resulting product was purified by silica gel chromatography to obtain 13.0 g of the desired Exemplified Compound (B-26) as a pale yellow oily product.

SYNTHESIS EXAMPLE 10

Synthesis of Exemplified Compound (A-29)

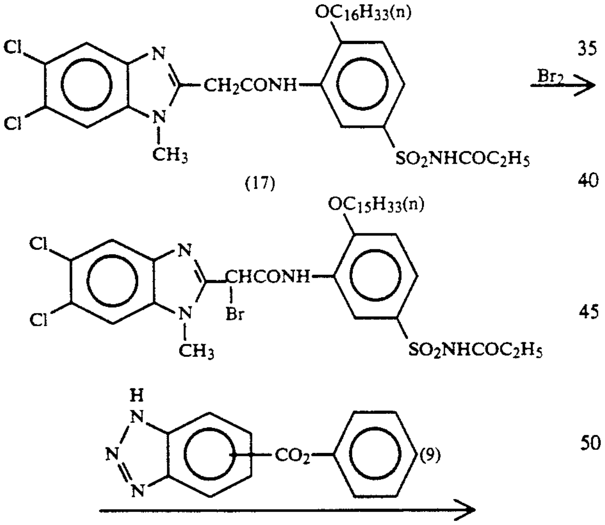

(17)

(9)

Exemplified Compound (A-29)

8.3 g of Compound (17) was dissolved in 100 ml of chloroform, and 1.9 g of bromine was added dropwise thereto at room temperature for 10 minutes. After reaction at room temperature for 80 minutes, the reaction solution was washed with water and dried on magnesium sulfate. The drying agent was removed by filtration, and the resulting filtrate was added dropwise to a solution of 5.8 g of Compound (9) and 2.46 g of triethylamine in 100 ml of dimethylformamide. After reaction at 40° C. for 1 hours, the reaction solution was poured on water and extracted with ethyl acetate. The organic layer was washed with water and dried on magnesium sulfate. The drying agent was removed by filtration, and the solvent was removed by distillation under reduced pressure to obtain yellow crystals. The resulting crystals were recrystallized from methanol to obtain 7.6 g of the desired Exemplified Compound (A-29) as pale yellow crystals with a melting point of 202°-203° C.

The couplers of formula (I) of the present invention are yellow couplers.

It is preferred that the yellow coupler of formula (I) used in the present invention is added to a sensitive silver halide emulsion layer or its adjacent layer in the photographic material, and the addition to the sensitive silver halide emulsion layer is particularly preferred. A total amount of the coupler of formula (I) of the present invention which is added to the photographic material is 0.001 g/m$^2$ or more. When the eliminable group X contains a development restrainer component, the total amount of the coupler added to the photographic material is 0.001 to 0.80 g/m$^2$, preferably 0.005 to 0.50 g/m$^2$, and more preferably 0.02 to 0.30 g/m$^2$. On the other hand, when the eliminable group X does not contain a development restrainer component, the amount of the yellow coupler of formula (I) added is 0.001 to 1.20 g/m$^2$, preferably 0.01 to 1.00 g/m$^2$, and more preferably 0.10 to 0.80 g/m$^2$.

The yellow couplers of formula (I) used in the present invention can be added in a manner similar to that of ordinary couplers as described below.

The yellow couplers represented by general formula (I) give high coupling activity and high developed color density, impart good keeping stability to the photographic material, exhibit few variations in photographic characteristics on continuous processing, and are excellent in fastness of images obtained. Further, when the yellow coupler of formula (I) is a DIR coupler, in which a group eliminated on coupling reaction is a group releasing a development restrainer, exhibits excellent image quality improving effects on parameters such as sharpness and graininess. When processing is conducted in which the replenishment rate of the color developing solution is reduced, as described below, the above-described excellent characteristics are exhibited, and few fluctuations in photographic characteristics occur.

The photographic material according to the present invention has at least one layer containing the yellow coupler of formula (I) described above on a support.

In a multilayer photographic material, at least one blue-sensitive silver halide emulsion layer, at least one green-sensitive silver halide emulsion layer and at least one red-sensitive silver halide emulsion layer are each provided on a support. There is no particular limitation for the number and the order of arrangement of the silver halide emulsion layers and non-sensitive layers. A typical example thereof has a light-sensitive unit layer comprising a plurality of silver halide emulsion layers which are substantially identical in color sensitivity and different in light sensitivity on a support. The light-sensitive unit layer has color sensitivity to blue, green or red light. In general, in the light-sensitive unit layer of the multilayer photographic material, the red-sensitive unit layer, the green-sensitive unit layer and the blue-sensitive unit layer are arranged from the support side in this order. However, the above-described order of arrangement may be reversed, or an arrangement in which a layer having a different color sensitivity is sandwiched between layers having the same color sensitivity may also be adopted, depending on its purpose.

A non-sensitive layer may be provided between the above-described silver halide light-sensitive layers, or as the upper-most layer, the lower-most layer or one of various intermediate layers.

The intermediate layers may contain couplers or DIR compounds described in JP-A-61-43748, JP-A-59-113438, JP-A-59-113440, JP-A-61-20037 and JP-A-61-20038, and may contain color mixture inhibitors, as usually employed.

As the plural silver halide emulsion layers constituting each light-sensitive unit layer, a two-layer structure with a highly sensitive emulsion layer and an emulsion layer of lower sensitivity can be preferably used as described in West German Patent 1,121,470 and British Patent 923,045. It is usually preferred that the emulsion layers are arranged to decrease in light sensitivity toward the support. A non-sensitive layer may also be provided between the respective silver halide emulsion layers. Further, less sensitive emulsion layers may be arranged away from a support and highly sensitive layers near the support, as described in JP-A-57-112751, JP-A-62-200350, JP-A-62-206541 and JP-A-62-206543.

Specific examples thereof include arrangements in the following order: low sensitivity blue-sensitive layer (hereinafter referred to as BL)/high sensitivity blue-sensitive layer (hereinafter referred to as BH)/high sensitivity green-sensitive layer (hereinafter referred to as GH)/low sensitivity green-sensitive layer (hereinafter referred to as GL)/high sensitivity red-sensitive layer (hereinafter referred to as RH)/low sensitivity red-sensitive layer (hereinafter referred to as RL) beginning away from the support; in the order of BH/BL/GL/GH/RH/RL; and in the order of BH/BL/GH/GL/RL/RH.

As described in JP-B-55-34932, layers can also be arranged in the order of blue-sensitive layer/GH/RH/GL/RL beginning away from the support. Further, layers can also be arranged in the order of blue-sensitive layer/GL/RL/GH/RH beginning away from the support, as described in JP-A-56-25738 and JP-A-62-63936.

Furthermore, three layers differing in light sensitivity may be arranged so that the upper-most layer is a silver halide emulsion layer having the highest light sensitivity, the middle layer is a silver halide emulsion layer having a light sensitivity lower than that of the upper-most layer, the next lower layer is a silver halide emulsion layer having a light sensitivity still lower than the middle layer; and, the sensitivity of the three layers may be successively decreased toward the support, as described in JP-B-49-15495. Even when three such layers differing in light sensitivity are arranged, they may be arranged in the following order: intermediate sensitivity emulsion layer/high sensitivity emulsion layer/low sensitivity layer, beginning from the side remote from the support in one light-sensitive unit layer, as described in JP-A-59 202464.

In addition, the layers may be arranged in the following order: high sensitivity emulsion layer/low sensitivity emulsion layer/intermediate sensitivity emulsion layer, or low sensitivity emulsion layer/intermediate sensitivity emulsion layer/high sensitivity emulsion layer. If four or more layers are used, the arrangement may also be changed as described above.

In order to improve color reproducibility, it is preferred that a donor layer (CL) having multilayer effect different from a main light-sensitive layer (such as BL, GL or RL) in spectral sensitivity is arranged next to or in the vicinity of the main light-sensitive layer as described in U.S. Pat. Nos. 4,663,271, 4,705,744 and 4,707,436, JP-A-62-160448 and JP-A-63-89850.

As described above, various layer structures and arrangements can be selected depending on the purpose of each photographic material.

Preferred silver halides contained in the photographic emulsion layers of the photographic materials according to the present invention are silver iodobromide, silver iodochloride and silver iodochlorobromide containing about 0.5 to about 30 mol% of silver iodide. Silver iodobromide or silver iodochloride containing about 2 to about 10 mol% of silver iodide is particularly preferred.

The silver halide grains contained in the photographic emulsions may have a regular crystal form such as a cubic, an octahedral or a tetradecahedral, an irregular crystal form such as a spherical or a plate (tabular) form, a form having a crystal defect such as a twin plane, or a composite form thereof.

The silver halides may be either finely divided grains having a grain size of about 0.2 μm or less, or large-sized grains having a diameter with a projected area up to about 10 μm. Further, they may be either polydisperse emulsions or monodisperse emulsions.

The silver halide emulsions which can be used in the present invention can be prepared, for example, according to the methods described in *Research Disclosure* (*RD*), No. 17643, pages 22 and 23, "I. Emulsion Preparation and Types" (December, 1978), ibid., No. 18716, page 648 (November, 1979), ibid., No. 307105, pages 863 to 865 (November, 1989), P. Glafkides, *Chimie et Phisique Photoqraphique* (Paul Montel, 1967), G. F. Duffin, *Photographic Emulsion Chemistry* (Focal Press, 1966) and V. L. Zelikman et al., *Making and Coating Photographic Emulsion* (Focal Press, 1964).

The monodisperse emulsions described in U.S. Pat. Nos. 3,574,628 and 3,655,394 and British Patent 1,413,748 are also preferably used.

Further, flat plate-form (tabular) grains having an aspect ratio of 5 or more can also be used in the present invention. The flat plate-form grains can be easily prepared by the methods described in Gutoff, *Photographic Science and Engineering*, Vol. 14, pages 248 to 257 (1970), U.S. Pat. Nos. 4,434,226, 4,414,310, 4,433,048 and 4,439,520 and British Patent 2,112,157.

The crystal structure may be uniform, or the interior of the grain may be different from the surface thereof in halogen composition. The crystal structure may also be a laminar structure. Silver halide grains having different compositions may be joined together by epitaxial bonding. Further, silver halide grains may be joined to compounds other than silver halides such as silver rhodanide and lead oxide. Furthermore, mixtures of grains having various crystal forms may also be used.

The above-described emulsions may be any of surface latent image type emulsions in which latent images are mainly formed on the surface of the grains, internal latent image type emulsions in which latent images are mainly formed in the interior of the grains and emulsions in which latent images are formed both on the surface and in the interior. However, the emulsions must be negative type emulsions. One of the internal latent image type emulsions may be the internal latent image type emulsion of a core/shell type described in JP-A-63-264740. A method for preparing this internal latent image type emulsion of a core/shell type is described in JP-A-59-133542. The thickness of a shell of this emulsion is preferably 3 to 40 nm and more preferably 5 to 20 nm, though it varies depending on processing and the like.

Silver halide emulsions which have been subjected to physical ripening, chemical ripening and spectral sensitization are usually employed. Additives used in such stages are described in *Research Disclosure*, No. 17643, ibid., No. 18716 and ibid., No. 307105, and corresponding portions thereof are summarized in the table below.

In the photographic materials according to the present invention, two or more kinds of emulsions which are different in at least one characteristic, such as grain size, grain size distribution, halogen composition, grain shape or sensitivity of the sensitive silver halide emulsions can be mixed and used in the same layer.

The silver halide grains described in U.S. Pat. No. 4,082,553, the surface of which are fogged; the silver halide grains described in U.S. Pat. No. 4,626,498 and JP-A-59-214852, the interior of which are fogged; and colloidal silver can be preferably used in sensitive silver halide emulsion layers and/or substantially non-sensitive hydrophilic colloidal layers. The silver halide grains with fogged surfaces and/or interiors refer to silver halide grains which can be uniformly non-imagewise) developed, independently of non-exposed or exposed portions of the photographic materials. Methods for preparing the silver halide grains with fogged the surfaces or interiors are described in U.S. Pat. No. 4,626,498 and JP-A-59-214852.

Silver halides forming internal nuclei of core/shell type silver halide grains with fogged interiors may either have the same halogen compositions or differing halogen compositions. As the silver halide in which the interiors of the grains are fogged, any of silver chloride, silver chlorobromide, silver iodobromide and silver chloroiodobromide can be used. Although there is no restriction for the grain size of these fogged silver halide grains, the mean grain size is preferably 0.01 to 0.75 μm and more preferably 0.05 to 0.6 μm. There are no restriction for the grain shape. Although an emulsion comprising regular grains and a polydisperse emulsion may be used, a monodisperse emulsion (in which at least 95% of the weight or the number of silver halide grains have a grain size within ±40% of a mean grain size) is preferably used.

In the present invention, it is preferred that fine non-sensitive silver halide grains are used. The fine non-sensitive silver halide grains are not sensitive to light on imagewise exposure for obtaining dye images and are not substantially developed during processing, and it is preferred that they are not previously fogged.

The fine non-sensitive silver halide grains contain 0 to 100 mol% of silver bromide, and may contain silver chloride and/or silver iodide. It is preferred that the fine non-sensitive silver halide grains contain 0.5 to 10 mol% of silver iodide.

The fine non-sensitive silver halide grains preferably have a mean grain size (a mean value of circle corresponding diameters of projected areas) of 0.01 to 0.5 μm, and more preferably 0.02 to 0.2 μm.

The fine non-sensitive silver halide grains can be prepared in a manner similar to that for preparing conventional sensitive silver halide grains. In this case, the surface of the silver halide grains need not be optically sensitized; and, spectral sensitization is also not required. It is, however, preferred that known stabilizers such as triazole, azaindene, benzothiazolium, mercapto and zinc compounds be added to the fine non-sensitive silver halide grains before they are added to coating solutions. A layer containing the fine non-sensitive silver halide grains should preferably contain colloidal silver.

The photographic materials according to the present invention are applied preferably in an amount of 6.0 $g/m^2$ of silver or less, and most preferably in a silver amount of 4.5 $g/m^2$ or less.

Conventional photographic additives which can be used in the present invention are also described in the above three *Research Disclosure* references, and described portions relating thereto are shown in the following table.

| Type of Additives | RD 17643 | RD 18716 |
|---|---|---|
| 1. Chemical Sensitizers | Page 23 | Page 648, right column |
| 2. Sensitivity Increasing Agents | — | Page 648, right column |
| 3. Spectral Sensitizers, and Supersensitizers | Pages 23 to 24 | Page 648, right column to page 649, right column |
| 4. Brightening Agents | Page 24 | Page 647 |
| 5. Antifoggants, Stabilizers | Pages 24 to 25 | Page 649, right column |
| 6. Light Absorbers, Filter Dyes UV Absorbers | Pages 25 to 26 | Page 649, right column to page 650, left column |
| 7. Stain Inhibitors | Page 25, right column | Page 650, left column to right column |
| 8. Dye Image Stabilizers | Page 25 | Page 650, left column |
| 9. Hardeners | Page 26 | Page 651, left column |
| 10. Binders | Page 26 | Page 651, left column |
| 11. Plasticizers, Lubricants | Page 27 | Page 650, right column |
| 12. Coating Aids, Surfactants | Pages 26 to 27 | Page 650, right column |
| 13. Antistatic Agents | Page 27 | Page 650, right column |
| 14. Mat Finishing Agents | — | — |

| Type of Additives | RD307105 |
|---|---|
| 1. Chemical Sensitizers | Page 866 |
| 2. Sensitivity Increasing Agents | — |
| 3. Spectral Sensitizers, Supersensitizers | Pages 866–868 |
| 4. Brightening Agents | Page 868 |
| 5. Antifoggants, Stabilizers | Pages 868–870 |
| 6. Light Absorbers, Filter dyes, UV Absorbers | Page 873 |
| 7. Stain Inhibitors | Page 872 |
| 8. Dye Image Stabilizers | Page 872 |
| 9. Hardeners | Pages 874–875 |
| 10. Binders | Pages 873–874 |
| 11. Plasticizers, Lubricants | Page 876 |
| 12. Coating Aids, Surfactants | Pages 875–876 |
| 13. Antistatic Agents | Pages 876–877 |
| 14. Mat Finishing Agents | Pages 878–879 |

In order to prevent the photographic characteristics from deteriorating due to the presence of formaldehyde gas, the compounds described in U.S. Pat. Nos. 4,411,987 and 4,435,503, which can react with formaldehyde, as fixatives are preferably added to the photographic materials.

It is preferred that the mercapto compounds described in U.S. Pat. Nos. 4,740,454 and 4,788,132, JP-A-62-18539 and JP-A-1-283551 be added to the photographic materials of the present invention.

It is also preferred that the photographic materials of the present invention contain the compounds described in JP-A-1-106052 which release fogging agents, development accelerators, solvents for silver halides or precursors thereof, regardless of the amount of silver produced by processing.

Further, it is preferred that the photographic materials contain dyes dispersed by the methods described in PCT International Publication No. W088/04794 and JP-A-1-502912 or dyes described in EP-A-317,308, U.S. Pat. No. 4,420,555 and JP-A-1-259358.

Various color couplers can be used in the present invention. Typical specific examples thereof are described in the patents cited in *Research Disclosure*, No. 17643, VII-C to G and ibid. No. 307105, VII-C to G described above.

Preferred examples of yellow couplers used in combination with the yellow couplers represented by general formula (I) of the present invention are described in U.S. Pat. Nos. 3,933,501, 4,022,620, 4,326,024, 4,401,752 and 4,248,961, JP-B-58-10739, British Patents 1,425,020 and 1,476,760, U.S. Pat. Nos. 3,973,968, 4,314,023 and 4,511,649 and EP-A-249,473.

As magenta couplers, 5-pyrazolone compounds or pyrazoloazole compounds are preferably used. Particularly preferred examples thereof are described in U.S. Pat. Nos. 4,310,619 and 4,351,897, European Patent 73,636, U.S. Pat. Nos. 3,061,432 and 3,725,064, *Research Disclosure*, No. 24220 (June, 1984), JP-A-60-33552, *Research Disclosure*, No. 24230 (June, 1984), JP-A-60-43659, JP-A-61-72238, JP-A-60-35730, JP-A-55-118034, JP-A-60-185951, U.S. Pat. Nos. 4,500,630, 4,540,654 and 4,556,630 and PCT International Publication No. W088/04795.

Cyan couplers which can be used include phenol couplers and naphthol couplers. Preferred examples thereof are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, West German Patent (OLS) 3,329,729, EP-A-121,365, EP-A-249,453, U.S. Pat. Nos. 3,446,622, 4,333,999, 4,753,871, 4,451,559, 4,427,767, 4,690,889, 4,254,212 and 4,296,199 and JP-A-61-42658. Further, the pyrazoloazole couplers described in JP-A-64-553, JP-A-64-554, JP-A-64-555 and JP-A-66-556 and the imidazole couplers described in U.S. Pat. No. 4,818,672 can also be used.

Typical examples of dye-forming polymer couplers are described in U.S. Pat. Nos. 3,451,820, 4,080,211, 4,367,282, 4,409,320 and 4,576,910, British Patent 2,102,137 and EP-A-341,188.

Preferred examples of couplers which form dyes having appropriate diffusibility include those described in U.S. Pat. No. 4,366,237, British Patent 2,125,570, European Patent 96,570 and West German Patent (OLS) 3,234,533.

Preferred colored couplers for correcting unnecessary absorption of dyes which form are described in *Research Disclosure*, No. 17643, Item VII-G, ibid. 307105, Item VII-G, U.S. Pat. No. 4,163,670, JP-B-57-39413, U.S. Pat. Nos. 4,004,929 and 4,138,258, British Patent 1,146,368 and Japanese Patent Application No. 2-50137. Couplers for correcting unnecessary absorption of dyes which form by releasing fluorescent dyes on coupling are preferred. In addition, couplers having dye precursor groups as eliminable groups which can form dyes by reacting with developing agents are preferred. The former couplers are described in U.S. Pat. No. 4,774,181 and the latter couplers are described in U.S. Pat. No. 4,777,120.

Couplers which release photographically useful groups on coupling can also be preferably used in the present invention. Preferred DIR couplers which release development restrainers can be used in combination with the yellow DIR couplers of formula (I) of the present invention, and are described in the patents cited in Research Disclosure, No. 17643, Item VII-F and ibid., No. 307105, Item VII-F described above, JP-A-57-151944, JP-A-57-154234, JP-A-60-184248, JP-A-63-37346, JP-A-63-7350 and U.S. Pat. Nos. 4,248,962 and 4,782,012.

The bleaching promoter releasing couplers described in *Research Disclosure*, No. 11449, ibid., No. 4241 and JP-A-61-201247 are effective to reduce the time required for processing stages having bleaching effects, and are particularly effective when added to the photographic materials containing the tabular silver halide grains described above. Preferred couplers which release nucleating agents or development accelerators in image-like forms on development are described in British Patents 2,097,140 and 2,131,188, JP-A-59-157638 and JP-A-59-170840. Further, preferred couplers which release fogging agents, development accelerators, solvents for silver halides and the like by oxidation-reduction reaction with oxidation products of developing agents are described in JP-A-60-107029, JP-A-60-252340, JP-A-1-4940 and JP-A-1-45687.

Other compounds which can be used in the present invention include competitive couplers described in U.S. Pat. No. 4,130,427, multiequivalent couplers described in U.S. Pat. Nos. 4,283,472, 4,338,393 and 4,310,618, DIR redox compound releasing couplers, DIR coupler releasing couplers, DIR coupler releasing redox compounds and DIR redox releasing redox compounds described in JP-A-60-185950 and JP-A-62-24252, couplers which release dyes recoloring after elimination described in EP-A-173,302, ligand releasing couplers described in U.S. Pat. No. 4,553,477, leuco dye releasing couplers described in JP-A-63-75747 and fluorescent dye releasing couplers described in U.S. Pat. No. 4,774,181.

The couplers used in the present invention can be incorporated in the photographic materials by various conventional dispersing methods, such as an oil-in-water dispersion method or a latex despersion method.

Examples of high boiling solvents used in oil-in-water dispersion methods are described in U.S. Pat. No. 2,322,027. Specific examples of the high boiling solvents which are used in the oil-in-water dispersion methods and have a boiling point of 175° C. or more at atmospheric pressure include phthalates([for example, dibutyl phthalate, dicyclohexyl phthalate, di-2-ethylhexyl phthalate, decyl phthalate, bis(2,4-di-t-amylphenyl) phthalate, bis(2,4-di-t-amylphenyl) isophthalate and bis(1,1-diethylpropyl) phthalate), phosphates or phosphonates (for example, triphenyl phosphate, tricresyl phosphate, 2-ethylhexyl-diphenyl phosphate, tricyclohexyl phosphate, tri-2-ethylhexyl phosphate, tridodecyl phosphate, tributoxyethyl phosphate, trichloropropyl phosphate and di-2-ethylhexylphenyl phosphonate), benzoates (for example, 2-ethylhexyl benzoate, dodecyl benzoate and 2-ethylhexyl-p-hydroxy benzoate, amides (for examples, N,N-diethyldodecaneamide, N,N-diethyllauryl-amide and N-tetradecylpyrrolidone), alcohols or phenols (for example, isostearyl alcohol and 2,4-di-tert-amylphenol), aliphatic carboxylic acid esters [for example, bis(2-ethylhexyl) sebacate, dioctyl azelate, glycerol tributyrate, isostearyl lactate and trioctyl citrate], aniline derivatives (for example, N,N-dibutyl-2-butoxy-5-tert-octylaniline), and hydrocarbons (for example, paraffin, dodecylbenzene and diisopropylnaphthalene). Organic solvents having a boiling point of about 30° C. or more and preferably 50° C. to about 160° C. may be used as supplementary (auxilary) solvents. Typical examples thereof include ethyl acetate, butyl acetate, ethyl propionate, methyl ethyl ketone, cyclohexanone, 2-ethoxyethyl acetate and dimethylformamide.

The stages and effects of latex dispersion methods and specific examples of latexes for impregnation are described in U.S. Pat. No. 4,199,363, West German Patents (OLS) 2,541,274 and 2,541,230.

It is preferred that the photographic materials according to the present invention contain various preservatives or antifungal agents such as 1,2-benzisothiazoline-3-one, n-butyl p-hydroxybenzoate, phenol, 4-chloro-3,5-dimethylphenol, 2-phenoxyethanol and 2-(4-thiazolyl)benzimidazole described in JP-A-63-257747, JP-A-62-272248 and JP-A-1-80941 and phenethyl alcohol.

The photographic materials according to the present invention may contain color developing agents for the purpose of simplifying and enhancing processing. Various precursors of the color developing agents are preferably used for such a purpose. Examples of such precursors include indoaniline compounds described in U.S. Pat. No. 3,342,597, Schiff base compounds described in U.S. Pat. No. 3,342,599, *Research Disclosure*, No. 14,850 and ibid., No. 15,159, aldol compounds described in *Research Disclosure*, No. 13,924, metal salt complexes described in U.S. Pat. No. 3,719,492 and urethane compounds described in JP-A-53-135628.

The photographic materials according to the present invention may contain various 1-phenyl-3-pyrazolidone compounds for the purpose of enhancing color development, if desired. Typical compounds are described in JP-A-56-64339, JP-A-57-144547 and JP-A-58- 15438.

The present invention can be applied to various photographic materials. Typical examples thereof include color negative films for general or movie use, color reversal films for slide or television use, color paper, color positive films and color reversal paper. Of these, the color negative films for general or movie use are preferred.

In the photographic materials according to the present invention, the total film thickness of all hydrophilic colloidal layers on the emulsion layer side is preferably 28 μm or less, more preferably 23 μm or less, further more preferably 18 μm or less, and most preferably 16 μm or less. The film swelling speed, ($T\frac{1}{2}$), is preferably 30 seconds or less, and more preferably 20 seconds or less. The film thickness is defined as the thickness of a film measured after conditioning at 25° C., 55% RH for 2 days, and the film swelling speed $T\frac{1}{2}$ can be measured by techniques known in the art. For example, the film swelling speed can be measured with a swellometer as described in A. Green et al., *Photogr. Sci. Eng.* Vol.19, No.2, pages 124 to 129. Further, 90% of the maximum swelled film thickness which the photographic material reaches when processed in a color developing solution at 30° C. for 3 minutes and 15 seconds is taken as a saturated swelled film thickness, and the time taken to reach one-half this film thickness is defined as $T\frac{1}{2}$.

The film swelling speed $T\frac{1}{2}$ can be adjusted by adding a hardening agent to a gelatin binder or changing the above-described aging conditions after coating. The swelling rate is preferably 150 to 400%. The swelling rate can be calculated according to the equation: (maximum swelled film thickness - film thickness)/film thickness, where the maximum swelled film thickness is determined under the above-described conditions.

The photographic material according to the present invention is preferably provided with one or more back layers, each of which is a a hydrophilic colloidal layer, on the side opposite the side having an emulsion layer. It is preferred that the back layers have a total dry film thickness of 2 to 20 μm. It is preferred that the back layers contain the above-described light absorbers, filter dyes, ultraviolet absorbers, antistatic agents, hardening agents, binders, plasticizers, lubricants, coating aids and surfactants. The swelling rate of the back layers is preferably 150 to 500%.

Appropriate supports which can be used in the present invention are described in, for example, *Research Disclosure*, No. 17643, page 28, ibid., No. 18716, page 647, right column to page 648, left column, and ibid., No. 307105, page 879.

The processing of the present invention is described below.

In the present invention, the photographic materials are subjected to color development processing after imagewise exposure, and then processed by solutions having bleaching ability.

The color developing solution used in the present invention contains an aromatic primary amine color developing agent known in the art. Preferred examples of such color developing agents are p-phenylenediamine compounds. Typical examples thereof include but are not limited to the following compounds.

| | |
|---|---|
| (D-1) | N,N-diethyl-p-phenylenediamine |
| (D-2) | 2-Amino-5-diethylaminotoluene |
| (D-3) | 2-Amino-5-(N-ethyl-N-laurylamino)toluene |
| (D-4) | 4-[N-ethyl-N-(β-hydroxyethyl)amino]aniline |
| (D-5) | 2-Methyl-4-[N-ethyl-N-(β-hydroxyethyl)amino]-aniline |
| (D-6) | 4-Amino-3-methyl-N-ethyl-N-[β-(methanesulfon-amido)ethyl]aniline |
| (D-7) | N-(2-amino-5-diethylaminophenylethyl)methane-sulfonamide |
| (D-8) | N,N-dimethyl-p-phenylenediamine |
| (D-9) | 4-Amino-3-methyl-N-ethyl-N-methoxyethyl-aniline |
| (D-10) | 4-Amino-3-methyl-N-ethyl-N-β-ethoxyethyl-aniline |
| (D-11) | 4-Amino-3-methyl-N-ethyl-N-β-butoxyethyl-aniline |

Of the above-described p-phenylenediamine compounds exemplified compound (D-5) is particularly preferred.

These p-phenylenediamine compounds may be salts such as sulfates, hydrochlorides, sulfites and p-toluenesulfonates. The aromatic primary amine color developing agents are used preferably at a concentration of 0.001 to 0.1 mol per l of color developing solution, and more preferably at a concentration of about 0.01 to 0.06 mol per l of color developing solution.

Further, sulfites such as sodium sulfite, potassium sulfite, sodium bisulfite, potassium bisulfite, sodium metasulfite and potassium metasulfite, or carbonyl sulfite addition products may be added to the color developing solution as preservatives, if necessary.

The preservatives are added to the color developing solution preferably in an amount of 0.5 to 10 g/l of color developing solution, and more preferably in an amount of 1 to 5 g/l of color developing solution.

It is further preferred that compounds directly preserving the above-described aromatic primary amine color developing agents be added to the color developing solutions. Such compounds include various hydroxylamines (for example, compounds described in JP-A-63-5341 and JP-A-63-106655, particularly compounds having sulfo groups or carboxyl groups); hydroxamic acids described in JP-A-63-43138; hydrazine and hydrazides described in JP-A-63-146041; phenols described in JP-A-63-44657 and JP-A-63-58443; α-hydroxyketones and α-aminoketones described in JP-A-63-44656; and/or various saccharides described in JP-A-63-36244. Furthermore, some compounds are preferably used in combination with the above-described compounds; such compounds include: monoamines described JP-A-63-4235, JP-A-63-24254, JP-A-63-21647, JP-A-63-146040, JP-A-63-27841 and JP-A-63-25654; diamines described in JP-A-63-30845, JP-A-63-14640 and JP-A-63-43139; polyamines described in JP-A-63-21647, JP-A-63-26655 and JP-A-63-44655; nitroxyl radicals described in JP-A-63-53551; alcohols described in JP-A-63-43140 and JP-A-63-53549; oximes described in JP-A-63-56654; and tertiary amines described in JP-A-63-239447.

Other preservatives, such as, for example, various metals described in JP-A-57-44148 and JP-A-57-53749, salicylic acid derivatives described in JP-A-59-180588, alkanolamines described in JP-A-54-3532, polyethyleneimines described in JP-A-56-94349 and aromatic polyhydroxy compounds described in U.S. Pat. No. 3,746,544 may be utilized, as required in the color developing solution. In particular, the aromatic polyhydroxy compounds are preferably added.

The pH of the color developing solution used in the present invention is preferably 9 to 12 and more preferably 9 to 11. Other known constituent compounds of color developing solutions can be added to the above-described color developing solutions.

It is preferred to use various buffers in the color developing solution to maintain the above-described pH.

Specific examples of these buffers include sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate) and potassium 5-sulfo-2-hydroxybenzoate (potassium 5-sulfosalicylate). However, the buffers used in the present invention are not limited to these compounds.

The buffers are added to the color developing solution preferably in an amount of at least 0.1 mol/l, and more preferably in an amount of 0.1 to 0.4 mol/l.

In addition, various chelating agents can be used in the color developing solution as suspending agents for calcium or magnesium, or to improve the stability of the color developing solution.

As the chelating agents, organic acid compounds are preferably used. Examples of such chelating agents include aminopolycarboxylic acids, organic phosphonic acids and phosphonocarboxylic acids. Typical examples thereof include nitrilotriacetic acid, diethylenetriaminepentaacetic acid, ethylenediaminetetraacetic acid, N,N,N-trimethylenephosphonic acid, ethylenediamine-N,N,N',N'-tetramethylenephosphonic acid, transcyclohexanediaminetetraacetic acid, 1,2-diaminopropanetetraacetic acid, hydroxyethyliminodiacetic acid, glycoletherdiaminetetraacetic acid, ethylenediamine-o-hydroxyphenylacetic acid, 2-phosphonobutane-1,2,4-tricarboxylic acid, 1-hydroxyethylidene-1,1-diphosphonic acid and N,N'-bis(2-hydroxybenzyl)ethylenediamine-N,N'-diacetic acid. Two or more kinds of these chelating agents may be used in combination, if required. These chelating agents may be added in any amount as long as the amount is sifficient to block metal ions in the color developing solutions. For example, they may be added in an amount of about 0.1 to 10 g/l.

Any development accelerator may be added to the color developing solution as required. It is, however, preferred that the color developing solution used in the present invention be substantially free from benzyl alcohol from the viewpoint of pollution, chemical mixing and prevention of color stains. As used herein, a color developing solution "substantially free from benzyl alcohol" means a developing solution containing benzyl alcohol at a concentration of not more than 2 ml/l of developing solution, and preferably containing no benzyl alcohol at all.

Other development accelerators for the color developing solution which can be added, if desired include thioether compounds described in JP-B-37-16088, JP-B-37-5987, JP-B-38-7826, JP-B-44-12380, JP-B-45-9019, and U.S. Pat. No. 3,818,247; p-phenylenediamine compounds described in JP-A-52-49829 and JP-A-50-15554; quaternary ammonium salts described in JP-A-50-137726, JP-B-44-30074, JP-A-56-156826 and JP-A-52-43429; amine compounds described in U.S. Pat. Nos. 2,494,903, 3,128,182, 4,230,796, 3,253,919, 2,482,546, 2,596,926 and 3,582,346 and JP-B-41-11431; polyalkylene oxides described in JP-B-37-16088, JP-B-42-25201, U.S. Pat. No. 3,128,183, JP-B-41-11431, JP B-42-23883 and U.S. Pat. No. 3,532,501; 1-phenyl-3-pyrazolidone compounds; and, imidazole compounds.

In the present invention, any antifoggant may be added to the color developing solution as required. As the antifoggants, alkaline metal halides such as sodium chloride, potassium bromide and potassium iodide, and organic antifoggants can be used. Typical examples of the antifoggants include nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolylbenz-imidazole, 2-thiazolylmethylbenzimidazole, indazole, hydroxyazaindolizine and adenine.

The color developing solution used in the present invention may contain a fluorescent brightener. As the fluorescent brighteners, 4,4'-diamino-2,2'-disulfostilbene compounds are preferably used. They are added in an amount of 0 to 5 g/l, and preferably in an amount of 0.1 to 4 g/l.

Various surfactants such as alkylsulfonic acids, arylphosphonic acids, aliphatic carboxylic acids and aromatic carboxylic acids may be added to the color developing solution as required.

The processing temperature of the color developing solution used in the present invention is 20° to 50° C., and preferably 30° to 45° C. The time of color development processing is 20 seconds to 5 minutes, preferably 30 seconds to 3 minutes and 20 seconds, and more preferably 1 minute to 2 minutes and 30 seconds.

A color developing bath may be divided into two or more baths to replenish the first bath or the last bath with a color developing replenisher, thereby shortening the developing time or reducing the replenishment rate, if necessary.

The processing method of the present invention can also be applied to color reversal processing. In reversal processing, a black-and-white developing solution is employed as a first developing solution. The black-and-white developing solution is one which is used for reversal processing of conventional color photographic materials, and may contain various well-known additives which are generally added to the black-and-white developing solutions used as processing solutions for black-and-white silver halide photographic materials.

Typical examples of such additives include developing agents such as 1-phenyl-3-pyrazolidone, Metol and hydroquinone; preservatives such as sulfites; development accelerators comprising alkali compounds such as sodium hydroxide, sodium carbonate and potassium carbonate; inorganic or organic inhibitors such as potassium bromide, 2-methylbenzimidazole and methylbenzthiazole; water softeners such as polyphosphates; and development restrainers such as small amounts of iodides and mercapto compounds.

When processing is carried out by an automatic processor using the above-described developing solution, it is preferred that the contact area of the developing solution with air (opening area) be as small as possible. For example, when the value given by dividing the opening area ($cm^2$) by the volume ($cm^3$) of the developing solution is taken as the opening ratio ($cm^{-1}$), the opening ratio is preferably 0.01 to 0.001, and more preferably 0.05 or less.

It is also desirable to add water in an amount corresponding to an evaporated amount to correct the concentration of the developing solution due to evaporation.

The present invention is also effective when the developing solutions are regenerated.

The regeneration of the developing solutions refers to the practice of increasing to the activity of the developing solutions and usings them again as processing solutions. The used developing solutions are regenerated by treating with anion-exchange resins or electrodialysis, or by adding processing agents called regenerating agents.

In this case, the regeneration rate (the ratio of overflowed solution to replenisher) is preferably 50% or more, and more preferably 70% or more.

The regeneration is preferably conducted using anion-exchange resins. Compositions of particularly preferred anion-exchange resins and regenerating methods of the resins are described in Diaion Manual (I), 14th edition, published by Mitsubishi Heavy Industries, Ltd. (1986).

Of the anion-exchange resins, resins having the compositions described in JP-A-2-952 and JP-A-1-281152 are preferably used.

When regenerated developing solutions are used for processing, the overflowed solutions of the developing solutions may be used as the replenishers after regeneration, or continuous regeneration systems in which processing solutions of developing tanks are continuously brought into contact with ion-exchange resins may be employed.

In the present invention, desilverization is generally performed by bleaching and fixing after color development processing.

In the present invention, the photographic materials color developed are processed with processing solutions having bleaching ability. The term "processing solution having bleaching ability" used herein refers to a bleaching solution or a bleaching-fixing solution.

Typical desilverization methods comprising one or more processing stages using such processing solutions are as follows:

(1) Bleaching→Fixing
(2) Bleaching→Bleaching-fixing
(3) Bleaching→Washing→Fixing
(4) Rinsing Bleaching →Fixing
(5) Bleaching→Bleaching-fixing→Fixing
(6) Washing→Bleaching-fixing
(7) Bleaching-fixing
(8) Fixing→Bleaching-fixing Of the above-described methods, methods (1), (2) and (5) are particularly preferred, and method (2) is described in, for example, JP-A-61-75352.

In the present invention, a method in which desilverization is carried out with a processing solution having bleaching ability immediately after color development is preferred. In this case, the processing solution having bleaching ability is preferably a bleaching solution, which is extremely effective in such a method.

Oxidizing agents contained as main components in the processing solutions having bleaching ability used in the present invention include inorganic compounds such as red prussiate, ferric chloride, bichromates, persulfates and bromates; and partial organic compounds such as aminopolycarboxylic acid iron (III) complex salts. In the present invention, the aminopolycarboxylic acid iron (III) complex salts are preferably used to prevent environmental pollution, safety on handling, and protection against metal corrosion.

According to the present invention, the oxidizing agents contained in the processing solutions having bleaching ability preferably shows oxidation-reduction potential of 150 mV or higher, more preferably 180 mV or higher and the most preferably 200 mV or higher.

The oxidation-reduction potential is obtained by a method disclosed in "Transactions of the Faraday Society", vol. 55 (1959), pages 1312 to 1313.

Specific examples of the aminopolycarboxylic acid iron (III) complex salts in the present invention are shown below, but are not limited thereto: In each complex salts, a numeral in parentheses shows an oxidation-reduction potential in mV with respect to NHE at pH6.

1. N-(2-acetamido)iminodiacetic acid iron (III) complex salt (180)
2. Methyliminodiacetic acid iron (III) complex salt (200)
3. Iminodiacetic acid iron (III) complex salt (210)
4. 1,4-Butylenediaminetetraacetic acid iron (III) complex salt (230)
5. Diethylenethioetherdiaminetetraacetic acid iron (III) complex salt (230)
6. Glycoletherdiaminetetraacetic acid iron (III) complex salt (240)
7. 1,3-Propylenediaminetetraacetic acid iron (III) complex salt (250)
8. Ethylenediaminetetraacetic acid iron (III) complex salt (110)

9. Diethylenetriaminepentaacetic acid iron (III) complex salt (80)

10. Trans-1,2-cyclohexanediaminetetraacetic acid iron (III) complex salt (80)

Of these, compound No. 7, namely, 1,3-propylenediaminetetraacetic acid iron (III) complex salt (hereinafter briefly referred to as 1,3-PDTA-Fe (III)) is particularly preferred, which is the same compound as 1,3-diaminopropanetetraacetic acid iron (III) complex salt disclosed in JP-A-62-222252 and JP-A-64-24253.

Although the aminopolycarboxylic acid iron (III) complex salts are used as sodium salts, potassium salts or ammonium salts, the ammonium salts are most preferable for rapid bleaching.

In the present invention, the oxidizing agents are added to the processing solutions having bleaching ability in an amount of 0.17 mol/l of processing solution, and preferably in an amount of 0.25 mol/l or more for rapid processing and to reduce in bleach fogging and stains. The amount of oxidizing agents is most preferably 0.30 mol/l or more. However, the use of excessively high concentrated solutions inhibits the bleaching reaction; therefore, the upper limit of the amount of the oxidizing agents to be added is preferably about 0.7 mol/l.

Further, in the present invention, the oxidizing agents may be used alone or in combination. When two or more are used in combination, the total amount may be selected within the above-described range.

The advantages of the present invention are remarkably attained, when a concentration of potassium ion in the processing solution having bleaching ability shows 0.13 g-ion/l or more. The potassium ion is derived from a replenisher for the processing solution which contains potassium ion or a color development solution which is carried over to the processing solution by attaching with a surface of the photographic material processed. In case where an amount of the replenisher for the processing solution having bleaching ability is reduced, the processing solution is regenerated and reused, or an amount of a color development solution which has been carried over due to a low squeezee force, the potassium ion concentration shows higher level.

When the aminopolycarboxylic acid iron (III) complex salts are used in the processing solutions having bleaching ability, they can be added in the form of complex salts as described above. However, aminopolycarboxylic acids which form complexes, and ferric salts (for example, ferric sulfate, ferric chloride, ferric nitrate, ammonium ferric sulfate and ferric phosphate) may be allowed to coexist to form the complex salts in the bleaching solutions.

In the case of this complex formation, the aminopolycarboxylic acids may be added slightly in excess of the amount required to form the complexes with the ferric salt ions. When the aminopolycarboxylic acids are added in excess, it is preferred that the excess be in an amount of 0.01 to 10%.

The processing solutions with bleaching ability as described above are generally used at a pH of 2 to 8. To attain rapid processing, the pH is 2.5 to 4.2, preferably 2.5 to 4.0, and more preferably 2.5 to 3.5. It is preferred that the replenishers are generally used at a pH of 1.0 to 4.0.

In the present invention, known acids can be used to adjust the pH within the range described above.

As such acids, acids having a pKa of 2.0 to 5.5 are preferred. In the present invention, the pKa represents the logarithm of the reciprocal of the acid dissociation constant which is determined at an ionic strength of 0.1 at 25° C.

In the present invention, it is preferred that processing solutions with bleaching ability containing the acids having a pKa ranging from 2.0 to 5.5 in an amount of 1.2 mol/l or more are used in the desilverization stages to reduce bleach fogging and prevent increased staining of color undeveloped portions.

The acids having a pKa of 2.0 to 5.5 may be either inorganic acids, such as phosphoric acid, or organic acids such as acetic acid, malonic acid and citric acid. The organic acids are more effective in the above-described improvements. Of the organic acids, organic acids having carboxyl groups are particularly preferred.

The organic acids having a pKa of 2.0 to 5.5 may be either monobasic acids or polybasic acids. The polybasic acids can be used as metal salts (for example, sodium salts and potassium salts) or ammonium salts, as long as they have a pKa ranging from 2.0 to 5.5. These organic acids may also be used in combination. However, the aminopolycarboxylic acids and Fe complex salts thereof are excluded from the acids used here.

Preferred specific examples of the organic acids having a pKa of 2.0 to 5.5 which can be used in the present invention include aliphatic monobasic acids such as formic acid, acetic acid, monochloroacetic acid, monobromoacetic acid, glycolic acid, propionic acid, monochloropropionic acid, lactic acid, pyruvic acid, acrylic acid, butyric acid, isobutyric acid, pivalic acid, amino acid salts, valeric acid and isovaleric acid; amino acid compounds such as asparagine, alanine, arginine, ethionine, glycine, glutamine, cysteine, serine, methionine and leucine; aromatic monobasic acids such as benzoic acid, monochloro- or monohydroxy-substituted benzoic acid and nicotinic acid; aliphatic dibasic acids such as oxalic acid, malonic acid, succinic acid, tartaric acid, malic acid, maleic acid, fumaric acid, oxalacetic acid, glutaric acid and adipic acid; amino acid series dibasic acids such as aspartic acid, cystine and ascorbic acid; aromatic dibasic acids such as phthalic acid and terephthalic acid; polybasic acids such as citric acid.

Of these acids, the monobasic acids having carboxyl groups are preferred, and particularly, acetic acid and glycolic acid are preferable.

In the present invention, these acids should be used in a total amount of at least 0.5 mol/l of processing solution having bleaching ability, preferably 1.2 to 2.5 mol/l, and more preferably 1.5 to 2.0 mol/l1.

When the pH of the processing solutions having bleaching ability is adjusted within the above-described range, the above-described acids may be used in combination with alkali agents (for example, aqueous ammonia, KOH, NaOH, imidazole, monoethanolamine and diethanolamine). In particular, aqueous ammonia is preferable. As an alkali agent used as a bleaching starter when a mother liquor of the processing solution having bleaching ability is controlled from a replenisher, imidazole, monoethanolamine or diethanolamine are preferably used.

In the present invention, various bleaching promoters can be added to the processing solutions having bleaching ability or the preceding baths thereof. Examples of such bleaching promoters include compounds having mercapto groups or disulfide groups described in U.S. Pat. No. 3,893,858, West German Patent 1,290,812, British Patent 1,138,842, JP-A-53-95630 and *Research Disclosure*, No. 17129 (July, 1978); thiazolidine derivatives described in JP-A-50-140129; thiourea derivatives described in U.S. Pat. No. 3,706,561; iodides described in JP-A-58-16235; polyethylene oxide compounds described in West German Patent 2,748,430; and polyamine compounds described in JP-B-45-8836. Of these compounds, the mercapto compounds as described in British Patent 1,138,842 and JP-A-1-11256 are particularly preferable.

In addition to the oxidizing agents (bleaching agents) and the above-described compounds, rehalogenating agents such as bromides and chlorides may be added to the processing solutions having bleaching ability used in the present invention. Examples of the bromides include potassium bromide, sodium bromide and ammonium bromide, and examples of the chlorides include potassium chloride, sodium chloride and ammonium chloride. The concentration of the rehalogenating agents is 0.1 to 5 mol/l of processing solution, and preferably 0.5 to 3 mol/l.

Further, as corrosion inhibitors, ammonium nitrate is preferably used.

In the present invention, it is preferred that replenishing processes are employed. The replenishment rate of the bleaching solutions is 200 ml/$m^2$ of photographic material or less, and preferably 10 to 140 ml/$m^2$.

The bleaching time is 120 seconds or less, preferably 50 seconds or less, and more preferably 40 seconds or less. In the present invention, bleaching is effectively carried out for such a reduced processing time.

In processing, it is preferred to aerate the aminopolycarboxylic acid iron (III) complex salt-containing processing solutions having bleaching ability to oxidize the resulting aminopolycarboxylic acid iron (II) complex salts, to regenerate the bleaching agents and keep the photographic characteristics stable.

In processing with the processing solutions having bleaching ability in the present invention, evaporation correction is preferably employed, in which water is added corresponding to the amount of processing solutions evaporated. In particular, this technique is preferred for a bleaching solution containing a high potential oxidizing agent.

Although there is no restriction on the specific processes which can be used to replenish water, examples thereof include the following processes (1) to (4):

(1) The process of determining the amount of evaporated water in a monitor tank provided in addition to a bleaching tank, calculating the amount of evaporated water in the bleaching tank from the amount of evaporated water in the monitor tank, and replenishing water to the bleaching tank in proportion to the determined amount of evaporated water (see JP-A-1-254959 and JP-A-1-254960). In this case, water should be replenished in a definite amount at one time.

(2) The process of monitoring the specific gravity of a bleaching solution in a bleaching tank, and supplying a definite amount of water when the specific gravity increases above a certain value.

(3) The process of replenishing water when the level of the surface of the bleaching solution in a bleaching tank is lowered by a specified amount due to evaporation.

(4) The process of estimating the amount of evaporated water from a processor and environmental conditions, and replenishing water in a definite amount corresponding to the estimated amount.

These processes may be conducted once a day or several times a day.

Of the above-described processes (1) to (4), the processes (3) and (4) are preferable, because changes in composition of the processing solution can be effectively prevented by such a simple procedure.

In the case of process (3), it is preferred that the level of the surface of the solution be detected by a level sensor and when the level is lowered to a certain value, water is replenished in an amount corresponding to the lowering of the level.

In the present invention, the photographic materials bleached with the processing solutions having bleaching ability are processed with processing solutions having fixing ability. When bleaching processing is carried out with bleaching-fixing solutions, subsequent fixing processing may or may not be conducted. The term "processing solution having fixing ability" means a fixing solution or a bleaching-fixing solution, specifically.

The processing solutions having fixing ability contain fixing agents.

The fixing agents which can be used include thiosulfates such as sodium thiosulfate, ammonium thiosulfate, sodium ammonium thiosulfate, potassium thiosulfate; thiocyanates (rhodanates) such as sodium thiocyanate, ammonium thiocyanate and potassium thiocyanate; thiourea; and thioethers. Of these compounds, ammonium thiosulfate is preferable. The amount of the fixing agents used generally is 0.3 to 3 mol/l of fixing solution or bleaching-fixing solution, and preferably 0.5 to 2 mol/l. To enhance fixing, it is also preferred that ammonium thiocyanate (ammonium rhodanate), imidazole, thiourea and thioethers (for example, 3,6-dithia-1,8-octanediol) described above are used in combination. In particular, imidazole compounds described in JP-A-49-40943 are preferable. The total amount of these compounds used in combination is 0.01 to 0.1 mol/l of fixing solution or bleaching-fixing solution, and preferably 0.1 to 0.5 mol/l. In some cases, the fixing effect can also be substantially enhanced by using 1 to 3 mol/l of the compounds.

As the fixing agents contained in the fixing solutions or the bleaching-fixing solutions, it is particularly preferred that thiosulfates be used in combination with thiocyanates to achieve rapid processing. In this case, the thiosulfates are used in an amount of 0.3 to 3 mol/l, and the thiocyanates are used in an amount of 1 to 3 mol/l, preferably in an amount of 1 to 2.5 mol/l. In particular, it is preferred that ammonium thiosulfate be used in combination with ammonium thiocyanate.

In addition, compounds other than the thiocyanates which can be used in combination with the thiosulfates (particularly, ammonium thiosulfate) include thiourea, thioethers (for example, 3,6-dithia-1,8-octanediol). The total amount of these compounds used in combination is generally about 0.01 to 0.1 mol/l of fixing solution or bleaching-fixing solution. In some cases, however, they are used in an amount of 1 to 3 mol/l.

The fixing solutions or the bleaching-fixing solutions may contain preservatives such as sulfites (for example, sodium sulfite, potassium sulfite and ammonium sulfite), and bisulfite addition products of hydroxylamine, hydrazine or aldehydes (for example, acetaldehyde sodium bisulfite, particularly the compounds described in Japanese Patent Application No. 1-298935). In particular, the water-soluble sulfinic acid compounds described in JP-A-1-231051 are preferable for use as preservatives. The fixing solutions or the bleaching-fixing solutions may also contain various fluorescent brightening agents, antifoaming agents, surfactants, and solvents such as polyvinyl pyrrolidone and methanol.

The bleaching-fixing solutions may also contain the above-described compounds which can be contained in the bleaching solutions.

In the present invention, the processing solutions having fixing ability can be desilverized by conventional methods, and the regenerated solutions thus desilverized can be used in processing. Effective desilverization methods include the electrolysis method (described in French Patent 2,299,667), the precipitation method (described in JP-A-52-73037 and West German Patent 2,331,220), the ion exchange method (described in JP-A-51-17114 and West German Patent 2,584,237) and the metal substitution method (described in British Patent 1,353,805). These desilverization methods are enhanced for rapid processing by in-line operation from tank solutions.

Similarly with the above-described bleaching processing, it is preferred that bleaching-fixing processing be conducted while replenishing water in an amount corresponding to the amount of evaporated water together with the replenishment of the processing solution.

The amount of the bleaching agents contained in the bleaching-fixing solutions is 0.01 to 0.5 mol/l of bleaching-fixing solution, preferably 0.015 to 0.3 mol/l, and more preferably 0.02 to 0.2 mol/l.

In the present invention, the bleaching-fixing solutions (mother liquors) used at the start of the processing are prepared by dissolving the above-described compounds used for the bleaching-fixing solutions in water. However, they may be prepared by mixing appropriate amounts of bleaching solutions and fixing solutions prepared separately. The pH of the fixing solutions is preferably 5 to 9, and more preferably 7 to 8. The pH of the bleaching-fixing solutions is preferably 6 to 8.5, and more preferably 6.5 to 8.0.

When replenishment processes are employed, the replenishment rate of the fixing solutions or the bleaching-fixing solutions is preferably 300 to 3,000 ml/$m^2$ of photographic material, and more preferably 300 to 1,000 ml/$m^2$.

Further, various aminopolycarboxylic acids and organic phosphonic acids are preferably added to the fixing solutions or the bleaching-fixing solutions for the purpose of stabilizing the solutions. Preferred examples of such compounds include 1-hydroxyethylidene-1,1-diphosphonic acid, ethylenediamine-N,N,N',N'-tetramethylenephosphonic acid, nitrilotrimethylenephosphonic acid, ethylenediaminetetraacetic acid, diethylenetriaminepentaacetic acid, cyclohexanediaminetetraacetic acid and 1,2-propylenediaminetetraacetic acid. Of these compounds, 1-hydroxyethylidene-1,1-diphosphonic acid and ethylenediaminetetraacetic acid are particularly preferable.

In the present invention, the total time required for the fixing processing is preferably 0.5 to 2 minutes, and more preferably 0.5 to 1 minute.

The shorter the total processing time of the desilverization, the more significant the effect of the present invention. The time is preferably 1 to 4 minutes, and more preferably 1 minute and 30 seconds to 3 minutes. In addition, the processing temperature is 25° to 50° C., and preferably 35° to 45° C. Within the preferred temperature range, the desilverization speed is increased and the generation of stains after processing is effectively prevented.

The present invention can also be applied to the desilverization processing of a photographic material which has passed through, for example, a stop bath, a compensating bath and a washing bath, after the above-described color development processing.

In the desilverization method of the present invention comprising bleaching, bleaching-fixing and fixing, it is preferred that stirring be performed as fully as possible to enhance the effect of the present invention.

Specific methods for thorough stirring include the method described in JP-A-62-183460 in which a jet of a processing solution collides with the surface of an emulsion layer formed of a photographic material; the method described in JP-A-62-183461 in which the stirring effect is enhanced using rotary means; the method of transferring a photographic material while bringing a wiper blade provided in a solution into contact with the surface of an emulsion layer to cause turbulence on the surface, thereby improving the stirring effect; and, the method of increasing the circulating flow rate of the entire processing solution.

The above-described means for improving the stirring effect are more effective when bleaching promoters are used, and the bleaching promoting effect can be significantly increased or the fixing inhibition action due to the bleaching promoters can be removed.

It is preferred that the above-described enhanced stirring be applied to the color developing solutions, to the rinsing water, and/or to the stabilizing solutions.

The present method is generally continuously carried out using an automatic processor. It is preferred that the automatic processor have means for transferring a photographic material described in JP-A-60-191257, JP-A-60-191258 and JP-A-60-191259. As described in JP-A-60-191257, such transferring means can significantly reduce the amount of processing solution added from a preceding bath to a subsequent bath, and the deterioration of the processing solution is effectively prevented. Such an effect is particularly effective to shorten the processing time in each stage and to reduce the replenishment rate of the processing solution.

In the processing methods of the present invention, processing stages such as washing and stabilization are generally carried out after the above-described processing stage using the processing solution having fixing ability. However, a simplified processing process may also be employed in which stabilization processing is conducted without substantial washing after processing with the processing solution having fixing ability.

The washing and/or stabilizing process of the present invention is explained in more detailed below. An example of the processing steps followed by a desilvering step is as follows:

(Desilvering)-washing-drying
(Desilvering)-stabilizing-drying
(Desilvering)-rinsing-washing-drying
(Desilvering)-rinsing-stabilizing-drying
(Desilvering)-washing-stabilizing-drying
(Desilvering)-rinsing-washing-stabilizing-drying In these process, a rinsing step generally means a step in which the photosensitive material is rinsed shortly with a water used in the washing step or with a small amount of replenisher. Accordingly, the steps followed by the desilvering may generally be defined as washing and/or stabilizing steps.

A total processing time required by the washing and/or stabilizing steps above is preferably 90 seconds or shorten. To shorter a processing time is preferable not only to comply with a clients' requirement, but also to satisfy shortening working hours for employee, thereby achieving lowering operation cost due to cut down in a labour cost. The total processing time for washing and/or stabilizing steps is more preferably 60 seconds or shorter, with the most preferably 45 seconds or shorter. The lower limit for the processing time is not limited unless a product processed shows unacceptable properties after treatment, and the lower limit may be about 5 seconds.

Rinsing water used in the washing stage may contain various surfactants to prevent the occurrence of water spots in drying photographic materials after processing. These surfactants include polyethylene glycol type nonionic surfactants, polyhydric alcohol type nonionic surfactants, alkylbenzenesulfonate type anionic surfactants, higher alcohol sulfate type anionic surfactants, alkylnaphthalene sulfonate type anionic surfactants, quaternary ammonium salt type cationic surfactants, amine salt type cationic surfactants, amino acid type amphoteric surfactants and betaine type amphoteric surfactants. In some cases, ionic surfactants bind to various ions included during processing to form insoluble materials, so that nonionic surfactants are preferable. In particular, alkylphenolethylene oxide addition products are preferred. As the alkylphenols, octylphenol, nonylphenol, dodecylphenol and dinonylphenol are particularly preferred. It is particularly preferred that 8 to 14 mol of ethylene oxide be added to the rinsing solution. Further, silicone surfactants having antifoaming effects may also be used.

The rinsing water may contain various antibacterial agents and antifungal agents to prevent scale from developing and mold from being produced on the photographic materials after processing. Examples of such antibacterial agents and antifungal agents include thiazolylbenzimidazole compounds described in JP-A-57-157244 and JP-A-58-105145; isothiazolone compounds described in JP-A-54-27424 and JP-A-57-8542; chlorophenol compounds represented by trichlorophenol; bromophenol compounds; organotin or organozinc compounds; thiocyanic acid isothiocyanic acid compounds; acid amide compounds; diazine or triazine compounds; thiourea compounds; benzotriazolealkylguanidine compounds; quaternary ammonium salts represented by benzalkonium chloride; antibiotics represented by penicillin; and general-purpose antifungal agents described in *J. Antibact. Antifung. Agents*, Vol. 11, No. 5, pages 207 to 223 (1983). These agents may be used in combination.

The various disinfectants described in JP-A-48-83820 can also be used.

In addition, the rinsing water should also contain various chelating agents.

Examples of such chelating agents include aminopolycarboxylic acids such as ethylenediaminetetraacetic acid and diethylenetriaminepentaacetic acid; organic phosphonic acids such as 1-hydroxyethylidene-1,1-diphosphonic acid and ethylenediamine-N,N,N',N'-tetramethylenephosphonic acid; and the hydrolyzed products of maleic anhydride polymers described in EP-A-345172.

Furthermore, it is preferred that the rinsing water contain the preservatives which may be utilized in the fixing solutions or the bleaching-fixing solutions described above.

As stabilization solutions used for the stabilization stage, processing solutions for stabilizing dye images are used. For example, solutions containing organic acids, solutions with buffer ability having a pH of 3 to 6 or solutions containing aldehydes (for example, formalin or glutaraldehyde) can be used. The stabilization solutions can contain all of the compounds which may be contained in the rinsing water. In addition, the stabilization solutions may contain ammonium compounds such as ammonium chloride and ammonium sulfite; metal compounds such as Bi compounds and Al compounds; fluorescent brighteners; various dye stabilizers including N-methylol compounds described in JP-A-2-153350 and JP-A-2-153348, and U.S. Pat. No. 4,859,574; hardening agents; and alkanolamines described in U.S. Pat. No. 4,786,583. Stabilizing methods using the above-described dye stabilizers can be used.

In the washing stage or the stabilization stage, a countercurrent system is preferably employed and the number of steps is preferably 2 to 4.

The replenishment rate per unit area is 1 to 50 times the amount of the solution introduced from the preceding bath, preferably 2 to 30 times, and more preferably 2 to 15 times.

Preferred examples of water used in the washing stage or the stabilization stage include water deionized to a Ca, Mg concentration of 5 mg/l or less with an ion-exchange resin and water sterilized with halogen or an ultraviolet germicidal lamp as well as city water.

Water for replenishing evaporated water may be city water, but the above-described deionized or sterilized water is preferably used in the washing stage or the stabilization stage.

In the present invention, not only for the bleaching solutions and the bleaching-fixing solutions, but also for other processing solutions, it is preferred that water, correcting solutions or processing replenishers are replenished in an appropriate amount.

Further, the amount of waste liquid in an overflowed solution in the washing stage or the stabilization stage can be preferably decreased by flowing the solution into a bath having fixing ability, or a preceding bath.

The effect of the present method is outstanding when the total processing time (with the exception of the drying time) is short. Specifically, it is clearly exhibited when the total processing time is 8 minutes or less. When the total processing time is 7 minutes or less, the difference from conventional processing methods becomes significant. In the present invention, therefore, the total processing time is preferably 8 minutes or less, and more preferably 7 minutes or less.

The present invention will be further illustrated in greater detail with reference to the following examples, which are, however, not to be construed as limiting the invention.

EXAMPLE 1

A cellulose triacetate support having an under coat was coated with respective layers having the following compositions, one over the other, to prepare Sample 101, a multilayer color photographic material.

Layer Structure

The composition of each layer is indicated below.

The numerals corresponding to the respective components indicate the coated amount in $g/m^2$. For silver halides, the numerals indicate the coated amount in g/m$^2$ after calculation as silver. However, for sensitizing dyes, the numerals indicate the coated amount in mols per mol of silver halide contained in the same layer.

| | | |
|---|---|---|
| First Layer (Antihalation Layer) | | |
| Black Colloidal Silver | as silver | 0.18 |
| Gelatin | | 1.40 |
| Second Layer (Intermediate Layer) | | |
| 2,5-Di-t-Pentadecylhydroquinone | | 0.18 |
| EX-1 | | 0.070 |
| EX-3 | | 0.020 |
| EX-12 | | $2.0 \times 10^{-3}$ |
| U-1 | | 0.060 |
| U-2 | | 0.080 |
| U-3 | | 0.10 |
| HBS-1 | | 0.10 |
| HBS-2 | | 0.020 |
| Gelatin | | 1.04 |
| Third Layer (First Red-Sensitive Emulsion Layer) | | |
| Emulsion A | as silver | 0.25 |
| Emulsion B | as silver | 0.25 |
| Sensitizing Dye I | | $6.9 \times 10^{-5}$ |
| Sensitizing Dye II | | $1.8 \times 10^{-5}$ |
| Sensitizing Dye III | | $3.1 \times 10^{-4}$ |
| EX-2 | | 0.17 |
| EX-14 | | 0.20 |
| EX-10 | | 0.020 |
| EX-17 | | 0.050 |
| U-1 | | 0.070 |
| U-2 | | 0.050 |
| U-3 | | 0.070 |
| HBS-1 | | 0.060 |
| Gelatin | | 0.87 |
| Fourth Layer (Second Red-Sensitive Emulsion Layer) | | |
| Emulsion G | as silver | 1.00 |
| Sensitizing Dye I | | $5.1 \times 10^{-5}$ |
| Sensitizing Dye II | | $1.4 \times 10^{-5}$ |
| Sensitizing Dye III | | $2.3 \times 10^{-4}$ |
| EX-2 | | 0.20 |
| EX-14 | | 0.23 |
| EX-3 | | 0.050 |
| EX-10 | | 0.015 |
| EX-17 | | 0.060 |
| U-1 | | 0.070 |
| U-2 | | 0.050 |
| U-3 | | 0.070 |
| Gelatin | | 1.30 |
| Fifth Layer (Third Red-Sensitive Emulsion Layer) | | |
| Emulsion D | as silver | 1.60 |
| Sensitizing Dye I | | $5.4 \times 10^{-5}$ |
| Sensitizing Dye II | | $1.4 \times 10^{-5}$ |
| Sensitizing Dye III | | $2.4 \times 10^{-4}$ |
| EX-2 | | 0.097 |
| EX-3 | | 0.010 |
| EX-4 | | 0.080 |
| EX-17 | | 0.020 |
| HBS-1 | | 0.22 |
| HBS-2 | | 0.10 |
| Gelatin | | 1.63 |
| Sixth Layer (Intermediate Layer) | | |
| Ex-5 | | 0.040 |
| HBS-1 | | 0.020 |
| Gelatin | | 0.80 |
| Seventh Layer (First Green-Sensitive Emulsion Layer) | | |
| Emulsion A | as silver | 0.15 |
| Emulsion B | as silver | 0.15 |
| Sensitizing Dye IV | | $3.0 \times 10^{-5}$ |
| Sensitizing Dye V | | $1.0 \times 10^{-4}$ |
| Sensitizing Dye VI | | $3.8 \times 10^{-4}$ |
| EX-1 | | 0.021 |
| EX-6 | | 0.13 |
| EX-16 | | 0.14 |
| EX-7 | | 0.023 |
| EX-8 | | 0.025 |

-continued

| | | |
|---|---|---|
| HBS-1 | | 0.41 |
| HBS-3 | | 0.005 |
| Gelatin | | 0.63 |
| Eight Layer (Second Green-Sensitive Emulsion Layer) | | |
| Emulsion C | as silver | 0.45 |
| Sensitizing Dye IV | | $2.1 \times 10^{-5}$ |
| Sensitizing Dye V | | $7.0 \times 10^{-5}$ |
| Sensitizing Dye VI | | $2.6 \times 10^{-4}$ |
| EX-6 | | 0.047 |
| EX-15 | | 0.065 |
| EX-7 | | 0.026 |
| EX-8 | | 0.018 |
| HBS-1 | | 0.22 |
| HBS-3 | | $4.0 \times 10^{-3}$ |
| Gelatin | | 0.50 |
| Ninth Layer (Third Green-Sensitive Emulsion Layer) | | |
| Emulsion E | as silver | 1.20 |
| Sensitizing Dye IV | | $3.5 \times 10^{-5}$ |
| Sensitizing Dye V | | $8.0 \times 10^{-5}$ |
| Sensitizing Dye VI | | $3.0 \times 10^{-4}$ |
| EX-1 | | 0.025 |
| EX-11 | | 0.05 |
| EX-15 | | 0.07 |
| EX-13 | | 0.015 |
| HBS-1 | | 0.25 |
| HBS-2 | | 0.10 |
| Gelatin | | 1.54 |
| Tenth Layer (Yellow Filter Layer) | | |
| Yellow Colloidal Silver | as silver | 0.050 |
| EX-5 | | 0.080 |
| HBS-1 | | 0.030 |
| Gelatin | | 0.95 |
| Eleventh Layer (First Blue-Sensitive Emulsion Layer) | | |
| Emulsion A | as silver | 0.080 |
| Emulsion B | as silver | 0.070 |
| Emulsion F | as silver | 0.070 |
| Sensitizing Dye VII | | $3.5 \times 10^{-4}$ |
| EX-8 | | 0.042 |
| EX-9 | | 0.72 |
| HBS-1 | | 0.15 |
| Gelatin | | 1.10 |
| Twelfth Layer (Second Blue-Sensitive Emulsion Layer) | | |
| Emulsion G | as silver | 0.45 |
| Sensitizing Dye VII | | $2.1 \times 10^{-4}$ |
| EX-9 | | 0.15 |
| EX-10 | | $7.0 \times 10^{-3}$ |
| HBS-1 | | 0.032 |
| Gelatin | | 0.78 |
| Thirteenth Layer (Third Blue-Sensitive Emulsion Layer) | | |
| Emulsion H | as silver | 0.77 |
| Sensitizing Dye VII | | $2.2 \times 10^{-4}$ |
| EX-9 | | 0.20 |
| HBS-1 | | 0.040 |
| Gelatin | | 0.69 |
| Fourteenth Layer (First Protective Layer) | | |
| Emulsion I | as silver | 0.20 |
| U-4 | | 0.11 |
| U-5 | | 0.17 |
| HBS-1 | | $5.0 \times 10^{-2}$ |
| Gelatin | | 1.00 |
| Fifteenth Layer (Second Protective Layer) | | |
| H-1 | | 0.40 |
| B-1 (diameter: 1.7 μm) | | $5.0 \times 10^{-2}$ |
| B-2 (diameter: 1.7 μm) | | 0.10 |
| B-3 | | 0.10 |
| S-1 | | 0.20 |
| Gelatin | | 1.20 |

In addition, all of the layers contain W-1, W-2, W-3, W-4, W-5, B-4, B-5, F-1, F-2, F-3, F-4, F-5, F-6, F-7, F-8, F-9, F-10, F-11, F-12, F-13, F-14, F-15, an iron salt, a lead salt, a gold salt, a platinum salt, an iridium salt and a rhodium salt to improve keeping quality, processability, pressure resistance, mold proofing, bacteria proofing, antistatic quality and coating quality.

| | Mean AgI Content (%) | Mean Grain Size (μm) | Coefficient of Variation of Grain Size (%) | Grain Diameter/ Thickness Ratio | Silver Amount Ratio (AgI Content %) |
|---|---|---|---|---|---|
| Emulsion A | 4.0 | 0.25 | 15 | 1.0 | Core/shell = 1/3 (13/1), double structural grain |
| Emulsion B | 8.9 | 0.40 | 14 | 1.0 | Core/shell = 3/7 (25/2), double structural grain |
| Emulsion C | 10 | 0.75 | 18 | 5.5 | Core/shell = 1/2 (24/3), double structural grain |
| Emulsion D | 16 | 0.90 | 20 | 7.5 | Core/shell = 4/6 (40/0), double structural grain |
| Emulsion E | 10 | 0.85 | 19 | 6.0 | Core/shell = 1/2 (24/3), double structural grain |
| Emulsion F | 4.0 | 0.25 | 28 | 1.0 | Core/shell = 1/3 (13/1), double structural grain |
| Emulsion G | 14.0 | 0.60 | 17 | 7.0 | Core/shell = 1/2 (42/0), double structural grain |
| Emulsion H | 14.5 | 1.10 | 20 | 5.0 | Core/shell = 37/63 (34/3), double structural grain |
| Emulsion I | 1 | 0.07 | 15 | 1 | Uniform grain |

EX-1

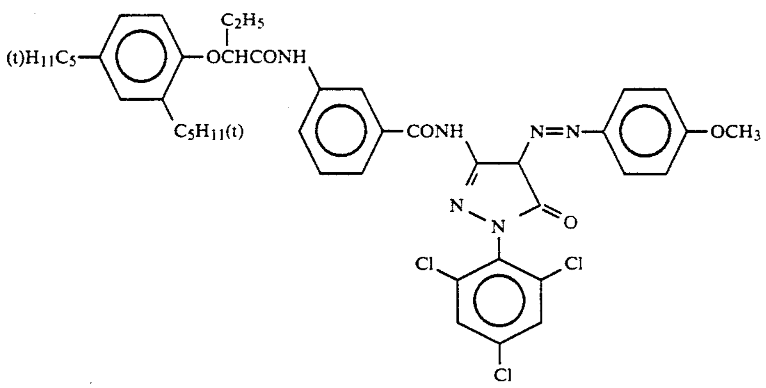

EX-2

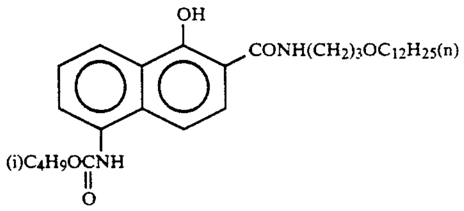

EX-3

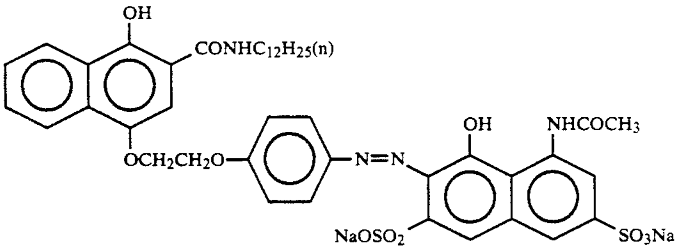

EX-4

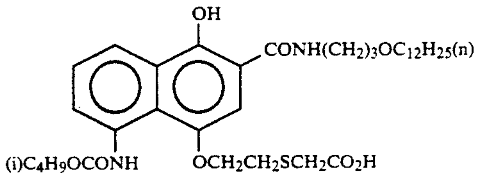

-continued
EX-5
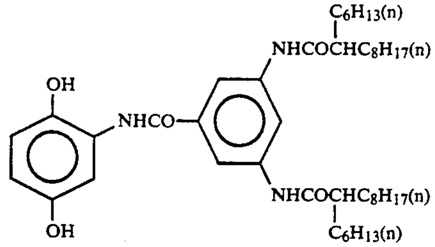
EX-6
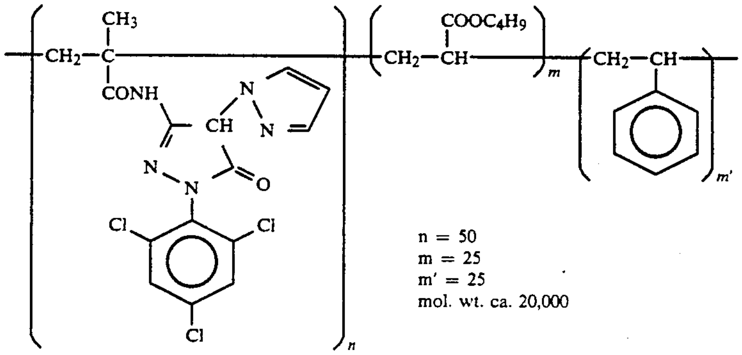
EX-7
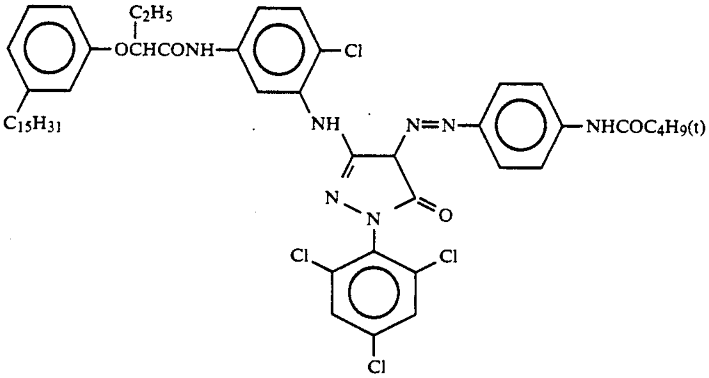
EX-8
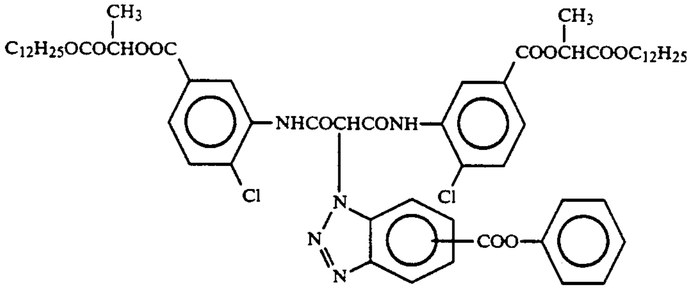
EX-9
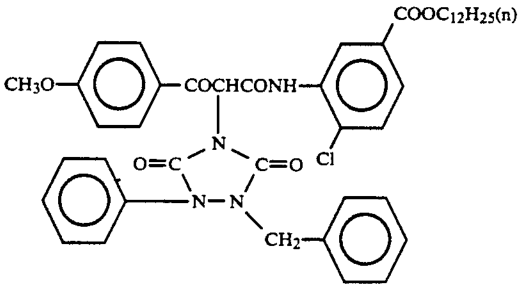

-continued
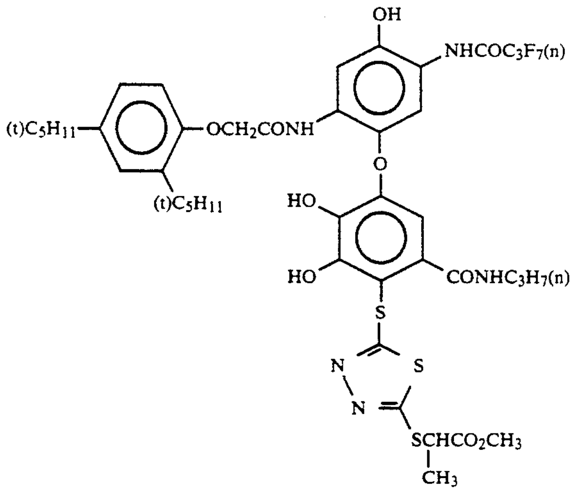
EX-10
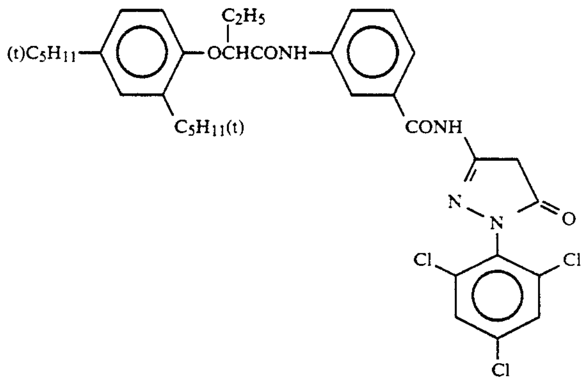
EX-11
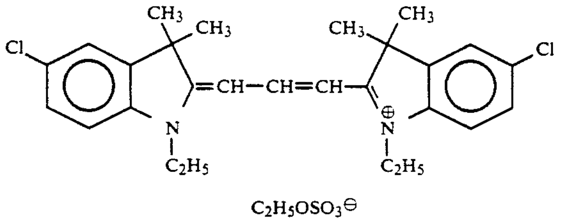
EX-12
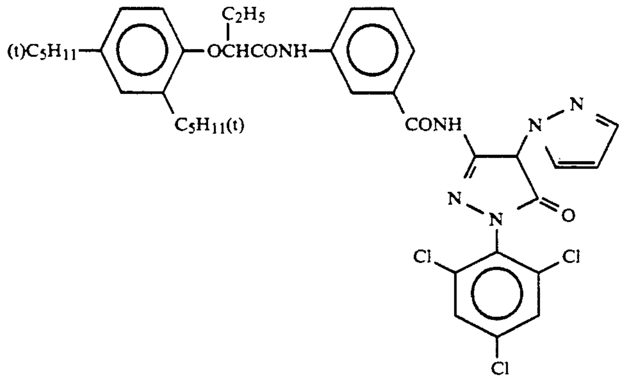
EX-13

-continued
EX-14
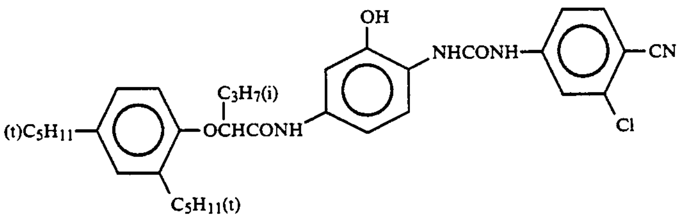
EX-15
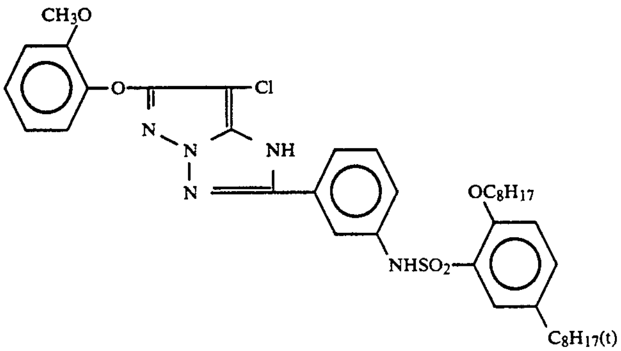
EX-16
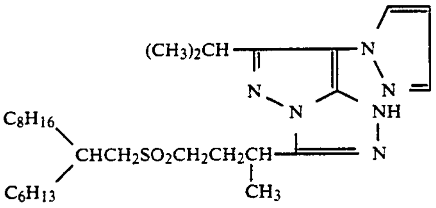
EX-17
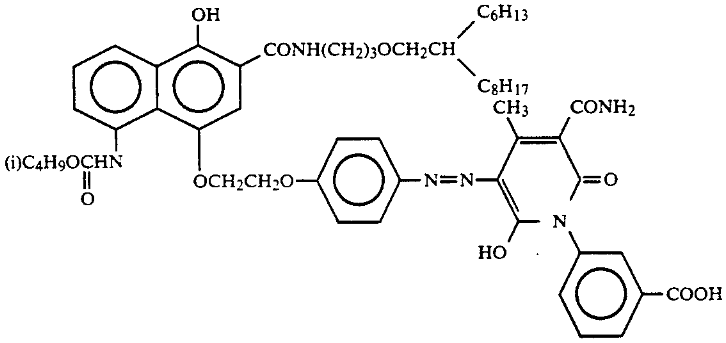
U-1
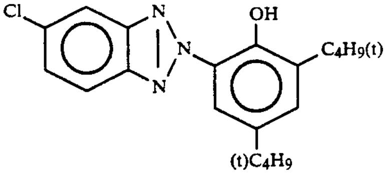
U-2
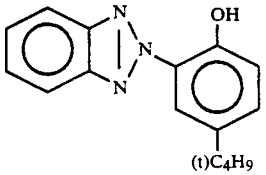

-continued
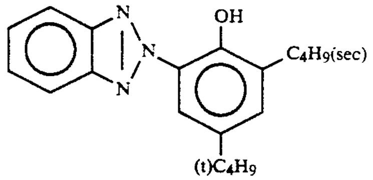
U-3
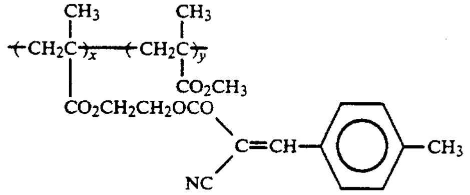
x:y = 70:30 (wt %)
U-4
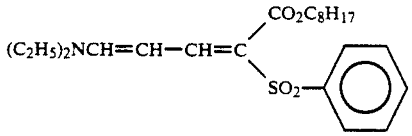
U-5
Tricresyl Phosphate HBS-1
Di-n-butyl Phthalate HBS-2
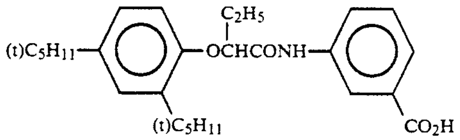
HBS-3
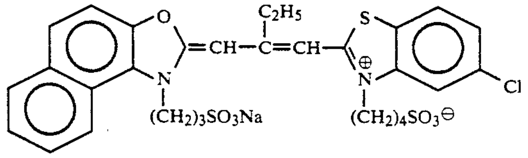
Sensitizing Dye I
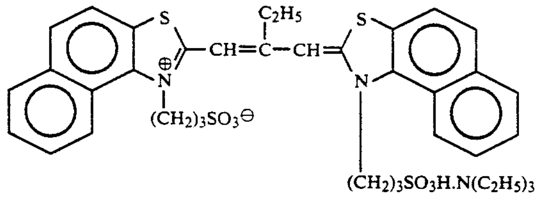
Sensitizing Dye II
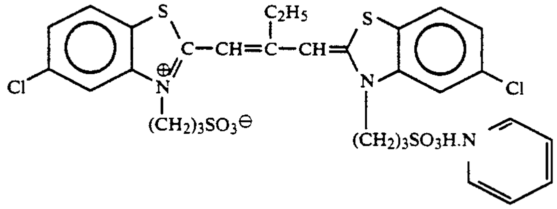
Sensitizing Dye III
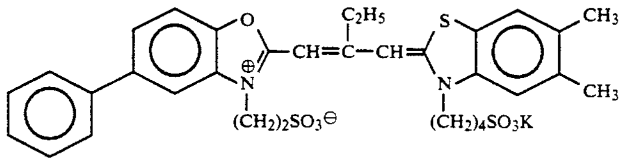
Sensitizing Dye IV -continued
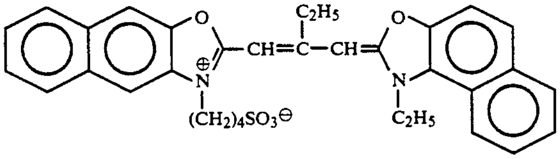
Sensitizing Dye V
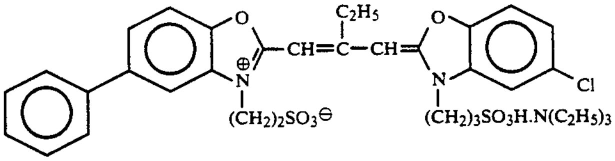
Sensitizing Dye VI
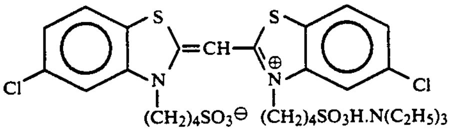
Sensitizing Dye VII
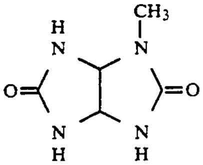
S-1
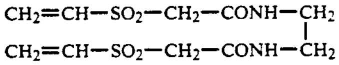
H-1
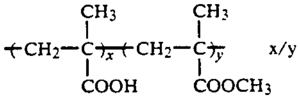
x/y = 10/90 mol/mol
B-1
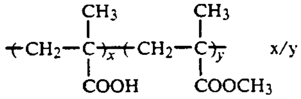
x/y = 40/60 mol/mol
B-2
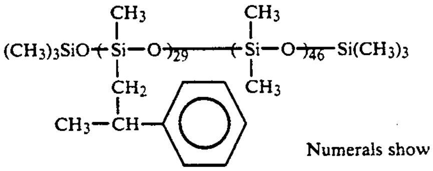
Numerals show mol ratio
B-3
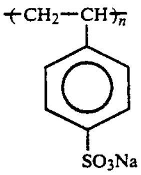
B-4
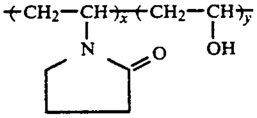
x/y = 70/30 mol/mol
B-5
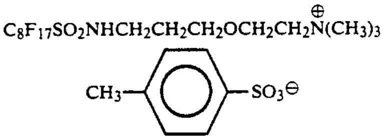
W-1

-continued
W-2
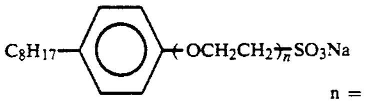
n = 2~4
W-3
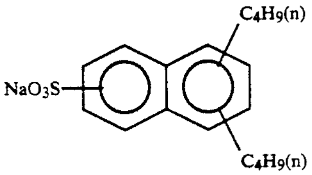
W-4
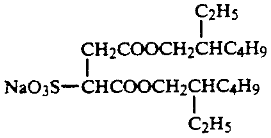
W-5
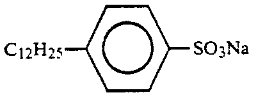
F-1
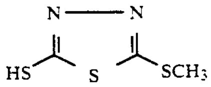
F-2
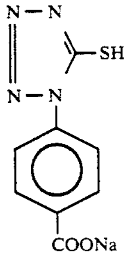
F-3
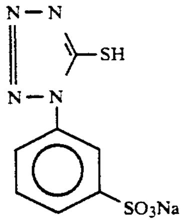
F-4
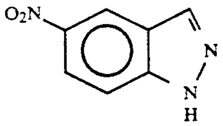
F-5
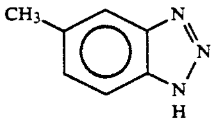
F-6
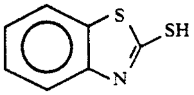

-continued

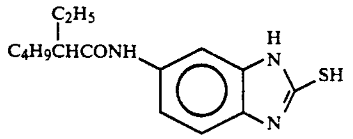

F-7

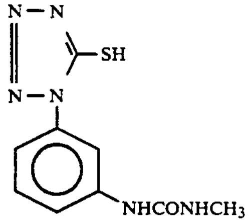

F-8

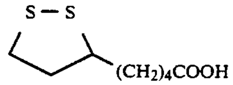

F-9

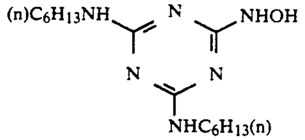

F-10

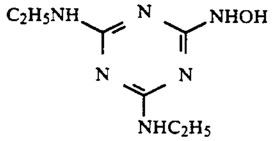

F-11

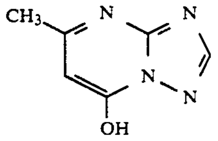

F-12

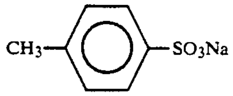

F-13

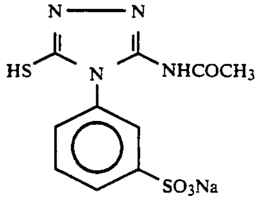

F-14

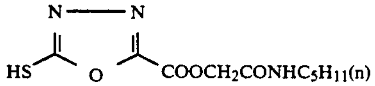

F-15

Then, samples were prepared in the same manner as with Sample 101 with the exception that equimolar couplers represented by general formula (I) in the present invention are substituted for EX-8 used in the seventh and eighth layers of the green-sensitive emulsion layers and EX-8 and EX-9 used in the eleventh to thirteenth layers of the blue-sensitive emulsion layers in Sample 101, respectively, as shown in Table 1-1.

TABLE 1-1

| | Green-Sensitive Emulsion Layer | | Blue-Sensitive Emulsion Layer | | |
|---|---|---|---|---|---|
| Sample No. | 7th Layer | 8th Layer | 11th Layer | 12th Layer | 13th Layer |
| 101 (Comparison) | EX-8 EX-9 | EX-8 | EX-8 | EX-9 | EX-9 |
| 102 (Invention) | B-26 EX-9 | B-26 | B-26 | EX-9 | EX-9 |
| 103 (Invention) | EX-8 A-13 | EX-8 | EX-8 | A-13 | A-13 |

TABLE 1-1-continued

| Sample No. | Green-Sensitive Emulsion Layer 7th Layer | 8th Layer | Blue-Sensitive Emulsion Layer 11th Layer | 12th Layer | 13th Layer |
|---|---|---|---|---|---|
| 104 (Invention) | B-26 A-13 | B-26 | B-26 | A-13 | A-13 |

Samples 101 to 104 prepared as described above were slitted to a width of 35 mm and processed, followed by exposure in a camera. Then, each sample was continuously processed in the following processing stages by using a small-sized automatic processor, changing the replenishment rate of a color developing solution as shown in Table 1-3. The amount of a developing agent corresponding to the replenishment rate of the color developing solution and the amount of potassium bromide are shown in Table 1-2 together with a concentration of potassium ion in the bleaching solution at the end of the continuous treatment.

Experiments carried out in this example are as follows:

(1-1) Continuous Processability

For each sample, wedge exposure to white light (color temperature of light source: 4,800° K.) was performed, followed by processing. Then, each of the above-described samples exposed in the camera were processed until the replenishment rate of the color developing solution reached three times the tank capacity of the color developing solution. Thereafter, wedge exposure to white light was performed again, followed by processing.

For each of the resulting samples, the density was measured by blue (B) light, green (G) light and the red (R) light, and the logarithm (sensitivity, S) of the reciprocal of exposure which gave a density of the minimum density (Dmin)+0.2 was determined from the characteristic curve thereof.

The difference in sensitivity between a value before the start of continuous processing and a value after the termination thereof (ΔS) was calculated for the same sample and the same processing on the basis of the value before the start of continuous processing.

Results obtained by measurement with the B light are shown in Table 1-3 as $\Delta S_B$.

(1-2) Color Image Fastness

Each of the samples obtained by processing after the termination of continuous processing was stored for 7 days under the conditions of 80° C. and 70% relative humidity. The density value of the sample after the termination of the test at exposure giving a density of the minimum density+0.1 before the start of the test was read, and the difference therebetween (ΔD) was determined on the basis of the density before the start of the test. Results obtained by measurement with B light are also shown in Table 1-3.

(1-3) Sharpness

An MTF pattern was exposed with white light, and processing was carried out using a processing solution after the termination of continuous processing. Then, the MTF value of a yellow color image was measured. Results are also shown in Table 1-3.

| Stage | Processing Time | Processing Temperature (°C.) | Replenishment Rate (ml) | Tank Capacity (l) |
|---|---|---|---|---|
| Color Development | 3 min. 15 sec. | 38.0 | Described in Table 1-3 | 1 |
| Bleaching | 30 sec. | 38.0 | 130 | 1 |
| Fixing | 2 min. | 38.0 | 800 | 1 |
| Washing (1) | 20 sec. | 38.0 | Countercurrent piping system from (2) to (1) | 0.5 |
| Washing (2) | 20 sec. | 38.0 | 500 | 0.5 |
| Stabilization | 20 sec. | 38.0 | 500 | 0.5 |
| Drying | 1 min. | 55.0 | | |

In the above Table, the replenishment rate is indicated by the amount per $m^2$ of photographic material.

The compositions of the processing solutions used are shown below:

| | Mother Liquor (g) | Replenisher (g) |
|---|---|---|
| Color Developing Solution | | |
| Diethylenetriaminepenta-acetic Acid | 1.0 | 1.0 |
| 1-Hydroxyethylidene-1,1-diphosphonic Acid | 3.0 | 3.2 |
| Sodium Sulfite | 4.0 | 4.9 |
| Potassium Carbonate | 30.0 | 30.0 |
| Potassium Bromide | 1.4 | Described in Table 1-2 |
| Potassium Iodide | 1.5 mg | — |
| Hydroxylamine Sulfate | 2.4 | 3.6 |
| 4-(N-Ethyl-N-β-hydroxyethyl-amino)-2-methylaniline Sulfate | 4.5 | Described in Table 1-2 |
| Water to make | 1.0 l | 1.0 l |
| pH | 10.05 | Described in Table 1-2 |
| Bleaching Solution | | |
| 1,3-Diaminopropanetetra-acetic Acid Ferric Ammonium Monohydrate | 0.25 mol | 0.45 mol |
| Ammonium Bromide | 140.0 | 180.0 |
| Ammonium Nitrate | 30.0 | 40.0 |
| Acetic Acid (98%) | 25.0 ml | 30.0 ml |
| Glycolic Acid | 70.0 | 100.0 |
| Water to make | 1.0 l | 1.0 l |
| pH (adjusted with aqueous ammonia (28%)) | 4.3 | 4.0 |
| Fixing Solution | | |
| 1-Hydroxyethylidene-1,1-diphosphonic Acid | 1.0 | 1.5 |
| Ammonium Sulfite | 12.0 | 20.0 |
| Ammonium Thiosulfate | 1.5 mol | 1.7 mol |
| Water to make | 1.0 l | 1.0 l |
| pH | 6.7 | 6.4 |
| Washing Solution (common to mother liquor and replenisher) | | |

City water was passed through a mixed bed column filled with an H type strong acidic cation exchange resin (Amberlite IR-120B, manufactured by Rohm & Haas Inc.) and an OH type anion exchange resin (Amberlite IR-400, manufactured by Rohm & Haas Inc.) to reduce the calcium and magnesium ion concentrations to 3 mg/l or less, and subsequently 200 mg/l of sodium isocyanurate dichloride and 0.13 g/l of sodium sulfate were added thereto. The pH of the resulting solution was within the range 6.5 to 7.5.

| Stabilization Solution | Mother Liquor (g) | Replenisher (g) |
|---|---|---|
| Triethanolamine | 2.0 | 3.0 |
| Formalin (37%) | 2.0 ml | 3.0 ml |
| Polyoxyethylene-p-monononyl Phenyl Ether (average degree of polymerization: 10) | 0.3 | 0.45 |
| Disodium Ethylenediamine-tetraacetate | 0.05 | 0.08 |
| Water to make | 1.0 l | 1.0 l |
| pH | 5.0-8.0 | 5.0-8.0 |

TABLE 1-2

| Replenishment Rate of Color Developing Solution (per m² of Photoqraphic Material) (ml) | Concentration in Color Developing Replenisher | | | Conc. of K ion in bleaching solution (g/l) |
|---|---|---|---|---|
| | Developing Agent (g/l) | Potassium Bromide (g/l) | pH | |
| 1200 | 5.3 | 0.7 | 10.10 | 0.03 |
| 600 | 6.3 | 0.3 | 10.15 | 0.07 |
| 400 | 7.1 | 0.1 | 10.20 | 0.11 |
| 300 | 7.8 | 0.0 | 10.25 | 0.15 |

TABLE 1-3

| Test No. | Sample No. | Replenishment Rate of Color Developing Solution ($ml/m^2$) | Continuous Processability ($\Delta S_B$) |
|---|---|---|---|
| 01 | 101 | 1200 | −0.02 |
| 02 | 101 | 600 | −0.04 |
| 03 | 101 | 400 | −0.06 |
| 04 | 101 | 300 | −0.08 |
| 05 | 102 | 1200 | −0.01 |
| 06 | 102 | 600 | −0.01 |
| 07 | 102 | 400 | −0.02 |
| 08 | 102 | 300 | −0.03 |
| 09 | 103 | 1200 | 0.00 |
| 10 | 103 | 600 | −0.01 |
| 11 | 103 | 400 | −0.01 |
| 12 | 103 | 300 | −0.02 |
| 13 | 104 | 1200 | 0.00 |
| 14 | 104 | 600 | 0.00 |
| 15 | 104 | 400 | 0.00 |
| 16 | 104 | 300 | −0.01 |

TABLE 1-3-continued

| Test No. | Color Image Fastness ($\Delta D_B$) | Sharpness (25 cycles/mm) | Remarks |
|---|---|---|---|
| 01 | −0.60 | 90 | Comparison |
| 02 | −0.62 | 89 | Comparison |
| 03 | −0.65 | 89 | Comparison |
| 04 | −0.68 | 88 | Comparison |
| 05 | −0.17 | 94 | Comparison |
| 06 | −0.17 | 94 | Invention |
| 07 | −0.17 | 94 | Invention |
| 08 | −0.17 | 94 | Invention |
| 09 | −0.10 | 92 | Comparison |
| 10 | −0.10 | 92 | Invention |
| 11 | −0.10 | 92 | Invention |
| 12 | −0.10 | 92 | Invention |
| 13 | −0.05 | 95 | Comparison |
| 14 | −0.05 | 95 | Invention |
| 15 | −0.05 | 95 | Invention |
| 16 | −0.05 | 95 | Invention |

As apparent from Table 1-3, Samples 102 to 104, in which the replenishment rate of the color developing solution is 600 $ml/m^2$ or less, which are included in the scope of the present invention, exhibit narrow width of fluctuations in photographic characteristics (sensitivity) due to continuous processing, and the fluctuations themselves are small in value, compared to examples for comparison (Sample 101 used in Test Nos. 01 to 04). The samples of the present invention also exhibit excellent color image fastness, compared to the samples for comparison, and the degree of deterioration is extremely low, even when the replenishment rate of the color developing solution is reduced. Further, the results reveal that the samples of the present invention exhibit excellent in sharpness, compared to the samples for comparison, and that fluctuations with replenishment rate are not observed.

When the photographic materials containing the couplers represented by formula (I) in the present invention are thus processed at a replenishment rate of color developing solution of 600 $ml/m^2$ or less, the color image fastness and image quality are improved, the fluctuations in photographic characteristics due to continuous processing are significantly decreased, and low-replenishment processing becomes possible.

EXAMPLE 2

Samples were prepared in the same manner as with Sample 101 with the exception that equimolar amounts of couplers are substituted for EX-8, EX-8/EX-9 and EX-9 used in the seventh and eighth layers of the green-sensitive emulsion layers and the eleventh to thirteenth layers of the blue-sensitive emulsion layers in Sample 101 prepared in Example 1, respectively, as shown in Table 2.

TABLE 2

| Sample No. | Green-Sensitive Emulsion Layer 7th Layer | Green-Sensitive Emulsion Layer 8th Layer | Blue-Sensitive Emulsion Layer 11th Layer | Blue-Sensitive Emulsion Layer 12th Layer | Blue-Sensitive Emulsion Layer 13th Layer |
|---|---|---|---|---|---|
| 201 | A-37 | A-37 | A-37 EX-9 | EX-9 | EX-9 |
| 202 | A-40 | A-40 | A-40 EX-9 | EX-9 | EX-9 |
| 203 | A-51 | A-51 | A-51 EX-9 | EX-9 | EX-9 |
| 204 | B-11 | B-11 | B-11 EX-9 | EX-9 | EX-9 |
| 205 | B-13 | B-13 | B-13 EX-9 | EX-9 | EX-9 |

TABLE 2-continued

| | Green-Sensitive Emulsion Layer | | Blue-Sensitive Emulsion Layer | | |
|---|---|---|---|---|---|
| Sample No. | 7th Layer | 8th Layer | 11th Layer | 12th Layer | 13th Layer |
| 206 | EX-8 | EX-8 | EX-8<br>A-9 | A-9 | A-9 |
| 207 | EX-8 | EX-8 | EX-8<br>A-15 | A-15 | A-15 |
| 208 | EX-8 | EX-8 | EX-8<br>A-18 | A-18 | A-18 |
| 209 | EX-8 | EX-8 | EX-8<br>A-45 | A-45 | A-45 |
| 210 | EX-8 | EX-8 | EX-8<br>B-10 | B-10 | B-10 |
| 211 | A-52 | A-52 | A-52<br>A-18 | A-18 | A-18 |
| 212 | A-29 | A-29 | A-29<br>A-16 | A-16 | A-16 |
| 213 | A-44 | A-44 | A-44<br>A-13 | A-13 | A-13 |
| 214 | B-12 | B-12 | B-12<br>A-11 | A-11 | A-11 |
| 215 | B-45 | B-45 | B-45<br>B-5 | B-5 | B-5 |
| 216 | A-29 | A-34 | A-35<br>A-47 | B-50 | A-17 |
| 217 | A-33/B-31 = 2/1 (molar ratio) | A-35/A-51 = 1/1 (molar ratio) | B-15<br>A-20/B-5 = 1/1 (molar ratio) | A-9/A-13 = ½ (molar ratio) | A-14/coupler (C)* = 1/1 (molar ratio) |

*Coupler (C)

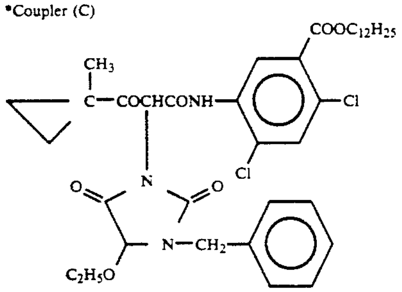

Results obtained were approximately similar to those of Test No. 08 of Example 1 for Samples 201 to 205, those of Test NO. 12 for Samples 206 to 210, and those of Test No. 16 for Samples 210 to 217. It was confirmed that Samples 201 to 217 displayed excellent processing stability in continuous processing, color image fastness and sharpness, compared to the sample for comparison.

EXAMPLE 3

Samples 101 to 104 prepared in Example 1 were exposed according to the same method described in Example 1, and processed by the following stages using a modified processor for color negative film (FP-350, manufactured by Fuji Photo Film Co., Ltd.). For the compositions of processing solutions, the color developing solution is the same as used in Example 1, and the processing solutions for the bleaching stage and later stages are those described in Example 2 of JP-A-1-102559.

| Stage | Processing Time | Processing Temperature (°C.) | Replenishment Rate* (ml) |
|---|---|---|---|
| Color Development | 2 min. 35 sec. | 40.5 | Described in Table 1-3 |
| Bleaching | 45 sec. | 38.0 | 500 |
| Bleaching-Fixing | 2 min. 30 sec. | 38.0 | 1500 |
| Washing (1) | 30 sec. | 38.0 | Countercurrent piping system from (2) to (1) |

-continued

| Stage | Processing Time | Processing Temperature (°C.) | Replenishment Rate* (ml) |
|---|---|---|---|
| Washing (2) | 30 sec. | 38.0 | 1000 |
| Stabilization | 30 sec. | 38.0 | 1000 |
| Drying | 1 min. | 55.0 | |

*The replenishment rate is indicated by the amount per $m^2$ of photographic material.

The properties described in (1-1) to (1-3) of Example 1 were evaluated. As a result, results similar to those shown in Table 1-3 were obtained.

It was therefore confirmed that the combinations of the photographic materials and processing according to the present invention resulted in excellent continuous processing stability, color image fastness and sharpness.

EXAMPLE 4

The method described in Example 1 was repeated under the conditions that each step of the washing (1), washing (2) and stabilization was carried out at 14 second, provided that a total processing time of the washings and stabilization was 42 seconds.

The samples thus obtained were tested in the same manner as disclosed in Example 1 and obtained remarkable advantages, particularly in terms of color fastness of images.

When the photographic materials containing the couplers represented by the above-described general formula (I) in the present invention are processed according to the processing method in which the replenishment rate of the color developing solutions is reduced to 600 $ml/m^2$ or less, high color development properties exhibited by the couplers represented by general formula (I), satisfactory color image fastness and sharpness are maintained, and stable photographic characteristics with few fluctuations in continuous processing can be obtained.

Even when the low-replenishment rate processing of the color development solutions is carried out, a processing method which gives the photographic materials excellent color development properties, color image fastness, image quality and processing stability can be provided.

While the invention has been described in detail and with reference to specific embodiments thereof, it will be apparent to one skilled in the art that various changes and modifications can be made therein without departing from the spirit and scope thereof.

What is claimed is:

1. A method for processing an imagewise exposed silver halide color photographic material comprising:

(1) color developing the silver halide color photographic material with a color developer;

(2) and then processing the photographic material with a processing solution having bleaching activity, in which said photographic material contains a coupler represented by the following general formula (I) and a replenishment rate of said color developer is not more than 600 $ml/m^2$ of photographic material:

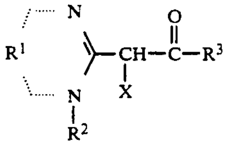

(I)

wherein $R^1$ represents a group of nonmetallic atoms necessary for forming a 5-membered unsaturated heterocyclic ring together with a

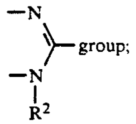

$R^2$ represents a hydrogen atom, an alkyl group, an alkenyl group, an alkynyl group, an aromatic group or a heterocyclic group; $R^3$ represents an alkyl group, an alkenyl group, an alkynyl group, an aromatic group, an alkoxy group, an aryloxy group, a heterocyclic oxy group or

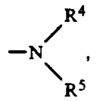

wherein $R^4$ and $R^5$ independently represent a hydrogen atom, an alkyl group, an alkenyl group, an alkynyl group, an aromatic group or a heterocyclic group; and X represents a group which is eliminable by reaction with an oxidation product of an aromatic primary amine developing agent, and wherein any of $R^1$, $R^2$, $R^3$, or X in formula (I) has at least one dissociation group represented by the following formula:

$—Z^1—NH—Z^2—$ wherein $Z^1$ and $Z^2$, which may be the same or different, represent $SO_2$ or CO.

2. A method as claimed in claim 1 wherein said heterocyclic ring in formula (I) is selected from the following rings, represented by formula (A) and/or (B):

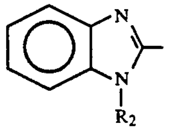

(A)

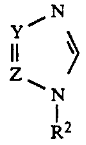

(B)

wherein Y and Z are selected from the group consisting of carbon and nitrogen atoms, $R^2$ are the same as defined in the formula (I) and the rings in formulae (A) and (B) may have substituent groups.

3. A method as claimed in claim 2 wherein said coupler of formula (I) contains a heterocyclic ring of formula (A).

4. A method as claimed in claim 3 wherein $Z^1$ and $Z^2$ are bound to alkyl, aromatic, or heterocyclic groups.

5. A method as claimed in claim 1 wherein $R^3$ is represented by the formula:

$—N(R^4)(R^5)$ wherein $R^4$ and $R^5$ have the same meanings as those defined in the formula (I).

6. A method as claimed in claim 5 wherein $R^4$ is a hydrogen atom, and $R^5$ is a phenyl group.

7. A method as claimed in claim 6 wherein $R^3$ in the formula (I) represents a formula:

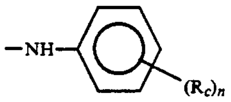

(a)

wherein $R_c$ represents substituent group and n is an integer of 1 to 3.

8. A method as claimed in claim 1 wherein X is represented by formula (III) or (IV):

(III)

-continued

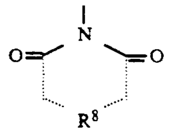

(IV)

wherein $R^7$ is a phenyl group; and $R^8$ is a group of non-metallic atoms necessary for forming a 5-membered heterocyclic group.

9. A method as claimed in claim 1 wherein the coupler represented by formula (I) is a coupler group represented by formula (V) below:

$$A-(L^1)_a-P-(L^2-Q)_b \quad (V)$$

wherein A represents a coupler group in which X is removed from the coupler represented by general formula (I), and P represents a divalent connecting group showing development restraining activity, which is bound to a coupling position of the coupler directly (when a is 0) or through a linkage group $L^1$ (when a is 1); Q represents a substituent group which is bound to P through a linkage group $L^2$ and provides the development restraining activity of P, and the linkage group represented by $L^2$ comprises a chemical bond which is severed in a developing solution; a represents 0, 1 or 2, when a is 2, $L^1$s may be the same or different; b represents an integer of 0 to 2, when b is 2, $L^2$s and Qs may each be the same or different.

10. A method as claimed in claim 9 wherein the coupler represented by formula (V) is any of coupler groups represented by one of the formulae (VI) to (XII):

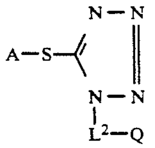

(VI)

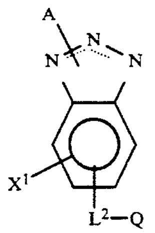

(VII)

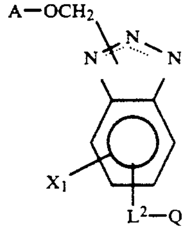

(VIII)

-continued

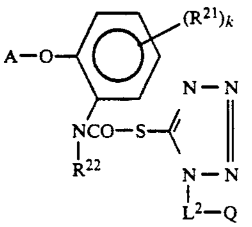

(IX)

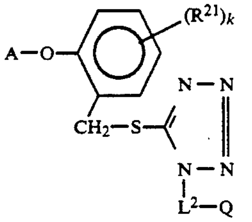

(X)

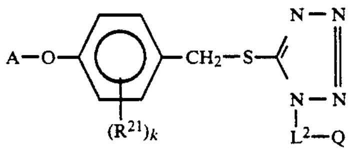

(XI)

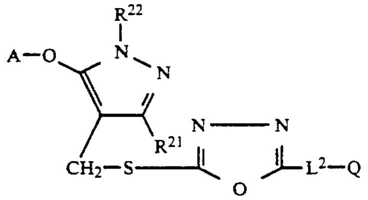

(XII)

wherein A, $L^2$ and Q are as defined in formula (V), and $R^{21}$ represents a hydrogen atom, a halogen atom, an alkyl group, an alkenyl group, an aralkyl group, an alkoxy group, an alkoxycarbonyl group, an anilino group, an acylamino group, a ureido group, a cyano group, a nitro group, a sulfonamido group, a sulfamoyl group, a carbamoyl group, an aryl group, a carboxyl group, a sulfo group, a cycloalkyl group, an alkanesulfonyl group, an arylsulfonyl group or an acyl group; in general formula (XII), $R^{22}$ represents a hydrogen atom, an alkyl group, an alkenyl group, an aralkyl group, a cycloalkyl group or an aromatic group; k represents 1 or 2, and $R^{21}$s may form a condensed ring with each other when k is 2.

11. A method as claimed in claim 1 wherein the coupler represented by the formula (I) is of the formula (I-B)

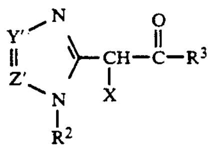

(I-B)

wherein $R^2$, $R^3$ and X are as defined in formula (I), and Y' and Z' each independently represents —N=, —CH=, or —C($R_b$)=, wherein $R_b$ represents substituents.

12. A method as claimed in claim 1 wherein the replenishment rate of the color developer is 100 to 500 ml/$m^2$.

13. A method as claimed in claim 12 wherein the replenishment rate of the color developer is 100 to 400 $ml/m^2$.

14. A method as claimed in claim 13 wherein the replenishment rate of the color developer is 100 to 300 $ml/m^2$.

15. A method as claimed in claim 1 wherein $R^3$ in the formula (I) represents a formula:

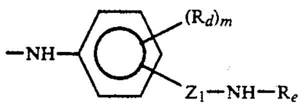

(a-1)

wherein $R_d$ has the same meaning as $R_c$ defined in formula (a); m is 0 or an integer of 1 or 2; $Z_1$ and $Z_2$ each have the same meaning as $Z_1$ and $Z_2$ in claim 1 and $R_e$ represents an alkyl group and an aromatic group.

16. A method as claimed in claim 1 wherein a total amount of the coupler represented by formula (I) added to the photographic material is 0.001 $g/m^2$ or more.

* * * * *